United States Patent
Grkov et al.

(10) Patent No.: US 9,569,643 B2
(45) Date of Patent: Feb. 14, 2017

(54) METHOD FOR DETECTING A SECURITY EVENT ON A PORTABLE ELECTRONIC DEVICE AND ESTABLISHING AUDIO TRANSMISSION WITH A CLIENT COMPUTER

(71) Applicant: LOOKOUT, INC., San Francisco, CA (US)

(72) Inventors: Vance Grkov, Seattle, WA (US); David Richardson, San Francisco, CA (US); Ayan Mandal, Oakland, CA (US); Cherry Mangat, San Francisco, CA (US); Kevin Patrick Mahaffey, San Francisco, CA (US)

(73) Assignee: LOOKOUT, INC., San Francisco, CA (US)

(*) Notice: Subject to any disclaimer, the term of this patent is extended or adjusted under 35 U.S.C. 154(b) by 251 days.

(21) Appl. No.: 14/339,291

(22) Filed: Jul. 23, 2014

(65) Prior Publication Data

US 2014/0338006 A1    Nov. 13, 2014

Related U.S. Application Data

(60) Division of application No. 13/410,979, filed on Mar. 2, 2012, now Pat. No. 8,855,601, which is a
(Continued)

(51) Int. Cl.
*H04M 1/66* (2006.01)
*H04M 1/68* (2006.01)
(Continued)

(52) U.S. Cl.
CPC ............... *G06F 21/88* (2013.01); *G06F 3/165* (2013.01); *H04L 63/14* (2013.01);
(Continued)

(58) Field of Classification Search
CPC ...... H04W 12/12; H04W 8/245; H04W 12/08; G06F 21/88; G06F 3/165; H04L 63/14; H04M 3/42161
See application file for complete search history.

(56) References Cited

U.S. PATENT DOCUMENTS 3,416,032 A    12/1968   Jahns et al.
4,553,257 A    11/1985   Mori et al.
(Continued)

FOREIGN PATENT DOCUMENTS

GB    2430588        3/2007
WO    2007081356    7/2001
(Continued)

OTHER PUBLICATIONS

PCT International Preliminary Report on Patentability for PCT/US2011/049182; Mailed on Mar. 7, 2013; pp. 1-9.
(Continued)

*Primary Examiner* — Ajit Patel
(74) *Attorney, Agent, or Firm* — Dergosits & Noah LLP

(57) ABSTRACT

Mobile devices typically have some form of audio capabilities designed to be operated by the device's user, for example to place phone calls; however, if a device is misplaced or stolen, the user may wish to operate those audio capabilities remotely. Methods are provided for detecting that a security event has occurred on a portable electronic device and then establishing an audio transmission between the device and one or more clients, and in some embodiments, sending a command to initiate the audio transmission. The detection of a security event may be based on, for example, detecting that the device has been turned on, detecting movement of the device, detecting that an incorrect password has been entered, the device camera has been used, contacts have been added or deleted, the SIM card as been removed or replaced, application programs
(Continued)

have been installed or uninstalled from the device, or uncharacteristic behavior has been detected.

21 Claims, 34 Drawing Sheets

Related U.S. Application Data continuation-in-part of application No. 12/372,719, filed on Feb. 17, 2009, now Pat. No. 8,467,768.

(51) Int. Cl.

| | | |
|---|---|---|
| *H04M 3/16* | (2006.01) | |
| *G06F 21/88* | (2013.01) | |
| *H04L 29/06* | (2006.01) | |
| *H04W 12/12* | (2009.01) | |
| *H04M 3/42* | (2006.01) | |
| *G06F 3/16* | (2006.01) | |
| *H04W 8/24* | (2009.01) | |

(52) U.S. Cl.
CPC ....... *H04M 3/42161* (2013.01); *H04W 12/12* (2013.01); *H04W 8/245* (2013.01)

(56) References Cited

U.S. PATENT DOCUMENTS

| | | |
|---|---|---|
| 5,715,518 A | 2/1998 | Barrere et al. |
| 6,185,689 B1 | 2/2001 | Todd et al. |
| 6,696,941 B2 | 2/2004 | Baker |
| 6,892,225 B1 | 5/2005 | Tu et al. |
| 7,123,933 B2 | 10/2006 | Poor et al. |
| 7,159,237 B2 | 1/2007 | Schneier et al. |
| 7,178,166 B1 | 2/2007 | Taylor et al. |
| 7,181,252 B2 | 2/2007 | Komsi |
| 7,228,566 B2 | 6/2007 | Caceres et al. |
| 7,304,570 B2 | 12/2007 | Thomas et al. |
| 7,305,245 B2 | 12/2007 | Alizadeh-Shabdiz et al. |
| 7,308,712 B2 | 12/2007 | Banzhof |
| 7,325,249 B2 | 1/2008 | Sutton et al. |
| 7,397,424 B2 | 7/2008 | Houri |
| 7,403,762 B2 | 7/2008 | Morgan et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,551,579 B2 | 6/2009 | Alizadeh-Shabdiz et al. |
| 7,551,929 B2 | 6/2009 | Alizadeh-Shabdiz et al. |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,783,281 B1 | 8/2010 | Cook et al. |
| 7,809,366 B2 | 10/2010 | Rao et al. |
| 7,818,017 B2 | 10/2010 | Alizadeh-Shabdiz et al. |
| 7,835,754 B2 | 11/2010 | Alizadeh-Shabdiz et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,358 B1 | 2/2012 | Lee |
| 8,135,395 B2 | 3/2012 | Cassett et al. |
| 8,195,196 B2 | 6/2012 | Haran et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,932,368 B2 * | 1/2015 | Fitzgerald ............. H04W 12/12 455/411 |
| 9,031,536 B2 * | 5/2015 | Fitzgerald ............. G06F 21/316 455/411 |
| 9,160,830 B2 * | 10/2015 | Jain ........................ H04M 1/66 |
| 9,258,326 B2 * | 2/2016 | Fitzgerald ............... G06F 21/88 |
| 9,258,715 B2 * | 2/2016 | Borghei ................. H04W 12/08 |
| 2002/0087483 A1 | 7/2002 | Harif |
| 2002/0194473 A1 | 12/2002 | Pope |
| 2003/0046134 A1 | 3/2003 | Frolick et al. |
| 2003/0131148 A1 | 7/2003 | Kelley et al. |
| 2004/0209608 A1 | 10/2004 | Kouznetsov et al. |
| 2004/0259532 A1 | 12/2004 | Isomaki et al. |
| 2005/0010821 A1 | 1/2005 | Cooper et al. |
| 2005/0125779 A1 | 6/2005 | Kelley et al. |
| 2005/0138413 A1 | 6/2005 | Lippmann et al. |
| 2005/0138450 A1 | 6/2005 | Hsieh |
| 2005/0186954 A1 | 8/2005 | Kenney |
| 2005/0221800 A1 | 10/2005 | Jackson et al. |
| 2006/0026283 A1 | 2/2006 | Trueba |
| 2006/0075388 A1 | 4/2006 | Kelley et al. |
| 2006/0101518 A1 | 5/2006 | Schumaker et al. |
| 2006/0161628 A1 * | 7/2006 | Nagy ...................... H04W 4/02 709/206 |
| 2006/0217115 A1 | 9/2006 | Cassett et al. |
| 2006/0236325 A1 | 10/2006 | Rao et al. |
| 2006/0253205 A1 | 11/2006 | Gardiner |
| 2007/0015519 A1 | 1/2007 | Casey |
| 2007/0021112 A1 | 1/2007 | Byrne et al. |
| 2007/0038677 A1 | 2/2007 | Reasor et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0190995 A1 | 8/2007 | Wang et al. |
| 2007/0240222 A1 | 10/2007 | Tuvell et al. |
| 2007/0248047 A1 | 10/2007 | Shorty et al. |
| 2008/0046369 A1 | 2/2008 | Wood |
| 2008/0046557 A1 | 2/2008 | Cheng |
| 2008/0049653 A1 | 2/2008 | Demirhan et al. |
| 2008/0165952 A1 | 7/2008 | Smith |
| 2008/0186162 A1 | 8/2008 | Rajan et al. |
| 2008/0235801 A1 | 9/2008 | Soderberg et al. |
| 2008/0307243 A1 | 12/2008 | Lee |
| 2008/0318562 A1 | 12/2008 | Featherstone et al. |
| 2008/0320312 A1 | 12/2008 | Duffus |
| 2009/0172227 A1 | 7/2009 | Taylor et al. |
| 2009/0205016 A1 | 8/2009 | Milas |
| 2009/0205047 A1 | 8/2009 | Podjarny |
| 2009/0253410 A1 * | 10/2009 | Fitzgerald ............... G06F 21/88 455/411 |
| 2010/0019731 A1 | 1/2010 | Connolly et al. |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0210240 A1 | 8/2010 | Mahaffey et al. |
| 2010/0240419 A1 | 9/2010 | Horino |
| 2010/0241739 A1 | 9/2010 | Reus et al. |
| 2010/0317324 A1 | 12/2010 | Brown et al. |
| 2010/0332680 A1 | 12/2010 | Anderson et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0113242 A1 | 5/2011 | Mccormack |
| 2011/0119765 A1 | 5/2011 | Burgess et al. |
| 2011/0145920 A1 | 6/2011 | Burgess et al. |

(56) References Cited

U.S. PATENT DOCUMENTS

| | | | |
|---|---|---|---|
| 2011/0171923 A1 | 7/2011 | Daly et al. | |
| 2011/0241872 A1 | 10/2011 | Mahaffey | |
| 2011/0296510 A1 | 12/2011 | Hatlelid et al. | |
| 2012/0042382 A1 | 2/2012 | Mahaffey | |
| 2012/0060222 A1 | 3/2012 | Burgess et al. | |
| 2012/0072569 A1 | 3/2012 | Xu | |
| 2012/0084836 A1 | 4/2012 | Mahaffey et al. | |
| 2012/0084864 A1 | 4/2012 | Burgess et al. | |
| 2012/0096555 A1 | 4/2012 | Mahaffey | |
| 2012/0110174 A1 | 5/2012 | Mahaffey et al. | |
| 2012/0110345 A1 | 5/2012 | Pigeon | |
| 2012/0124239 A1 | 5/2012 | Shribman et al. | |
| 2012/0179801 A1 | 7/2012 | Luna et al. | |
| 2012/0179814 A1 | 7/2012 | Swildens et al. | |
| 2012/0188064 A1 | 7/2012 | Mahaffey et al. | |
| 2012/0233695 A1 | 9/2012 | Mahaffey et al. | |
| 2012/0237908 A1* | 9/2012 | Fitzgerald ............... | G06F 21/88 434/236 |
| 2012/0259954 A1 | 10/2012 | McCarthy et al. | |
| 2012/0303735 A1 | 11/2012 | Raciborski et al. | |
| 2012/0317233 A1 | 12/2012 | Redpath | |
| 2012/0324076 A1 | 12/2012 | Zerr et al. | |
| 2012/0324094 A1 | 12/2012 | Wyatt et al. | |
| 2012/0324568 A1 | 12/2012 | Wyatt et al. | |
| 2013/0019311 A1 | 1/2013 | Swildens et al. | |
| 2013/0023209 A1 | 1/2013 | Fisher et al. | |
| 2013/0041974 A1 | 2/2013 | Luna et al. | |
| 2013/0047034 A1 | 2/2013 | Salomon et al. | |
| 2013/0086682 A1 | 4/2013 | Mahaffey et al. | |
| 2013/0157692 A1 | 6/2013 | Hall et al. | |
| 2014/0331294 A1 | 11/2014 | Ramallo | |

FOREIGN PATENT DOCUMENTS

| | | |
|---|---|---|
| WO | 2005101789 | 10/2005 |
| WO | 2006110181 | 10/2006 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

"Virgin Media—Phone Lost or Stolen?", web page downloaded Apr. 11, 2013 from http://www.virginmobile.com/vm/ukCoverage.do?contentId=insurance.howdoi.sm283.

"Sprint—Report that your device is lost or stolen", web page downloaded Apr. 11, 2013 from http://support.sprint.com/support/article/Report_that_your_device_is_lost_or_stolen/case-ba416758-20090629-143222.

PCT "International Search Report and Written Opinion of the International Searching Authority for PCT/US2013/027166", mailed on Jun. 19, 2013; received on Jun. 21, 2013.

PCT International Preliminary Report on Patentability for PCT/US2013/027166 Mailed on Sep. 12, 2014; received on Sep. 23, 2014.

U.S. Appl. No. 13/267,731, filed Oct. 6, 2011.

Virus Total, VT Community, www.virustotal.com/index.html; Dated Dec. 16, 2011; 44 Pages.

Windows Update, Internet Archive, Way Back Machine, available at <http://web.archive.org/web/20071022193017/http://en.wikipedia.org/wiki/Windows_Update> Retrieved Feb. 23, 2011, 3 pages.

Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

"Berry Locator", 2007, Mobireport LLC, 1 page.

"Firefox", Wikipedia, Jul. 20, 2011, available at <http://en.wikipedia.org/wiki/firefox> Retrieved Aug. 10, 2011, 37 Pages.

"F-Secure Mobile Security for S60 Users Guide", F-Secure Corporation 2009, pp. 1-34.

"Java Virtual Machine", Wikipedia, Aug. 7, 2011, Available at <http://en.wikipedia.org/wiki/Java_Virtual_Machine> Retrieved Aug. 10, 2011, 7 pages.

"Kaspersky Mobile Security", Kaspersky Lab 1997-2007, 1 page.

"Kaspersky Mobile Security", Kaspersky Lab 2008, available at <http://www.kaspersky.com/kaspersky_mobile_security> Retrieved Sep. 11, 2008, 2 Pages.

"Norton Smartphone Security",Symantec, 2007, Available at <http://www.symantec.com/norton/smartphone-security> Retrieved Oct. 21, 2008, 2 pages.

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

"Symantec Endpoint Protection", Symantec, 2008, Available at <http://www.symantec.com/business/products/family.jsp?familyid=endpointsecurity>, 6 pages.

"Symantec Mobile Security Suite for Windows Mobile", Symantec, 2008 Available at <http://www.symantec.com/business/products/sysreq.jsp?pcid=2241&pvid=mobile_security_suite_1>, 5 pages.

"TippingPoint Security Management System (SMS)", TippingPoint, Available at <http://www.tippingpoint.com/products_sms.html>, 2 pages, accessed and retrieved Mar. 5, 2012.

U.S. Appl. No. 11/397,521, filed Apr. 3, 2006.
U.S. Appl. No. 13/284,248, filed Oct. 28, 2011.
U.S. Appl. No. 13/313,937, filed Dec. 7, 2011.
U.S. Appl. No. 13/314,032, filed Dec. 7, 2011.
U.S. Appl. No. 13/333,654, filed Dec. 21, 2011.
U.S. Appl. No. 13/335,779, filed Dec. 22, 2011.
U.S. Appl. No. 13/410,979, filed Mar. 2, 2012.

Amazon.com: Mining the Web Discovering Knowledge from Hypertext Data (9781558607545): Soumen Chakrabarti: Books, Amazon available at <http://www.amazon.com/exec/obiods/ASIN/1558607544/>, retrieved Jun. 7, 2012, pp. 1-7.

Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.

Diligenti, M., et al., Focused Crawling Using Context Graphs:, Proceedings of the 26th VLDB Conference, Cairo, Egypt, 2000, pp. 1-8.

Grafio "Stay Secure", Opera Software, Sep. 29, 2008, Available at <http://widgets.opera.com/widget/4495> Retrieved Oct. 21, 2008, 4 pages.

McAfee, Internet Archive, Way Back Machine, available at <http://web.archive.org/web/20080611095201/www.qualys.com/solutions/vulnerability_management>retrieved Feb. 24, 2011, 1 page.

MobileWipe web page, pp. 1-4, available Dec. 5, 2007.

PCT International Search Report and Written Opinion of the International Searching Authority for PCT/US2009/061370; Mailed on Dec. 14, 2009; pp. 1-12.

PCT International Search Report and Written Opinion of the International Searching Authority for PCT/US2009/061372; Mailed on Mar. 24, 2010; pp. 1-16.

PCT International Search Report and Written Opinion of the International Searching Authority for PCT/US2011/049182; Mailed on Dec. 23, 2011; pp. 1-11.

Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

Real world Computing, Jun. 16, 2008 (PC Pro), pp. 1-2.

Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.

U.S. Appl. No. 12/255,614; (including Office Action dated Apr. 14, 2011).

(56) References Cited

OTHER PUBLICATIONS

U.S. Appl. No. 12/255,621; (including OA dated Apr. 13, 2011).
U.S. Appl. No. 12/255,626; (including OA dated Feb. 1, 2011).
U.S. Appl. No. 12/255,635; (including OA dated Mar. 24, 2011).
U.S. Appl. No. 13/033,025, filed Feb. 23, 2011.
U.S. Appl. No. 13/212,055, filed Aug. 17, 2011.
U.S. Appl. No. 12/255,632. (including Notice of Allowance dated Nov. 3, 2011).
U.S. Appl. No. 12/255,632. (including office action dated Apr. 13, 2011).
U.S. Appl. No. 13/160,382. (including office action dated Dec. 26, 2012).
U.S. Appl. No. 12/372,719, filed Jun. 16, 2011.
U.S. Appl. No. 12/621,431, filed Nov. 18, 2009.
U.S. Appl. No. 12/868,669, filed Aug. 25, 2010.
U.S. Appl. No. 12/868,672, filed Aug. 25, 2010.
U.S. Appl. No. 12/868,676, filed Aug. 25, 2010.
U.S. Appl. No. 12/876,018, filed Sep. 3, 2010.
U.S. Appl. No. 13/160,382, filed Jun. 14, 2011.
U.S. Appl. No. 13/160,447, filed Jun. 14, 2011.
U.S. Appl. No. 13/162,477, filed Jun. 16, 2011.
Communication and Extended Supplementary European Search Report for Application No. 13755206.3, dated Apr. 17, 2015.

* cited by examiner

3705

3805

METHOD FOR DETECTING A SECURITY EVENT ON A PORTABLE ELECTRONIC DEVICE AND ESTABLISHING AUDIO TRANSMISSION WITH A CLIENT COMPUTER

CROSS REFERENCE TO RELATED APPLICATIONS

The present application is a divisional of U.S. application Ser. No. 13/410,979, entitled "SYSTEM AND METHOD FOR REMOTELY-INITIATED AUDIO COMMUNICATION," filed Mar. 2, 2012, which is a continuation-in-part of U.S. patent application Ser. No. 12/372,719, entitled "SYSTEM AND METHOD FOR REMOTELY SECURING OR RECOVERING A MOBILE DEVICE," filed Feb. 17, 2009, which is related to the following co-pending U.S. patent applications: U.S. patent application Ser. No. 12/255,635, entitled "SECURITY STATUS AND INFORMATION DISPLAY SYSTEM," U.S. application Ser. No. 12/255,632, "SECURE MOBILE PLATFORM SYSTEM," U.S. application Ser. No. 12/255,626, "SYSTEM AND METHOD FOR A MOBILE CROSS-PLATFORM SOFTWARE SYSTEM," U.S. patent application Ser. No. 12/255,621, "SYSTEM AND METHOD FOR ATTACK AND MALWARE PREVENTION," and U.S. patent application Ser. No. 12/255,614, "SYSTEM AND METHOD FOR MONITORING AND ANALYZING MULTIPLE INTERFACES AND MULTIPLE PROTOCOLS" which are all hereby incorporated by reference.

FIELD

The present invention relates to the field of information technology, including, more particularly, to systems and techniques for audio transmissions in connection with a portable electronic device.

BACKGROUND

Devices such as smartphones and tablet computers have become an important accessory, and perhaps even a vital accessory, for many people. These devices can store large amounts of a person's data such as a music collection, documents, contacts, notes, reminders, calendar dates, pictures, video, and much more. These devices may include many different application programs or apps that people have bought for the device such as productivity apps, games, news apps, and so forth.

A key feature of such devices is that they are small and relatively lightweight. Thus, people typically carry these devices throughout the day such as to work, meetings, appointments, restaurants, coffee shops, bars, and so forth. It can be very easy to lose, misplace, or have such a device stolen. Generally, people will be upset if they lose such a device because these devices can be very expensive and difficult to replace especially if they contain important data.

Therefore, there is a need to provide systems and techniques to help people find their missing devices.

BRIEF SUMMARY OF THE INVENTION

Mobile devices typically have some form of audio capabilities designed to be operated by the device's user, for example to place phone calls; however, if a device is misplaced or stolen, the user may wish to operate those audio capabilities remotely. Techniques are provided for determining when an audio transmission should be established between a device and one or more clients, and sending a command to initiate the audio transmission. The determination may be based on receiving a request from a client, detecting at a server that the device is lost or stolen, or detecting at the device that the device is missing. The audio transmission may be established without user intervention at the device or in response to user action at the portable electronic device. Device settings such as audio settings at the device may be overridden in connection with the audio transmission.

In a specific implementation, a method includes at a server, determining that an audio transmission should be established between a client computer and a portable electronic device, generating instructions responsive to the determination, the instructions including a first command that instructs the portable electronic device to initiate the audio transmission, and transmitting the instructions to the portable electronic device.

In another specific implementation, a method includes at a server, determining that an audio transmission should be established between a client computer and a portable electronic device, at the server, generating instructions responsive to the determination including a first command that instructs an audio data transport provider to initiate the audio transmission, and at the server, transmitting the instructions to the audio data transport provider.

In another specific implementation, a method on a portable electronic device includes at the portable electronic device, detecting a security event occurring at the portable electronic device, and in response to the detected security event, at the portable electronic device, determining that an audio transmission should be established between the portable electronic device and a client computer.

In another specific implementation, a method on a portable electronic device includes at the portable electronic device, intercepting, by a first application program executing at the portable electronic device, a communication signal received at the portable electronic device over a network, analyzing the communication signal to detect at least one of a first condition or a second condition. The first condition is detected when the communication signal includes a predefined security code. The second condition is detected when the communication signal is from a predefined source. The method further includes if the at least one condition is detected, determining that an audio transmission should be established between the portable electronic device and a client, and if the at least one condition is not detected, passing the intercepted communication signal to a second application program executing at the portable electronic device.

In another specific implementation, a method includes at a server, determining that an audio transmission should be established between a client computer and a portable electronic device, generating instructions responsive to the determination, the instructions including a first command that instructs the portable electronic device to initiate the audio transmission through an audio data transport provider, and transmitting the instructions to the client computer.

In another specific implementation, a method for remotely initiating a two way audio call between a client computer and a target mobile communications device includes a) at a server, processing authorization credentials received from a client computer user to determine whether the client computer user is authorized to access the server to request a two way audio call be initiated between the client computer and the target mobile communications device, b) at the server, and after processing of the authorization credentials, presenting a web page to the client computer to enable the authorized user to enter a request on the web page for the server to issue a command that initiates a two way audio call between the client computer and the target mobile communications device, c) at the server, receiving the request from the authorized user to issue the command that initiates a two way audio call between the client computer and the target mobile communications device, and d) at the server, transmitting the command to an audio data transport provider instructing the audio data transport provider to connect the client computer and the target mobile communications device through a two way audio connection.

In another specific implementation, a non-transitory computer-readable storage medium has stored thereon a set of instructions which, when executed by a processor, cause the processor to perform the steps of a method for remotely initiating a two way audio call between a client computer and a target mobile communications device including a) at a server, processing authorization credentials received from a client computer user to determine whether the client computer user is authorized to access the server to request a two way audio call be initiated between the client computer and the target mobile communications device, b) at the server, and after processing of the authorization credentials, presenting a web page to the client computer to enable the authorized user to enter a request on the web page for the server to issue a command that initiates a two way audio call between the client computer and the target mobile communications device, c) at the server, receiving the request from the authorized user to issue the command that initiates a two way audio call between the client computer and the target mobile communications device, and d) at the server, transmitting the command to an audio data transport provider instructing the audio data transport provider to connect the client computer and the target mobile communications device through a two way audio connection.

In another specific implementation, a method for remotely initiating a two way audio call between a client computer and a target mobile communications device includes a) at a server, processing authorization credentials received from a client computer user to determine whether the client computer user is authorized to access the server to request a two way audio call be initiated between the client computer and the target mobile communications device, b) at the server, and after processing of the authorization credentials, receiving a request from the authorized user accessing the server from the client computer to initiate a two way audio call between the client computer and the target mobile communications device, and c) at the server, transmitting a command to an audio data transport provider instructing the audio data transport provider to connect the client computer and the target mobile communications device through a two way audio connection.

In another specific implementation, a non-transitory computer-readable storage medium has stored thereon a set of instructions which, when executed by a processor, cause the processor to perform the steps of a method for remotely initiating a two way audio call between a client computer and a target mobile communications device including a) at a server, processing authorization credentials received from a client computer user to determine whether the client computer user is authorized to access the server to request a two way audio call be initiated between the client computer and the target mobile communications device, b) at the server, and after processing of the authorization credentials, receiving a request from the authorized user accessing the server from the client computer to initiate a two way audio call between the client computer and the target mobile communications device, and c) at the server, transmitting a command to an audio data transport provider instructing the audio data transport provider to connect to the client computer and the target mobile communication device through a two way audio connection.

In another specific implementation, a method for remotely initiating a two way audio call from a target mobile communications device includes a) at a server, processing authorization credentials received from a client computer user to determine whether the client computer user is authorized to access the server to request initiating a two way audio call from the target mobile communications device to a user's back-up telephone number, b) at the server, and after processing of the authorization credentials, presenting a web page to the client computer to enable the authorized user to enter a request on the web page for the server to issue a command that initiates a two way audio call from the target mobile communications device to the user's back-up telephone number, c) at the server, receiving the request from the authorized user to initiate a two way audio call from the target mobile communications device to the user's back-up telephone number, and d) at the server, transmitting the command to an audio data transport provider instructing the audio data transport provider to connect the target mobile communications device to the user's back-up telephone number through a two way audio connection.

In another specific implementation, a non-transitory computer-readable storage medium has stored thereon a set of instructions which, when executed by a processor, cause the processor to perform the steps of a method for remotely initiating a two way audio call from a target mobile communications device including a) at a server, processing authorization credentials received from a client computer user to determine whether the client computer user is authorized to access the server to request initiating a two way audio call from the target mobile communications device to a user's back-up telephone number, b) at the server, and after processing of the authorization credentials, presenting a web page to the client computer to enable the authorized user to enter a request on the web page for the server to issue a command that initiates a two way audio call from the target mobile communications device to the user's back-up telephone number, c) at the server, receiving the request from the authorized user to initiate a two way audio call from the target mobile communications device to the user's back-up telephone number, and d) at the server, transmitting the command to an audio data transport provider instructing the audio data transport provider to connect to the target mobile communications device to the user's back-up telephone number through a two way audio connection.

In another specific implementation, a method for remotely initiating a two way audio call from a target mobile communications device includes a) at a server, processing authorization credentials received from a client computer user to determine whether the client computer user is authorized to access the server to request initiating a two way audio call from the target mobile communications device to a user's back-up telephone number, b) at the server, and after processing of the authorization credentials, receiving a request from the authorized user accessing the server from the client computer to initiate a two way audio call from the target mobile communications device to the user's back-up telephone number, and c) at the server, transmitting a command to an audio data transport provider instructing the audio data transport provider to connect the target mobile communications device to the user's back-up telephone number through a two way audio connection.

In another specific implementation, a non-transitory computer-readable storage medium has stored thereon a plurality of instructions which, when executed by a processor, cause the processor to perform the steps of a method for remotely initiating a two way audio call from a target mobile communications device including a) at a server, processing authorization credentials received from a client computer user to determine whether the client computer user is authorized to access the server to request initiating a two way audio call from the target mobile communications device to a user's back-up telephone number, b) at the server, and after processing of the authorization credentials, receiving a request from the authorized user accessing the server from the client computer to initiate a two way audio call from the target mobile communications device to the user's back-up telephone number, and c) at the server, transmitting a command to an audio data transport provider instructing the audio data transport provider to connect the target mobile communications device to the user's back-up telephone number through a two way audio connection.

In another specific implementation, a method includes at a server, determining that audio, local to a portable electronic device, should be recorded, generating, responsive to the determination, instructions that instruct the portable electronic device to begin recording audio local to the portable electronic device, and transmitting the instructions to the portable electronic device.

In a specific implementation, VOIP calls can be initiated from a web app, SMS or telephone. This feature can be applicable to phones, tablets, and devices without SIM cards. VOIP calls can involve the transportation of audio, whether that be telephony, VOIP or sound files in either real-time or as batched files. VOIP calls to the device can include: a) Messaging and callback (can be a single call, or a conference call to a specified list. The call list may include VOIP clients and doesn't have to be phones.); b) Ringing or no ringing, as well as the ability to override volume settings and override headphone/sound routing. This can be done by the initiator dynamically or through configuration on the device; c) Auto answering; d) Configuring the device during the call; e) Initiating actions on the device, such as taking pictures; f) Locking the device and only allowing certain features to work such as "call owner;" g) Callback conditioned on events (e.g., when the screen turns on, when there is movement, when camera is used, when an incorrect password is used).

Other objects, features, and advantages of the present invention will become apparent upon consideration of the following detailed description and the accompanying drawings, in which like reference designations represent like features throughout the figures.

DETAILED DESCRIPTION

Figure 1:
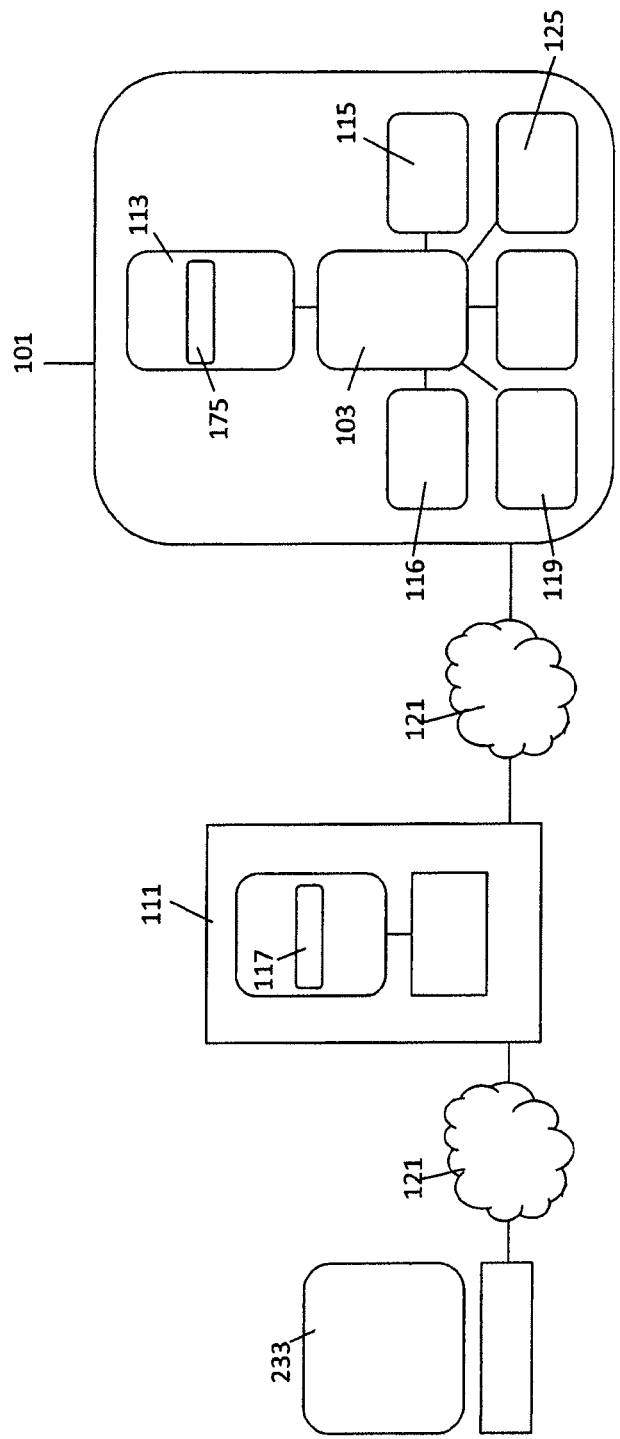
FIG. 1 illustrates a diagram of a mobile device, server and client computer.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

As used herein, the term "mobile communications device" refers to mobile phones, PDAs and smartphones. The term "mobile communications device" also refers to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

A. System Architecture

With reference to FIG. 1, a block diagram of an embodiment of the mobile device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between security system application programs and the mobile device hardware components.

In an embodiment, the mobile device 101 receives data through an RF transceiver(s) 116 which may be able to communicate via various networks, for example: Bluetooth, local area networks such as WiFi, and cellular networks such as GSM or CDMA.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 accesses a communications network 121 which permits access to a server 111. The server 111 may also be accessed by a client computer 233 via network 121. The network 121 will normally be the Internet but can also be any other communications network. Alternatively, the mobile device 101 may access the server 111 by a different network than the network the client computer 233 accesses the server 111 with. In an embodiment, the server 111 is provided with server software 117. The server software 117 on the server 111 provides functionality to allow two-way communication between the server 111 and the mobile device 101, as well as two-way communication between the server 111 and the client computer 233 also through the network 121. The server software 117 on the server 111 enables the client computer 233 to access the mobile device 101 and issue commands from the client computer 233 to the mobile device 101. The server software 117 also allows for the mobile device 101 to communicate with the client computer 233 to deliver status information about the mobile device 101 after the commands from the client computer 233 have been executed or while they are in progress. Furthermore, the server software 117 allows data, such as location-related information, pictures, contacts, videos, SMS messages, call history, event logs, and settings to be transferred from the mobile device 101 to the client computer 233 and from the client computer 233 to the mobile device 101. In an embodiment, the server software 117 generates a web page for display on the client computer 233 which allows an authorized user to use remote access and configuration controls relating to the mobile device 101. In an embodiment, the server also includes a database 179 that is used to store backed-up data and other information from the mobile device 101.

Of course, it is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

With regard to the client computer 233, in the preferred embodiment, the client computer accesses the server software 117 on the server 111, and does not require that the client computer 233 to possess computer program instruction sets for the server software 117 locally. However, in certain embodiments, the client computer 233 can be programmed with software that allows it to remotely control or access a mobile device.

In an embodiment, an application or widget loaded on the client computer is used to present a user interface to the user. The user interface may provide some or all of the functionality provided by the web page displayed on the client computer. The application or widget contains presentation logic and communicates with the server via an API. The application or widget sends a request to the server in order to retrieve information from the server for display. The server returns the information in a structured format such as XML or JSON, so that the application or widget is able to display the information in an arbitrary manner. For example, the information requested by the application or widget and returned by the server may contain data such as: a list of devices accessible by the user, status information relating to a device, or a list of devices in a group managed by the user that are determined to be lost or stolen. The application or widget may also send a request to the server to perform actions on a device, change settings relating to a device, or access any other functionality provided by the server. For example, a widget may show the device and its phone number based in information retrieved from the server. The widget may have a button which allows the user to request for the server to instruct the device to play a sound. After the server has instructed the device to play a sound and the device has responded that it has started performing the action, the widget may request for the server to return the status of the command. After receiving the response from the server, the widget displays that the sound is currently playing on the device.

Figure 2:
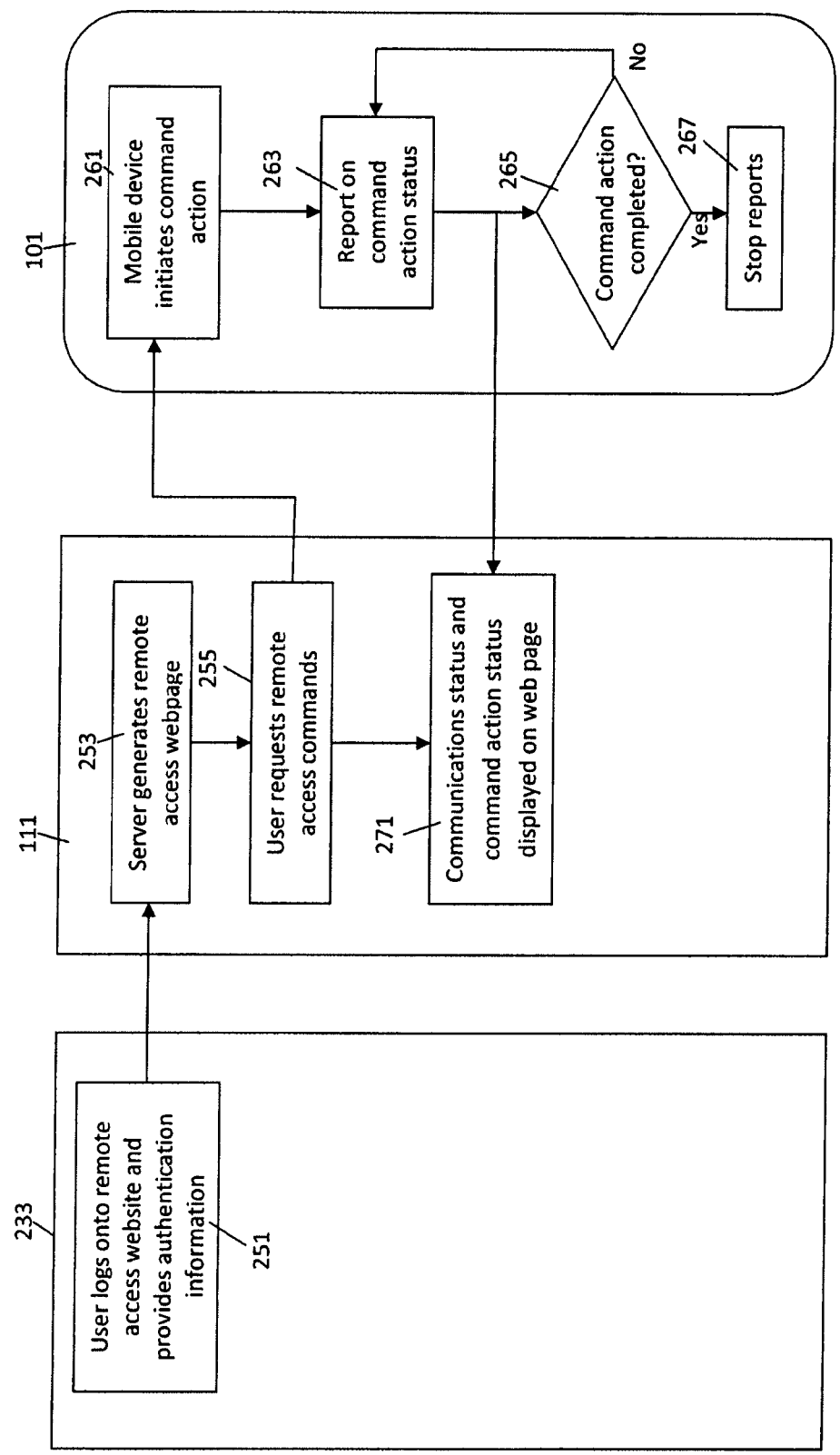
FIG. 2 illustrates a flow chart of the remote access processing performed on the mobile device.

The steps for remote access to the mobile device 101 are shown in FIG. 2. If the mobile device 101 is lost or stolen, the user can use the client computer 233 to access the server software 117 running on the server 111 to remotely access the mobile device 101. Preferably, the server 111 will only allow the user to perform tasks after he or she has supplied authorized credentials 251. The server 111 may require authentication information such as a user name, password, biometric data, or other security-related information. If the user is authorized, the server 111 retrieves previously stored information about the mobile device 101 for which remote access is sought. The server 111 then generates a remote access web page corresponding to the mobile device 101 that is accessible by the client computer 233 and includes a user interface 253 which provides remote access to the mobile device 101. Some of the remote access controls include locating the mobile device 101 by providing the location of the mobile device 101 on a map, making the mobile device 101 play a sound, backing up the data on the mobile device 101, locking or unlocking the mobile device 101, monitoring audio or video near from the mobile device 101, monitoring any actions taken on the mobile device 101, and wiping any memory in the mobile device 101.

The client computer 233 can request one or more actions to be performed by the mobile device 255, causing the server 111 to transmit the command(s) to the mobile device to perform the selected action(s) 261. In some cases, the mobile device 101 cannot receive commands because it is outside of a communications network coverage area, its batteries are dead, or for various other reasons. In an embodiment, the server 111 can display the communications status, including attempted communications with the mobile device, on the remote access web page 271. If the mobile device is not able to receive or process the command(s), the remote access web page can indicate that communication with the device is being attempted. The server will continue to attempt to send a given command to the mobile device until the mobile device successfully completes the command, the command is manually cancelled, or the command cancelled through some setting established by the server software 117. Once the server 111 receives acknowledgement from the client that it received the command successfully, the remote access web page will indicate that the action corresponding to the command is in progress.

Any web pages generated by the server software 117 may be updated to show changes without action by the user by using technology such as Javascript or Adobe Flash which can connect to the server 111 and retrieve updated information even after a web page is generated. The requests from client computer 233 to the server 111 may be periodic, occurring on an interval, or have long timeouts in order to allow the server 111 to respond only when changes have occurred or a timeout has been reached.

It is understood by one with ordinary skill in the art that the functionality or information provided by a web page does not necessarily have to be accomplished by a single document generated by the server 111. For example, a document may be an HTML document. In this context, the use of the term web page is intended to mean one or more documents that provide the functionality described herein. The functionality may be split between multiple documents and grouped by likely use cases. A single document may have the ability to change the functionality it presents to the user using a technology such as Javascript which can modify the presentation of and, therefore, the functionality enabled by a document.

When the mobile device 101 receives the command(s) from the server 111, the local software component 175 on the mobile device 101 initiates the commanded action(s) 261. The local software component 175 then monitors the commanded action and prepares reports on the action's status 263. The mobile device 101 continues to check if the commanded action has been completed 265 and, if desired, transmits updated command status 263 back to the server 111. The command status is interpreted and updated information may be displayed on the web page 271. In an embodiment, the reports are only prepared when the commanded action has completed successfully or has failed, but not while it is in progress.

In an embodiment, the status report indicates the progress of the mobile device's execution of a commanded action. For example, the first status report can indicate that the mobile device is beginning to perform the commanded action. Subsequent reports would then indicate the partial completion of the commanded action. The web page 253 accessed by the client computer 233 can graphically display the progress of the command and may also provide an estimated completion time. When the mobile device has determined that the commanded action has been completed 265, the local software component 175 will send confirmation of the commanded action's completion and stop preparing reports 267.

If the user requests more than one command, the server 111 can transmit multiple commands to the mobile device 101 together. The mobile device 101 may then perform the commanded actions simultaneously and the next communication with the server 111 can provide the status of all the commanded actions. Alternatively, the sever 111 may store the command action requests and transmit each of the commands sequentially. The server 111 will transmit each command to the mobile device after the prior command has been completed. In an embodiment, the server 111 transmits all commands to the mobile device 101 together. The device 101 processes them in order of transmission, waiting for a given command to be completed before moving on to the next. The sequence and conditions for performing the commands can be configured in any manner.

Figure 3:
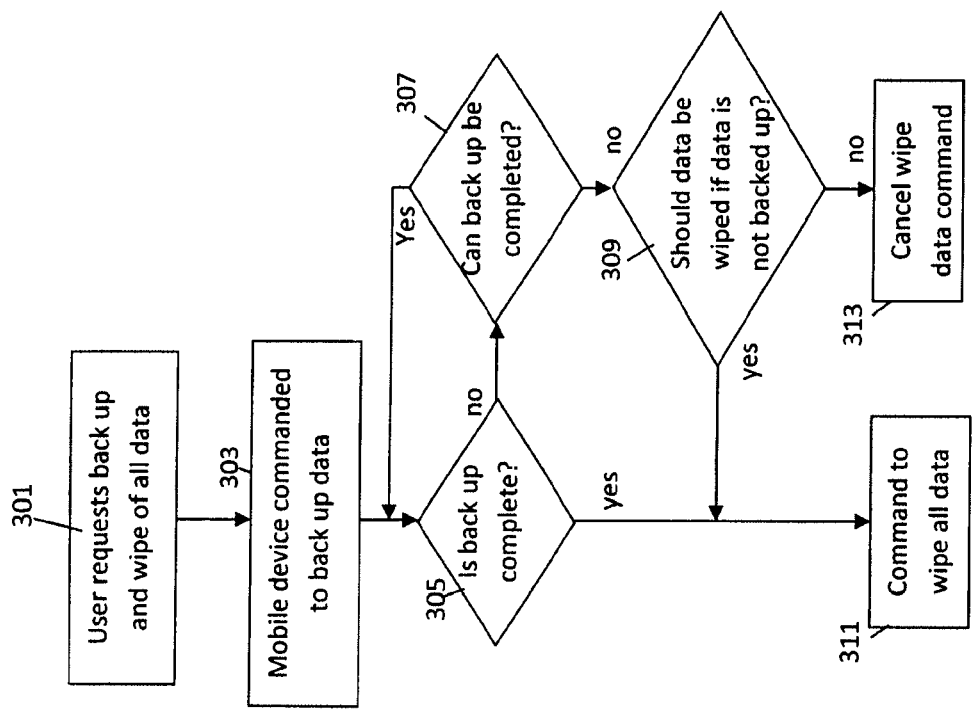
FIG. 3 illustrates a flow chart for conditional commands performed on the mobile device.

In some cases, a failure to complete a command will cause the system to stop subsequent commands. For example with reference to FIG. 3, a user who has lost a mobile device will first want to backup the data stored on the mobile device memory and then wipe all data from the memory after the backup is performed. The user can use the remote access web page to request a backup and secure wipe of all data on the mobile device 301. The server commands the mobile device to back up all stored data 303. The system will monitor the progress of the backup command 305. If the backup is successful, the mobile device memory will be wiped 311. However, if the backup fails, the system analyzes the command status to determine if the backup can be completed 307. If the backup can be completed, the system will continue to monitor the backup progress 305. If the backup cannot be completed, the system can transmit a request to the remote access web page asking the user if the data should be wiped if the backup cannot be completed 309. The system processing can be performed by either the remote device or the server. The user can then choose to cancel the wipe command 313. If a recent backup does not exist, the user may want to make further attempts to find the mobile device before erasing the memory. Alternatively, the user can confirm the wipe command and the server will command the mobile device to wipe all data from the mobile device 311. This may be an appropriate choice if the mobile device data was backed up recently and very little data would be lost. In an embodiment, the server automatically chooses whether or not to perform the wipe depending on factors including the last backup time or pre-chosen settings. In an embodiment, the mobile device automatically chooses whether or not to perform the wipe. While one specific example of conditional command processing has been described, various other commands can be processed in a similar manner.

B. Communications

With reference to FIG. 1, specific communication protocols are used between the server 111 and the local software component 175 on the mobile device 101 to facilitate secure communications. In a preferred embodiment, commands can be sent both from the server 111 to the client 101 and from the client 101 to the server 111. The connection uses a standardized transport protocol such as HTTP to transmit data in both directions. The connection may use a security layer such as TLS (Transport Layer Security) or SSL (Secure Sockets Layer). Because HTTP is composed of request and response pairs, in order to support a persistent connection, multiple request and response pairs are strung together. A protocol such as SyncML is used on top of the HTTP layer to structure the information exchanged between the mobile device 101 and the server 111 and manage the logical session that is composed of the individual HTTP request and response pairs. More information about SyncML can be found at http://www.openmobilealliance.org. The mobile device 101 will initiate a connection whenever it has commands to send to the server 111 or when the server 111 indicates that it has commands to send to the device 101. The device 101 continues sending HTTP requests to which the server 111 responds while either the mobile device 101 or server 111 have outstanding commands.

Figure 4:
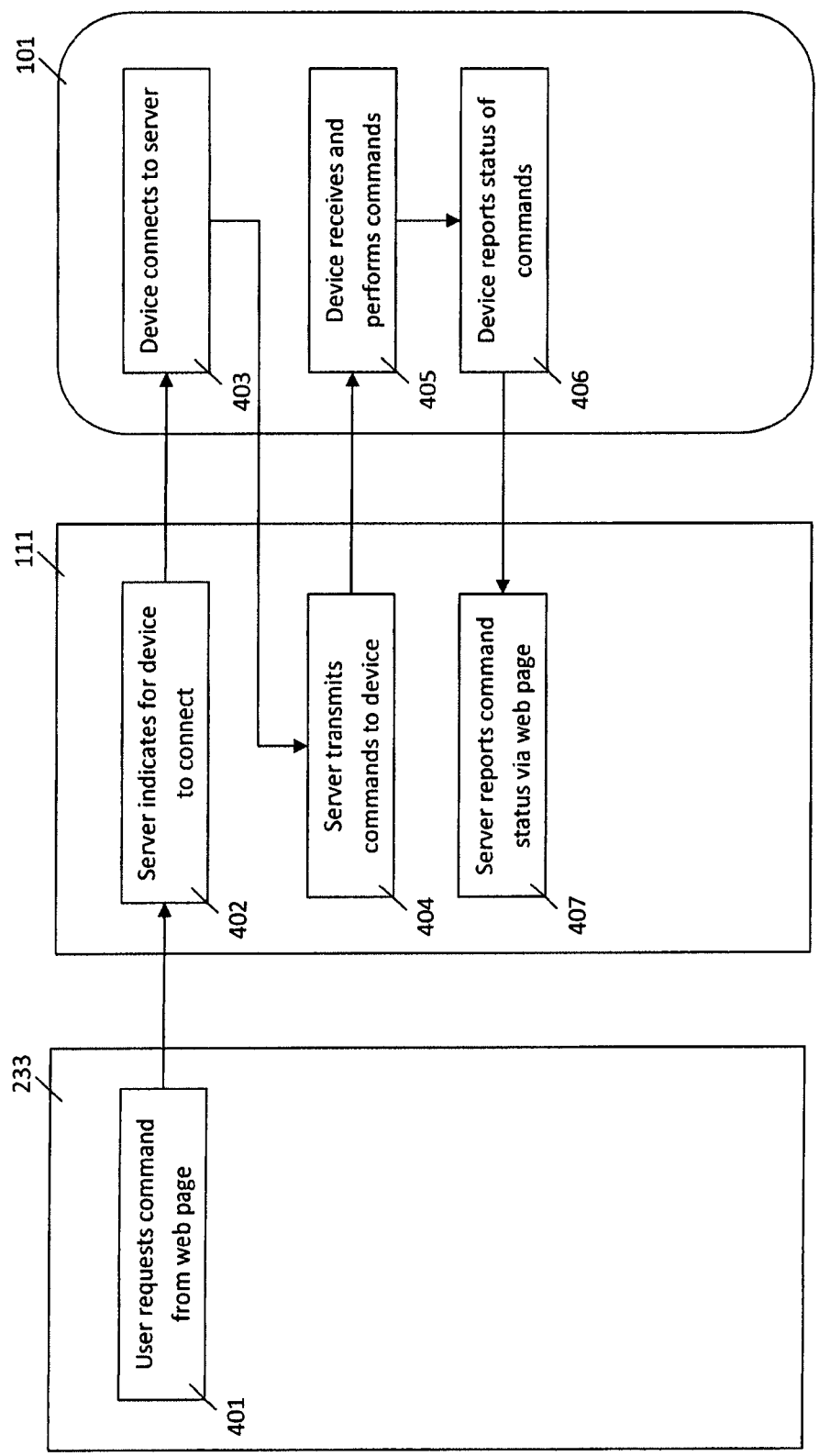
FIG. 4 illustrates a flow chart for communicating with the mobile device.

With reference to FIG. 4, when the client computer 233 requests a command for the mobile device 101 from a web page generated by the server 111, the client computer transmits the request to the server 401 and the server transmits an indication message to the device 402. The indication message instructs the mobile device 101 to connect to the server 111. The mobile device 101 responds by connecting to the server 403. The server then transmits the commands to the mobile device 404. The device receives the commands and the local software component 175 interacts with the operating system 113 to perform the requested commands 405. In an embodiment, the local software component 175 also monitors the progress of the requested commands and transmits command progress reports back to the server 111 that indicate the status of the commands 406. The server interprets the reports and displays the command status on the web page viewed by the client computer 407.

In an embodiment, one or more commands can be transmitted from the server 111 to the mobile device 101 in a secure short message service (SMS) protocol. The local software component 175 interprets SMS packets and verifies that they came from an authorized source. In an embodiment, the protocol uses digital signatures to authoritatively identify the source of an SMS packet, sometimes called a protocol data unit (PDU). In an embodiment, the protocol uses an encryption scheme such as public key encryption to prevent the contents of PDUs from being seen by unauthorized parties. If a PDU is found to be from a trusted source, the mobile device 101 performs any requested commands present in the PDU. The local software component 175 monitors the command progress and transmits the status reports to the server 111 using the secure SMS protocol. Alternatively, the local software component 175 may report the status back to the server using an HTTP based protocol, such as has been described above. In order to overcome the limitations of SMS PDU length, multiple SMS PDUs may be reassembled to transmit large commands.

Of course, it is understood to one of ordinary skill in the art that the device 101 and the server 111 may be configured to communicate in ways other than those directly described in this disclosure to perform the functionality of the inventive system. Such additional manners of communication include using different transport protocols (e.g. TCP instead of HTTP), using different structured data formats (e.g. JSON instead of XML), using different indication mechanisms (e.g. XMPP instead of SMS), and other changes that do not meaningfully alter the functionality or functions provided by the present invention.

1. Indication

Figure 6:
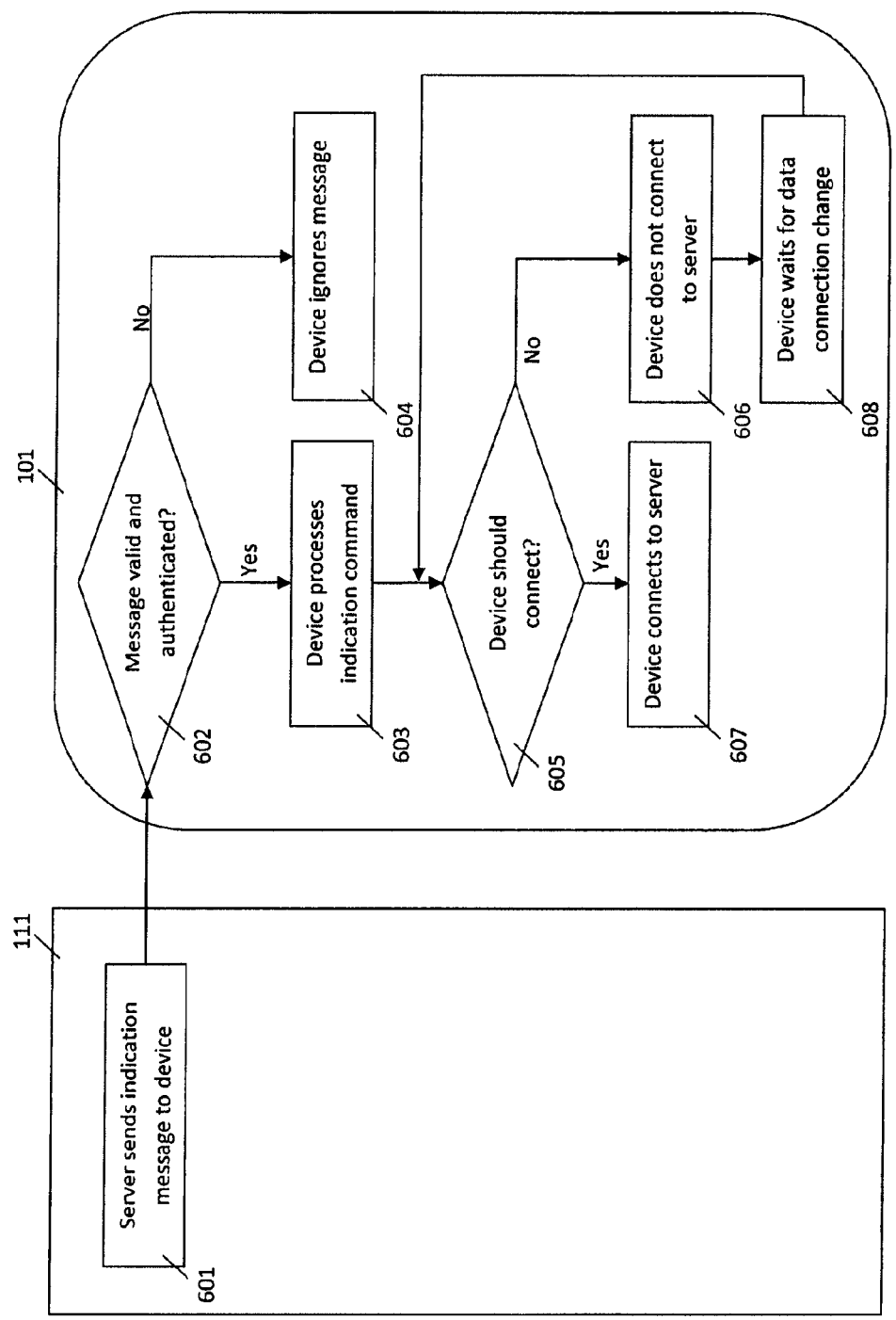
FIG. 6 illustrates a flow chart for indicating to the mobile device via a messaging service that the server has remote access commands for the device.

In an embodiment with reference to FIG. 6, the server 111 indicates to the mobile device 101 that there are one or more commands waiting to be sent from the server 111 to the device 101 by utilizing a push messaging service such as SMS. When the server wishes for the mobile device to connect, it sends an SMS message to the device's phone number with an indication command and an authentication token that is known only to the server and mobile device 601. The mobile device receives the SMS message and checks to see if it matches a pre-defined indication command format and checks for the presence and validity of the authentication token 602. If the command is valid and the token matches, the device will execute the indication command 603. If the message does not match the indication command format, the command is not valid, or the authentication token does not match, the message is ignored 604. In an embodiment, the indication command contains a priority code which tells the mobile device 101 how important any commands waiting to be sent on the server 111 are. The device decides whether or not to connect to the server depending on the priority reported by the server and cost of data transfers for its current connection 605. If the mobile device is out of its home coverage area and network data transfers are expensive, the device does not connect to receive low priority commands 606; however, if the server has a high priority command, such as one corresponding to a wipe request, the device will connect to the server through any means necessary without regard to cost 607. While one example of conditional connection has been described, the invention can be configured to connect based on various other criteria. In an embodiment, if the device does not connect to the server, it will wait until its data connection changes 608, and then decide if it should connect again 605. In an embodiment, the indication command contains a message identifier which is used to correlate SMS messages sent by the server 111 with SMS messages received by the device 101. The message identifier is reported to the server when a command exchange session using a protocol such as SyncML is started as a result of an indication message. The correlation allows the server 111 to identify non-reception of SMS messages by the device 101. Non-reception may be indicative of a network or phone configuration problem. By identifying such problems automatically, the problems can be corrected before the lack of SMS reception prevents indication messages from being received by the device 101 in the case of a missing device.

Figure 7:
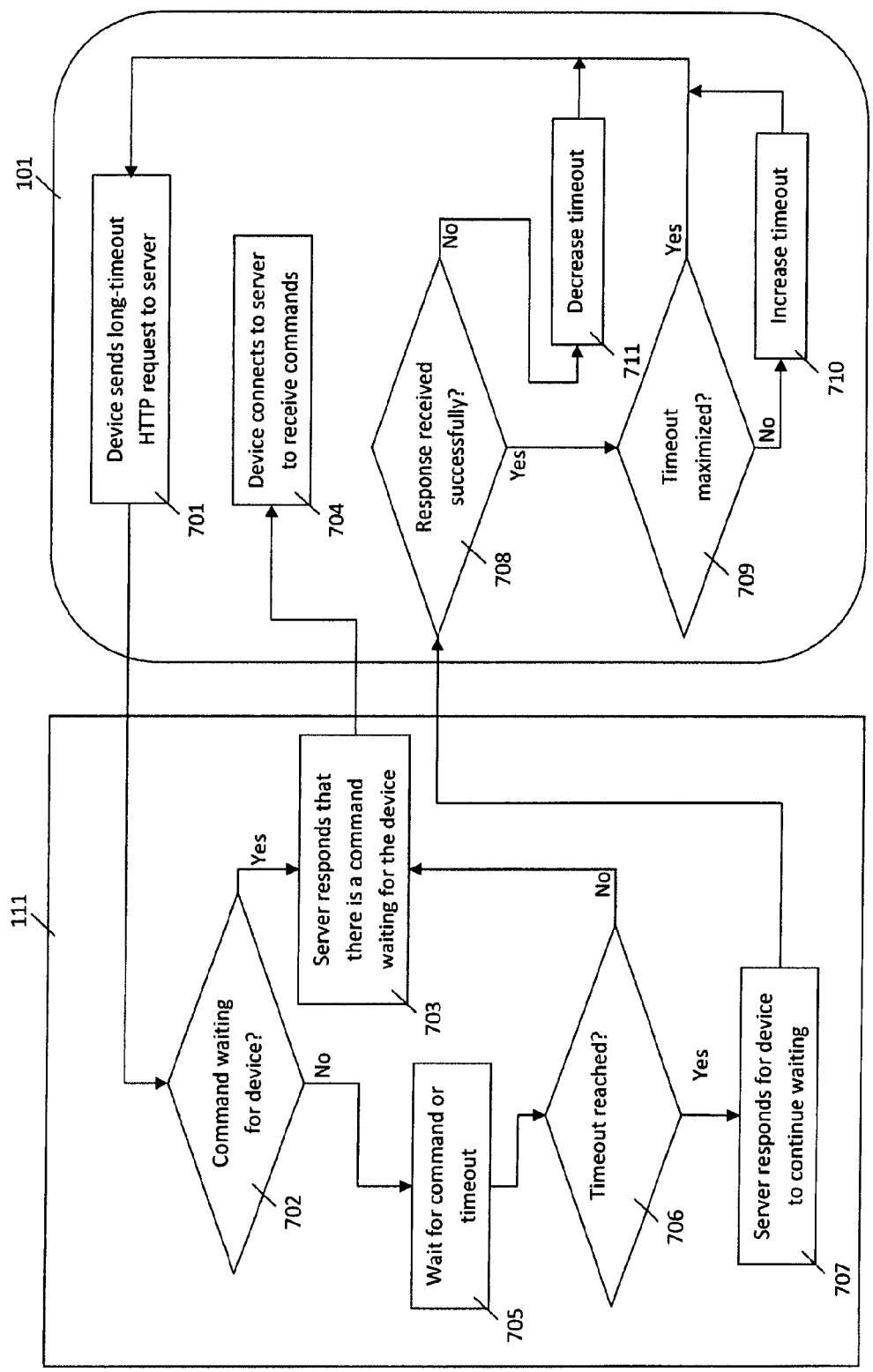
FIG. 7 illustrates a flow chart for indicating to the mobile device via a long-timeout HTTP connection that the server has remote access commands for the device.

In an embodiment with reference to FIG. 7, the server 111 indicates to the mobile device 101 that there are one or more commands waiting to be sent from the server 111 to the device 101 by utilizing a long-timeout HTTP connection. The mobile device 101 transmits an HTTP request to the server 701. The request contains the response timeout, the maximum time the server may wait before returning a response. The request also contains authentication information that identifies the device to the server. The response timeout can typically range from 1 to 60 minutes. The server checks to see if there are any commands waiting on the server to be retrieved by the device 702. If there is at least one command waiting for the device, the server transmits an HTTP response to the device indicating that there is a command waiting to be retrieved 703. When the device receives this message, it connects to the server to retrieve any waiting commands 704. If there are no commands waiting to be retrieved by the device, rather than responding immediately, the server waits for a command to become ready to be retrieved by the device for up to the maximum timeout specified in the request 705. When the timeout has been reached or there is a command on the server waiting to be retrieved by the device, the server decides what type of response to return to the device 706. If there is a command waiting to be retrieved by the device, the server will respond to the outstanding HTTP request before the maximum response timeout is reached, telling the device to connect to the server 703. If the maximum response timeout is reached without the server having a command ready to be retrieved by the device, the server responds and instructs the mobile device to continue waiting with another long-timeout HTTP request 707. The mobile device will then transmit a new long-timeout HTTP request to the server 701. Because an HTTP request is always outstanding, a secure persistent connection exists between the server 111 and the mobile device 101. In order to minimize the impact on the mobile device's battery life and reduce the amount of network traffic, a maximal response timeout is desired. In an embodiment, the mobile device dynamically adjusts the response timeout. After sending a long-timeout HTTP request to the server, the device waits up to that maximum timeout for a response from the server 708. If the device does not receive a response within the specified response timeout or the device determines that the HTTP connection has been closed without it having received a response, the device decreases the response timeout for the next request 711. If the device receives a response successfully that indicates that there are no commands waiting to be retrieved by the device on the server, the device increases the response timeout for the next request 710. In an embodiment, the device determines a maximum timeout by increasing the timeout on subsequent requests until a request's response is not received successfully. The maximum timeout is the highest response timeout that completes successfully. If a response is received successfully, the timeout is not increased if the timeout is already maximized 709. Microsoft's DirectPush is an example of a mobile device long-timeout HTTP request system that automatically adjusts the response timeout based on success or failure of requests. (http://technet.microsoft.com/en-us/library/aa997252.aspx)

In an embodiment, the server uses a messaging service to notify a server thread that is waiting for a command to be ready to be retrieved by the device. Example messaging services include RabbitMQ (http://www.rabbitmq.com/), ActiveMQ (http://activemq.apache.org/), ejabberd (http://www.ejabberd.im/) and other messaging or event systems that may be used to notify a server thread about a command being ready to be retrieved. When the server receives a long-timeout request from a device, the thread processing the request registers with the messaging service to receive command-ready events for the device. If another action on the server, such as the user requesting an action via the remote access web page causes a command to be queued to be sent to the device, the server sends a message via the message service notifying the thread processing the long-timeout request. In an embodiment, threads processing long-timeout requests process multiple requests simultaneously in an event-driven fashion. An example library used to provide this functionality is libevent (http://monkey.org/~provos/libevent/).

In an embodiment, long-timeout HTTP requests and responses used to indicate that the server 111 has commands to send to the device 101 are separate from the SyncML HTTP requests and responses. In an alternative embodiment, SyncML HTTP requests use a long timeout to allow the server 111 to send commands to the device 101 without relying on a separate indication system. In this embodiment, the server does not respond with an indication that commands are ready to be retrieved by the device. Instead, the device's request is a SyncML request, and the server's response is a SyncML response containing any commands needing to be sent to the device. In a further embodiment, two SyncML sessions between a device 101 and server 111 can exist. One of the sessions uses long-timeout requests and is dedicated to commands sent from the server 111 to the device 101. Because the server holds the HTTP request open, a client cannot send commands through this session until the server returns a response. A second session is dedicated to commands sent from the device 101 to the server 111. HTTP requests and responses for the second session do not use long timeouts and are only sent when the device 101 has commands to send to the server 111.

2. Connection Robustness

If the mobile device 101 cannot connect to the server 111, it will attempt to reconnect and try sending the latest message in the session again. By automatically reconnecting and resuming a session, the mobile device 101 can tolerate connection outages, a frequent occurrence on mobile networks. The ability to tolerate network failures without having to restart a session allows the system to successfully operate on networks which would otherwise be unusable for large data transfers. For example, if a device is backing up a large file, the file may be broken up into multiple chunks and sent to the server over multiple requests.

If the device's network connection is interrupted while it is transmitting a request to the server, the software on the device reconnects to the network and retries the failed request. Because the session is able to continue, the device does not need to restart sending the file to the server and can resume immediately after the last successfully transmitted chunk. As the session does not depend on a given network connection, the mobile device can lose its network connection, change its IP addresses, or have other connectivity issues and still resume its session with the server.

Figure 8:
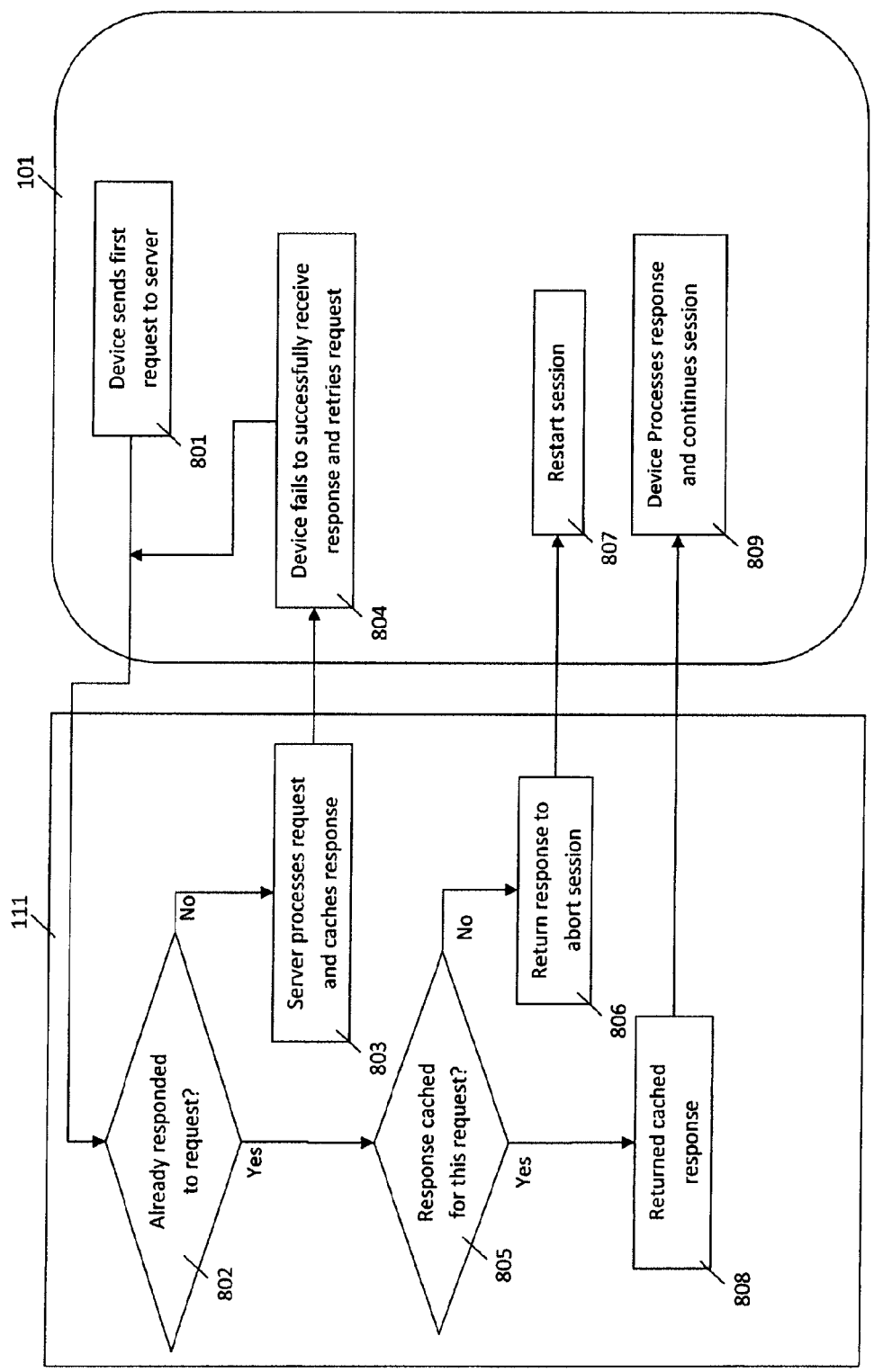
FIG. 8 illustrates a flow chart for caching responses to a request from the device.

In the case where the device's network connection is interrupted while it is receiving a response from the server, the device will retry the request associated with the failed response. In an embodiment, the server will recognize that it has already received the original request and signal for the device to abort its session, not processing the duplicate message. In an alternative embodiment with reference to FIG. 8, the server caches its latest response in the given session so that it may recover from the device failing to receive a response. The device sends a request to the server 801. The server checks to see if it has already responded to the request in the current session by checking the message identifier and session identifier of the request against data stored in a database 802. The database contains the last message identifier and session identifier the server has responded to. If the request has the same message identifier and session identifier as is stored in the database, the request has already been responded to. If the server has not responded to the request (i.e. this is the first time that the client has successfully transmitted this request to the server), the server processes the request, caches the response, and returns the response to the device 803. When caching the response, the server stores the response data, the hash of the request (using an algorithm such as SHA-1), and identifiers such as the session identifier and the message identifier of the request. If the device fails to receive the response, it will retry sending the request to the server 804. After receiving the retried request, the server checks that request's identifiers against the data stored in the database 802. Because the session identifier and message identifier match the last request responded to, this request has already been responded to. The server checks to make sure that the retried request is exactly the same as the request corresponding to the cached response by comparing the hash of the retried request to the hash of the request corresponding to the cached response 805. If there is no cached response available for the message identifier and session identifier or if the hash does not match, the server returns a response indicating for the session to abort 806. The device receives this abort response and attempts to restart the session 807. If there is a cached response for the request available to the server, the server returns the cached response to the device 808. The device processes this response and continues the session without interruption 809. In an embodiment, the server expires cached responses after a given period of time or upon certain events, such as a device becoming disabled or stolen, to prevent stale data from being transmitted by the server to the device. In an embodiment, the server expires cached data in a least recently used manner. In an embodiment, the server only stores a cached response for the last received request in an active session. To store the cached data, the server may use an in-memory caching system such as memcached (http://www.danga.com/memcached/).

3. Device Management System Integration

Figure 9:
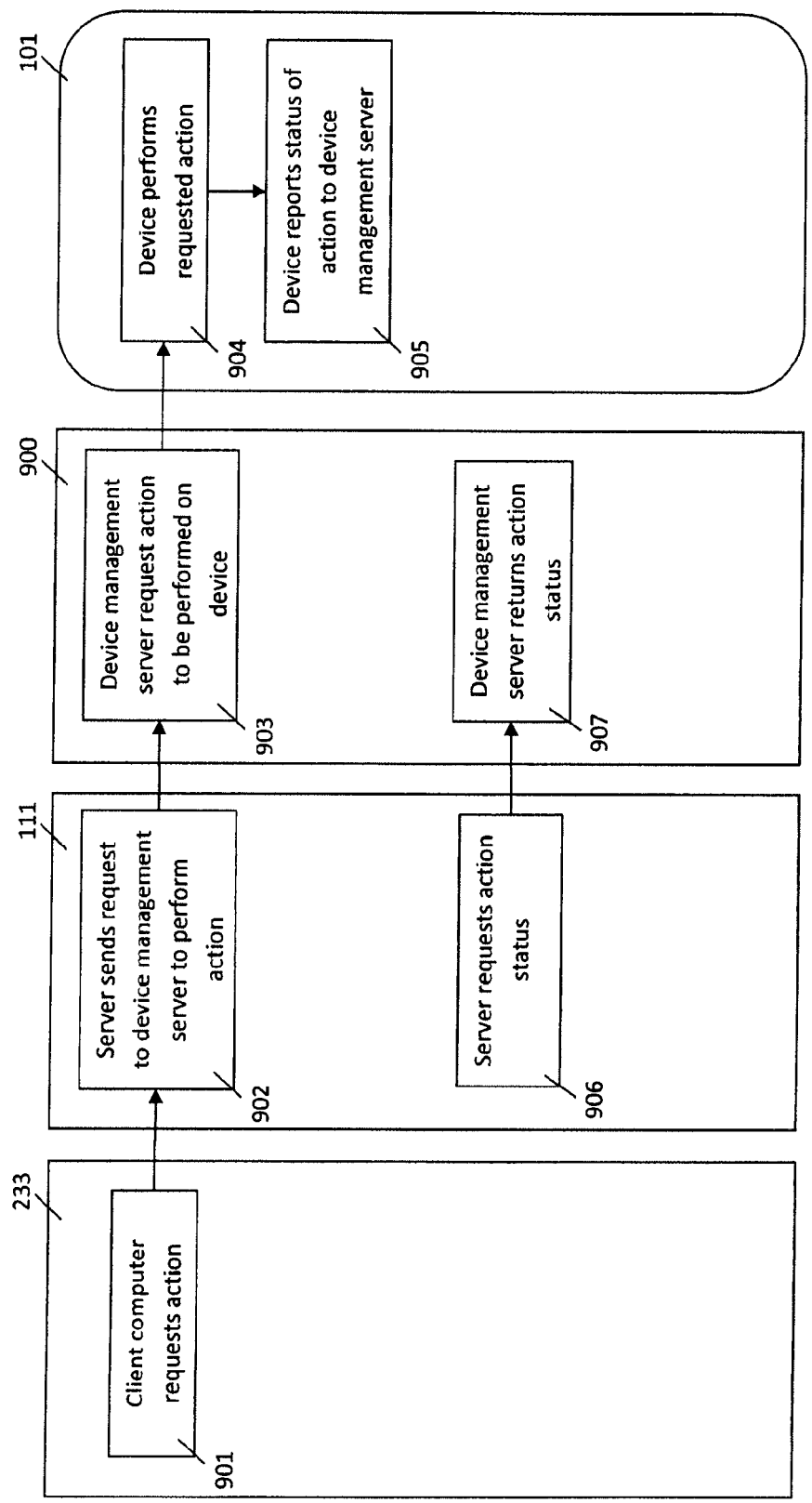
FIG. 9 illustrates a flow chart for communicating with a device management server to perform an action on the device.

For some devices or some types of device deployments, it is not ideal or not possible for the server to directly send commands to software on the mobile device. In an embodiment with reference to FIG. 9, the server 111 communicates with a device management server 900 which has the ability to perform remote actions on a device 101. Because device management systems are often coupled to a specific type of mobile device, the present invention is a centralized way to remotely access multiple types of mobile devices even if each only supports a certain type of management system. In an exemplary embodiment, the server 111 communicates with a device management server 900 using an HTTP API. When the client computer 233 requests for the server to perform a remote action on a device 901, the server receives the request from the client computer and sends a request to the device management server for the device to perform the action 902. The device management receives the request from the server and uses its internal method of contacting the device and inducing the action 903. The device receives the request from the device management server and the device performs the action 904. The device then returns the status of the action to the device management server 905. The server may subsequently query the device management server for the results of the remote action request 906. The device management server returns the current status of the remote action request 907.

If a device management server 900 does not have an API that can be used by the server 111 to perform remote actions, a component 1000 may be installed on the device management server 900 to allow communication with the server 111. In an embodiment, the inventive system includes the component 1000, sometimes called a plug-in or connecter, that can integrate with the device management server 900. The component 1000 can be used to gather information about a device, command actions to be performed on a device, get status about a previously issued command, enumerate what devices a given device management server manages, and perform other actions desired for operation of the present invention. Depending on various factors such as the security requirements and network architecture pertaining to the device management system, the component 1000 may either connect to the server 111 or be connected to by the server 111. Each action performed on a device must be authenticated so that only authorized parties can access the functionality provided by the component 1000 and only authorized receivers can receive commands from the server 111. The authentication process may include sending a shared secret key, a challenge-response system, a public-key system, or any other technology that can be used for authoritative authentication. The connection may use a public-key system such as TLS to provide encryption and authentication. TLS may be used for authentication of both participants in a connection when used with client certificates. If TLS is used without a client certificate, only the identity of one party can be asserted. In this case, TLS may be combined with other authentication mechanisms to provide mutual authentication.

Figure 10:
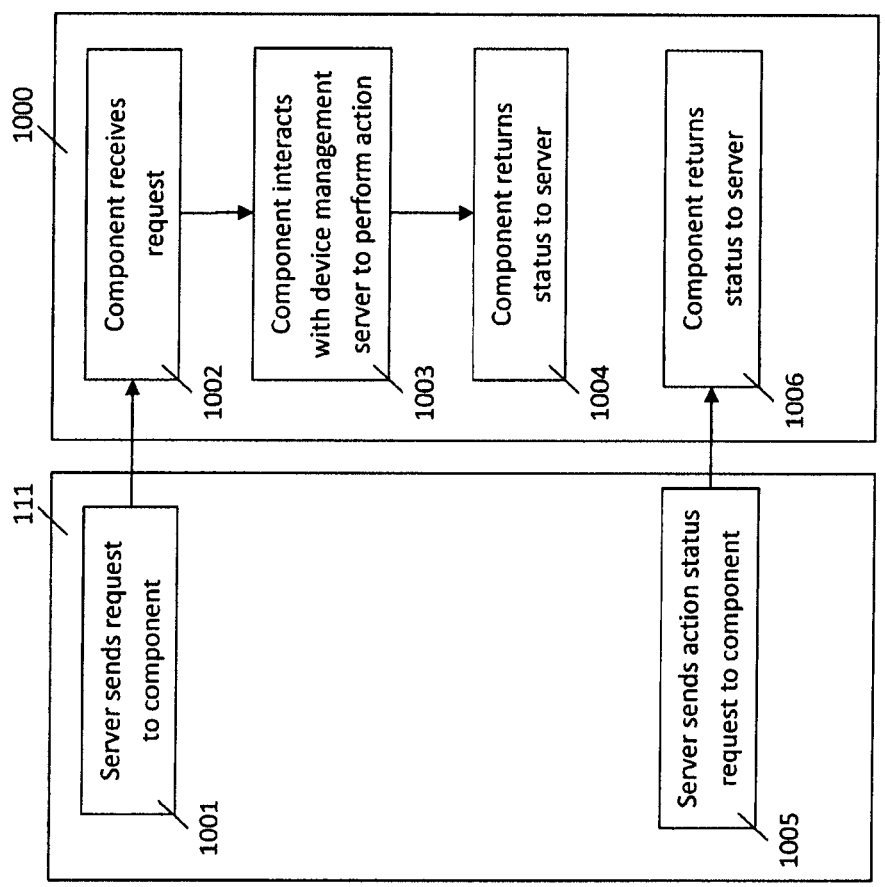
FIG. 10 illustrates a flow chart for the server connecting to a component to perform an action on the device.

In an exemplary embodiment with reference to FIG. 10, where the server 111 connects to the component 1000, the component 1000 exposes its API by acting as an HTTP server. When the server has an action to perform on the device managed by the device management server, the server initiates an HTTP request to the component 1001. To verify the authenticity of both parties, TLS is used. The component 1000 supplies a server certificate and server 111 supplies a client certificate so that both parties may mutually authenticate. Alternatively, the authentication process can use any of the methods defined above. Once the connection is established and mutually authenticated, the server completes its HTTP request to the component. The component receives the request 1002 and interacts with the device management server to perform the action on the device 1003. The component returns status as to whether or not it was able to successfully request that the device management server perform the action on the device 1004. At some point in the future, the server sends another request to the component querying the status of the action 1005. The component returns information pertaining to the progress of the command such as whether it was successfully completed or not 1006. If the command is still pending, the server periodically continues to request status from the component.

Figure 11:
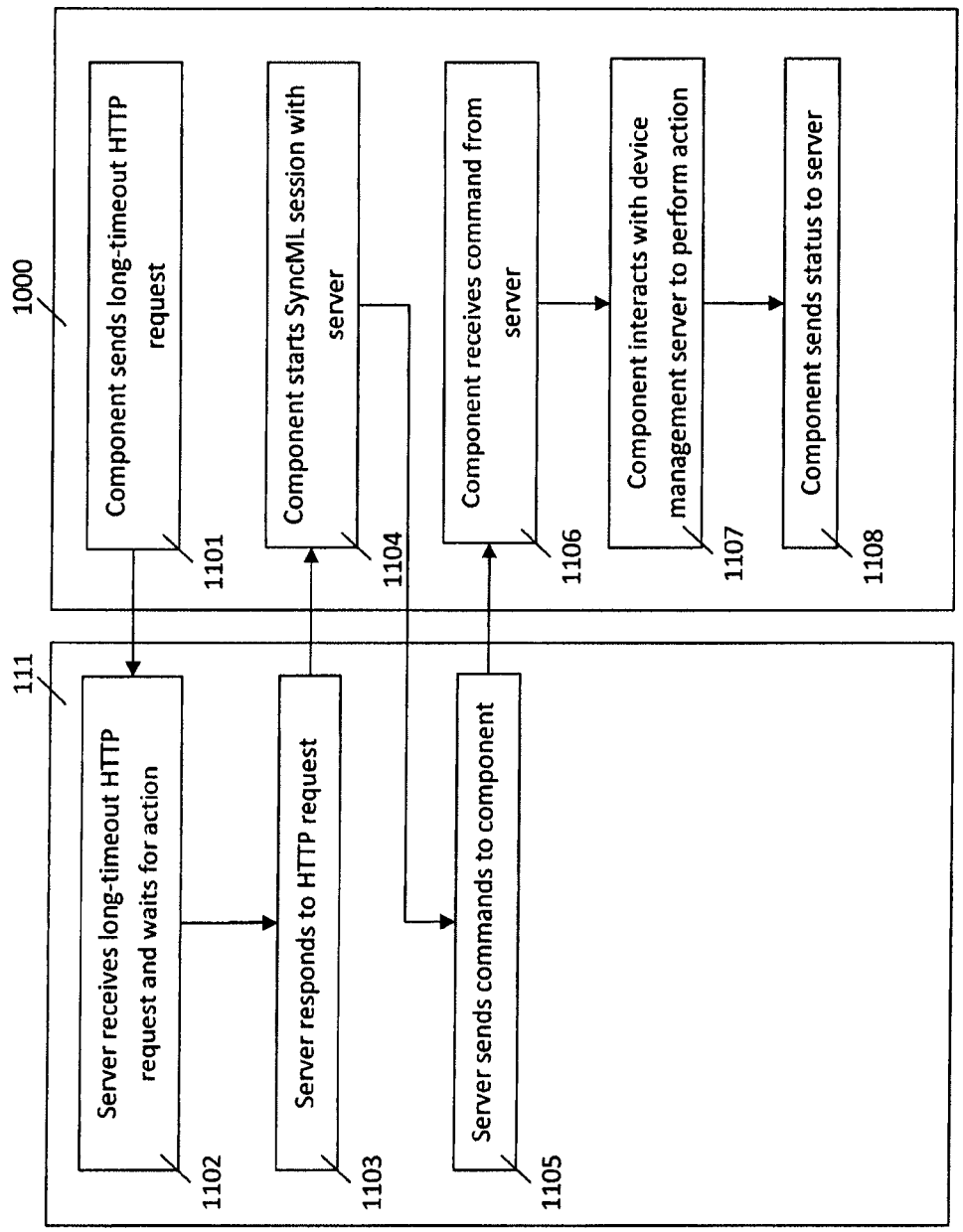
FIG. 11 illustrates a flow chart for a component connecting to the server to perform an action on the device.

In an exemplary embodiment with reference to FIG. 11, when the component 1000 connects to the server 111, the component exposes its API by acting as an HTTP client and connecting to the server. The component uses a SyncML protocol over HTTP to communicate with the server. Ordinarily, the component keeps a long-timeout HTTP connection open with the server 1101. Both the long-timeout HTTP connection and any other HTTP connections may be encrypted using TLS. The server 111 has a certificate which verifies its identity. The component 1000 supplies authentication credentials to the server with each HTTP request. The server receives the long-timeout HTTP request from the component and waits for there to be an action to be performed on a device managed by the device management server 1102. When the server has an action to perform on a device 101 managed by the device management server 900, the server 111 responds to the long-timeout HTTP request with an indication for the component to connect to the server 1103. The component then connects to the server to start a SyncML session over HTTP 1104. In the SyncML session, the server sends a command to the component 1105. The component receives the command 1106 and interacts with the device management server to perform the action on the device 1107. The component returns status as to whether or not it was able to successfully request that the device management server perform the action on the device 1108. The component sends the command progress to the server until the commands have completed successfully or failed.

In an embodiment, the server is used to remotely access multiple devices. Because each device may be accessible from a different management server, the server is able to select which management server a given device corresponds to and send commands to the appropriate server. The server may choose to send certain commands directly to a device and other commands to a management server which corresponds to the device depending on the capabilities of the device, the local software component on the device, and the management server.

Figure 12:
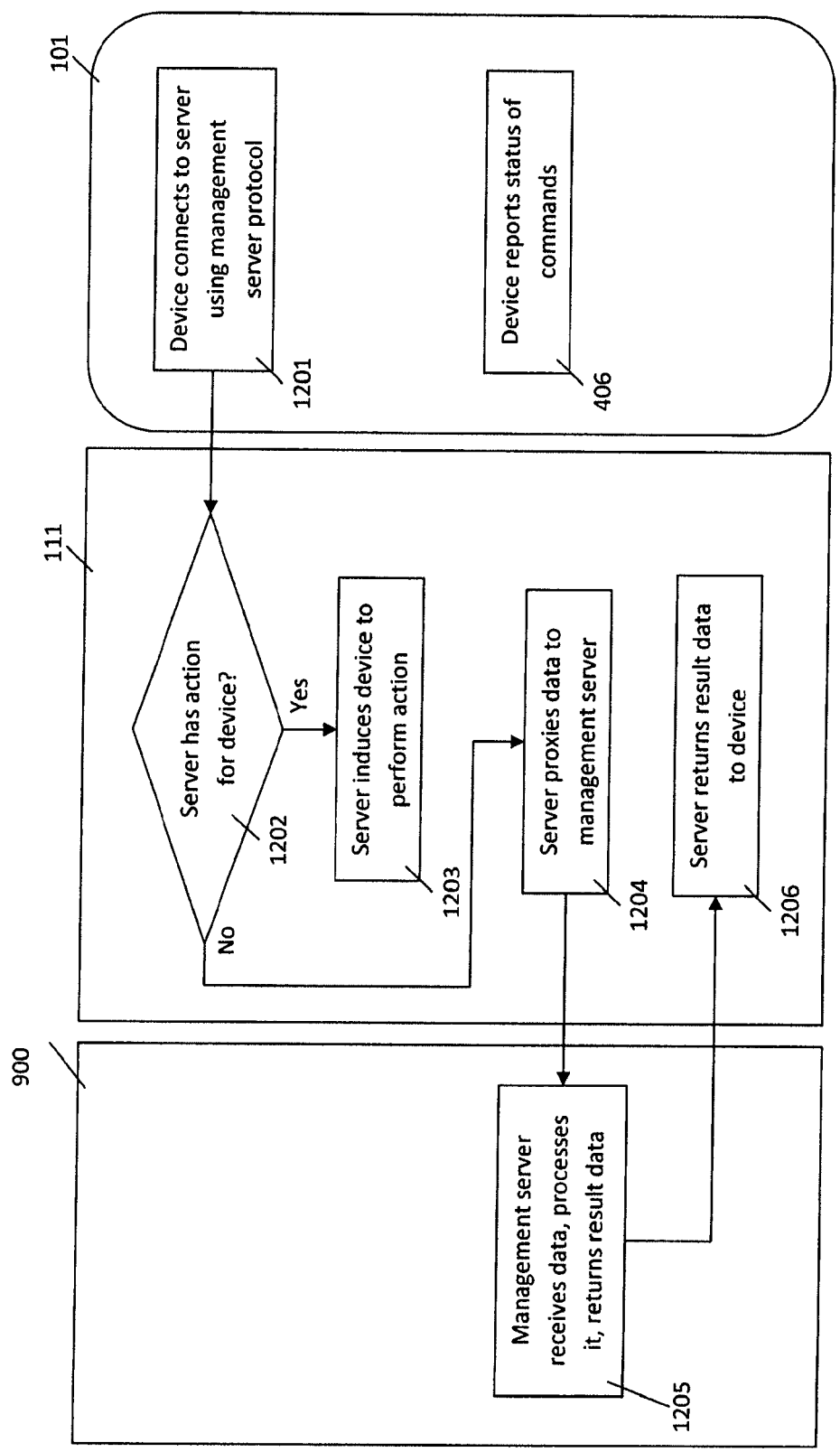
FIG. 12 illustrates a flow chart for the server acting as an intermediary between the device and a device management server.

For some devices or some types of device deployments, it is not ideal or not possible to run a local software component on the device 101. In an embodiment with reference to FIG. 12, the server 111 acts as an intermediary between the mobile device 101 and its management server 900. Without the inventive system, the mobile device 101 directly connects to its device management server 900, such as Microsoft Exchange or Blackberry Enterprise Server. Because an organization may have multiple types of mobile devices and thus multiple management servers, it becomes cumbersome for an administrator to help a user with a lost or stolen mobile device. Furthermore, if an organization only uses one type of management server, and a user loses a mobile device which cannot communicate with that type of management server, the device may not be able to be secured. Instead of connecting directly connecting to its management server, the device connects to the server using its management protocol 1201. The server receives the management protocol data and checks to see if there are actions to be performed on the device 1202. If the server has actions to perform on the device, the server uses the device management protocol supported by the device to induce the device to perform the desired actions 1203. If the server does not have actions to perform on the device, the server proxies the device's management protocol data to the device management server 1204. The management server receives the management protocol data, processes it as normal and returns result data to the server 1205. The server returns the result data returned by the management server to the device 1206. In an exemplary embodiment, the mobile device 101 uses a long-timeout HTTP protocol as its device management protocol. When using the inventive system with the mobile device 101, the mobile device is configured to connect to the server 111 via the device management protocol 1201. When there are no actions for the device 1202, the server proxies the request from the device to the management server 1204. The management server will wait up until the maximum timeout specified in the request before returning data to the server 1205. The server then returns the response from the management server to the device 1206. If the server has an action for the device while the management server is waiting to return a response, the server will respond to the device's request and close its connection with the management server, even though the management server did not return a response. When there are actions for the device 1202, the server does not proxy the request and instructs the device to execute the action 1203. When finished with sending any actions to the device and receiving any associated status information, the server returns to normal, proxying requests and responses between the device 101 and the management server 900. In an embodiment, there is no device management server 900, and the server 111 acts as a device management server 900 and does not proxy requests.

4. Push Service Integration

Figure 13:
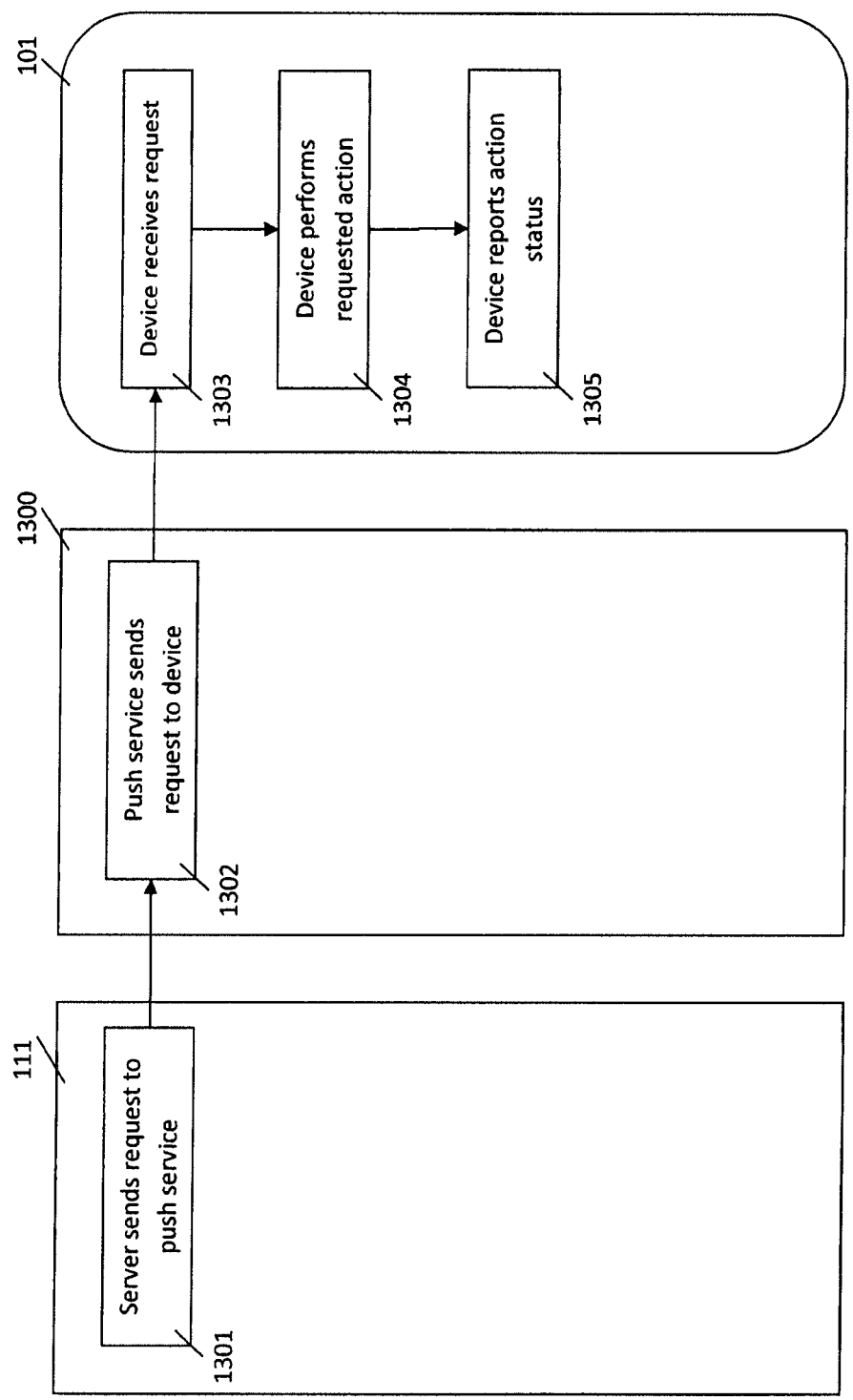
FIG. 13 illustrates a flow chart for the server interacting with a push service to perform an action on the device.

For some devices, it is not possible or not desirable to run software in the background which is able to receive connection indications from the server 111 or to connect to the server 111 periodically. Such devices may allow the server 111 to request that an indication be pushed to the device 101 via a push service 1300 provided by the device's manufacturer, service provider, or other party. In an embodiment with reference to FIG. 13, the server 111 uses this push service 1300 to indicate for the device 101 to connect to the server 111. The server first sends a request to the push service requesting that an application be launched on the device 1301. The push service sends a request to the device instructing the device to perform the requested action 1302. The device receives the request 1303 and launches the application specified in the request 1304. Launching the application causes the device to connect to the server using an HTTP based protocol to send and receive commands and responses. In an alternative embodiment, the push service 1300 allows the server 111 to directly request that actions be performed on the device 101. In an example, the push service 1300 allows the server 111 to wipe the device 101, play a sound on the device 101, and lock the device 101 directly through the push service 1300 without requiring software on the device 101 to connect to the server 111 to receive commands after receiving an indication. The device sends a request to the push service for the device to perform an action 1301. The push service sends the request to the device 1302. The device receives the request 1303 and performs the action 1304. After the device performs the requested action, the device reports the status of the action to the push service 1305. The server connects to the push service 1300 to receive the status of the requested actions. Alternatively, the push service 1300 connects to the server 111 to inform it of the status of the requested actions.

For actions indicated by a push service 1300 which report small amounts of data back to the server 111, such as retrieving location-related information from the device 101, it may be desirable to use an HTTP request/response API instead of a persistent session protocol such as SyncML layered on top of HTTP. In an embodiment, the push service instructs the device to perform an action such as gathering location-related information 1302. After receiving the request 1303 and gathering the location-related information, the device connects to the server using HTTP and posts the location-related information along with authentication information to the server in a structured data format such as XML or JSON 1304.

C. User Interface and Functionality

Figure 5:
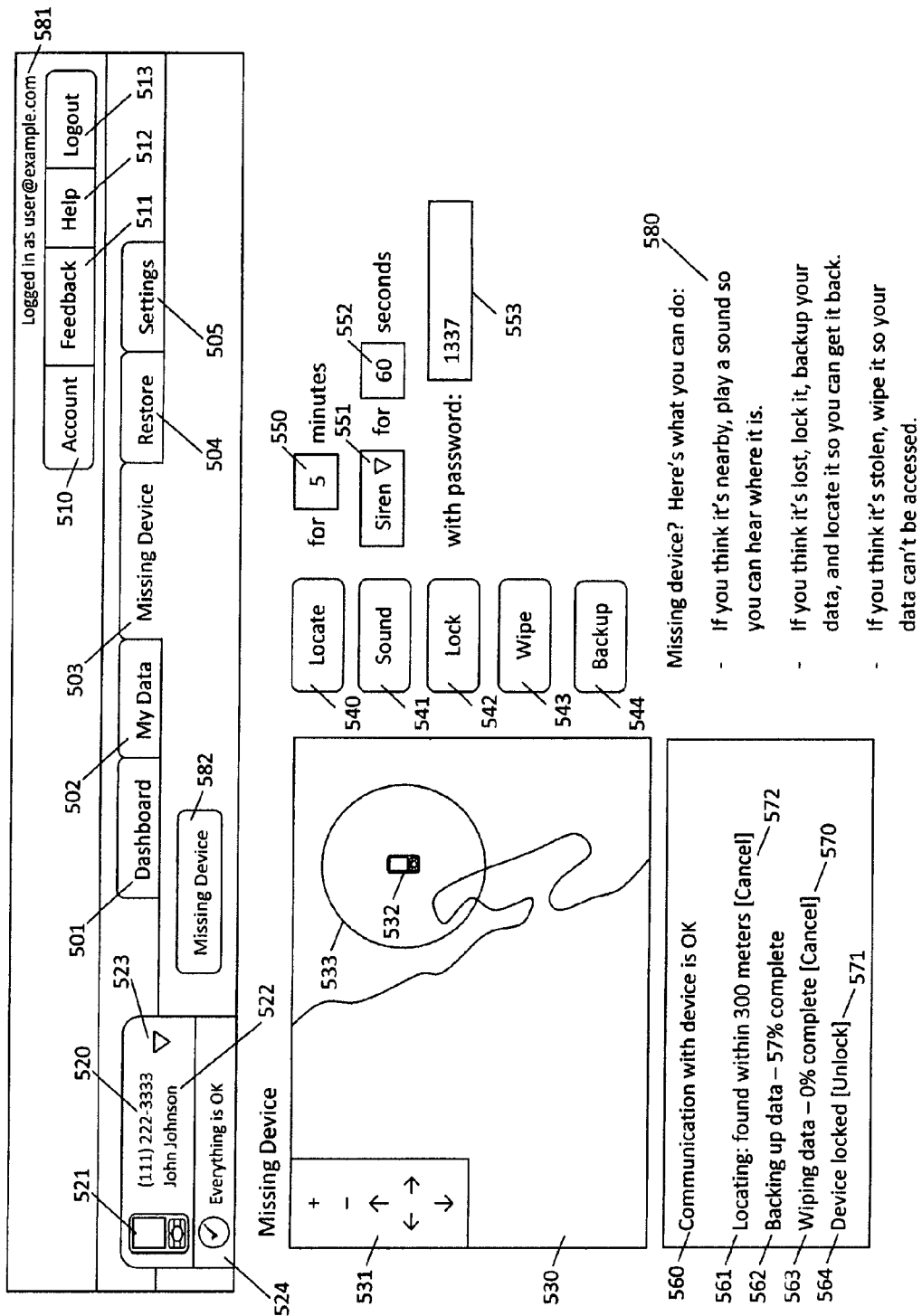
FIG. 5 illustrates an exemplary web page having a GUI with remote access controls for the mobile device.

With reference to FIG. 5, an exemplary mobile device remote access web page is illustrated. The web page provides general management and assistance functionality. The user may click Account 510 to view or change their account details, Feedback 511 to comment on the functionality of the system, Help 512 to get assistance with the functionality provided by the system, and Logout 513 to log the user out of the system. The currently logged-in user is identified on the web page 581. A currently selected device is identified by its phone number 520 and name 522. The identity of the selected device is graphically illustrated by a picture of the device if the server can identify the model of the device 521. The status of the currently selected device is also indicated 524. In this example, the status 524 informs the user that "Everything is OK". If there were a security or other problem with the device, the status 524 would indicate the severity of the problem. The currently selected device may be changed by pressing the change device button 523 and selecting a different device. The change device button 523, when clicked, shows a dialog with some or all of the devices accessible by the user. When the user selects one, that device becomes the currently active device.

The web page provides several tabs each displaying different information and controls relating to the currently selected device. The primary remote access controls for recovering and securing a lost or stolen device are on the "Missing Device" tab 503 of the web page. The user can utilize functionality provided by the present invention by clicking on other tabs which include "Dashboard" 501, "My Data" 502, "Restore" 504, and "Settings" 505. For example, clicking "Dashboard" 501, allows the user to view an overview of the security and status of the currently selected device. Clicking "My Data" 502 allows the user to view the device's backed up data which may include types such as: pictures, videos, documents, audio, call history, SMS messages, contacts, web favorites, settings, programs, and other data. Clicking "Restore" 504 allows the user to restore data backed up from the currently selected device to that device or another device. "Settings 505" allows the user to view and change settings associated with the currently selected device. For example, the user may set the frequency and schedule of backups, the types of data backed up, and the connection preferences associated with backups. Connection preferences may include only backing up while connected to the server via Wi-Fi or a cellular network where the device is not "roaming". Various other settings can be made through the system, including settings for Anti-Virus, Attack-Protection, Firewall, and other functionality relating to the currently selected device.

In this example, the missing device web page contains one view 582. The web page can also be configured to contain multiple views. For example, the functionality provided by the present invention may be split into multiple views that are accessed by separate documents requested from the server or dynamically displayed elements in a document. Thus, the displayed web page is intended to represent various different possible dynamic displays and not be limited to a static web page display. In an embodiment, when the user clicks on an element in a web page which represents selecting a new view, the client computer requests a document from the server to dynamically change appropriate elements on the page to display the new view being selected. In an alternative embodiment, when the user clicks on an element in a web page which represents selecting a new view, the client updates the visual display of the page with data already loaded by the client computer. In an alternative embodiment, when the user clicks on an element in a web page which represents selecting a new view, the client requests a document from the server to load an entirely new page on the client computer.

In this example, the user selected the "Missing Device" tab 503. The web page displays suggestions for finding and securing the phone based upon the circumstances in which the phone was lost 580. The user can select any of the desired remote access commands including: locate the device 540, play a sound from the device 541, lock the device 542, wipe the device 543, and backup the device 544. This listing of commands is exemplary only, and is not intended to recite all commands that are the subject of the present invention. The user clicks buttons corresponding to the desired actions which causes the action to be performed. Upon clicking a button corresponding to an action, the web page may display a dialog box which requires the user to confirm the action or supply additional information. The dialog box allows the inventive system to prevent accidental actions which could be harmful if done unnecessarily. In this example, some actions have additional options which may be configured by the user. Locate, for example, allows the user to select for how many minutes to locate the device 550. After the server begins attempting to perform the action, its status is displayed. If the device has not yet started the action, it may be cancelled 570. While an action is being performed, the web page may disable the button corresponding to that action until the action is finished.

1. Location

The web page also includes a map 530 that shows the physical location of the mobile device. In an embodiment, the mobile device obtains location-related information and transmits this information back to the server which displays the mobile device location on the map 530. The location-related information can be data from a GPS receiver on the mobile device or any other type of location detection mechanism, including but not limited to Wi-Fi access point signal information, cell-tower signal information, and other radio signal information. The mobile device location is indicated as an icon 532 on the map 530. The location action may be initiated manually from the remote access web page or automatically by the device or server.

To locate the device, the user clicks on the "Locate" button 540 to request current location-related information from the mobile device. The locate command can be terminated by clicking on the cancel button 572. After receiving the location request, the server transmits a command to the mobile device requesting location-related information. The mobile device receives the location-related information command, obtains the location-related information and transmits the location-related information back to the server. While the device is obtaining location-related information, it may report its progress to the server. The location-related information may include the physical location of the device or data that must be further processed to obtain the physical location. The location-related information may also include accuracy information regarding the physical location or other data reported to the server. The web page displays the status of the mobile device location detection 561. The web page indicates that the system is "locating." The location status will be reported or displayed as "locating" while the location information is being reported by the device, "location unknown" when the location retrieval fails, or "done locating" when the location has finished. If the device reports accuracy information, the map has a zone of confidence 533 around the estimated location to inform the user of the region the device is expected to be within. Such a zone may be represented as a circle around the estimated location. The server may also display multiple locations transmitted by the device to show the movement of the device over a period of time. The multiple locations displayed on the map may show the time the device was at the location and/or display a line connecting the location points in chronological order. In an embodiment, the server can send a command to the device for the device to report location-related information to the server for a period of time. The user may specify the duration of the location on the remote access web page 550. During the time period of the location request, the device periodically sends updated location-related information to the server. To protect user privacy, location information sent by the device and stored on the server may be discarded after a period of time.

The user can use pan, zoom in and zoom out controls 531 to alter the scale and boundaries of the map 530 to display the mobile device icon 532 in the desired manner on the map 530. For example, the user can use the display commands 531 to zoom in on the map 530 so that the user can more easily identify the streets and addresses in the proximity of the mobile device. The location information can be useful in determining if the mobile device is lost or stolen. In an embodiment, the user may input addresses or coordinates of locations known to the user such as the user's home, office, or known areas associated with the user such as schools and houses of friends and relatives. A location can be defined by recording the coordinates through the mobile device or by entering the location manually. A location's area can be defined by specifying a radius around a given location's coordinates. The system may identify these locations on the map 530 and if the mobile device is detected to be within any known location areas, the system may identify the location by name. If the system detects that the mobile device is located in an area unknown to the user this information may suggest that the mobile device is stolen and data on the mobile device may be at risk.

It may be desirable to automatically change the security policy of a device depending on its location or send a notification if the device enters or leaves a given area. This functionality may reduce risk by setting a lenient security policy while at an office environment and a strict security policy while outside of the office. Additionally, this functionality may help proactively identify lost or stolen devices before the device is reported missing by its user. In an embodiment, the device periodically sends location-related information to the server. The server processes the information and compares the device's location to a set of location areas pertaining to the device. If the device is in a location area that pertains to a specific security policy, the server sends a command for the device to change its security policy. If the server is configured to notify the user if the device leaves a given location area, the server will send an email notification describing the device having left the given location area. If the server is configured to notify the user if the device enters a given location area, the server will send an email notification describing the device having entered a given location area. If the device's location is not known with extreme accuracy, the device's presence or absence in a given location area may be determined by the probability of a device being in a given area given its current location and the uncertainty of that location. In an alternative embodiment, the device's comparison of its current location to known locations for purposes of notifications policy changes, or other actions may be performed on the device. In this case the server may also be notified of any location-related changes or notifications.

If a device is lost, it is a significant problem if its battery runs out before one or more remote actions have been performed to secure or recover the device. In an embodiment, the device automatically sends its current location-related information to the server when the device's battery is low. If the user later decides to attempt to locate the phone, but the battery has run out, the server displays the last known location on the remote access web page. In an embodiment, the device automatically sends its current location-related information to the server on a periodic basis. The user may configure the time interval by which the device transmits location-related information to the server. If the user decides to locate the phone, but the device is unable to communicate with the server for any reason, the server displays the last known location on the remote access web page.

If there are multiple types of location systems available on a device, it may be desirable to wait for a more accurate system such as GPS or Wi-Fi to return location-related information instead of returning the first available, yet usually less accurate, cell-tower location-related information. It is also desirable, however, to have a location quickly, even if it is less accurate than one that may take more time. The processing of information from these various location systems is described below. In an embodiment, the device utilizes multiple systems which provide location-related information to get the most accurate information available at a given time during the course of a location request. When the device receives a command to locate itself for a period of time, it starts one or more available systems which may be able to provide location-related information. During the period of time that the device has been requested to send location-related information to the server, the device will periodically send the most recent data available from one or more location information systems. In an example, the server requests for a device which has GPS and a mobile network radio to send location information for 5 minutes. When the device first receives the command, it attempts to use GPS and the device's mobile network radio to retrieve location-related information. Because GPS has to acquire satellite signals, it may take several minutes before an accurate location is available. The device's first report to the server contains only cell-tower location-related information. If, before the next report is sent to the server, GPS has acquired a fix, the device will send both GPS and cell-tower information to the server. The device will continue periodically sending reports containing available location-related information until the location time period is finished.

While GPS is often the most accurate location system, there are various situations, such as when the device is indoors or in an urban area, when GPS cannot obtain an accurate fix. Other location systems are desirable when GPS is not available or is waiting to acquire a fix. Because wireless infrastructure stations such as Wi-Fi access points and cellular network towers transmit identifiers that are usually globally unique, the identifiers and associated signal characteristics detected by the mobile device can be used to estimate the location of the device. In an embodiment, when the server requests that software on the device gathers location-related information, the software on the device retrieves identification and signal information for nearby Wi-Fi access points and cellular network towers and their associated signal characteristics detected by the mobile device. For each Wi-Fi access point, the device reports the access point's BSSID to identify the access point and the device's received signal strength for that access point to characterize the signal. For a nearby cell-tower, the device reports different information depending on the cellular network type. For example, in GSM-based networks, the device may report a cell tower's mobile country code (MCC), mobile network code (MNC), location area code (LAC), and cell id (CID) to identify the tower along with the timing advance and signal strength to characterize the device's connection with that tower. For example, in CDMA-based networks, the device may report a cell tower's mobile country code (MCC), system ID (SID), network ID (NID), and billing ID (BID) to identify the tower along with the signal strength to characterize the device's connection to the tower. For CDMA, GSM, and other networks, there may also be additional parameters such as the absolute signal level, the signal level relative to noise, and the bit error rate reported depending on the software and hardware present on the device. If information regarding multiple cellular network towers is available, the device may report information for each cell tower to the server for increased accuracy.

If the device has a built-in location mechanism, such as one provided by the network operator, device manufacturer, or other party, the software on the device may use the built-in location mechanism alone or in conjunction with other location systems. In an embodiment, when the software on the device receives a command from the server to report location-related information, the device initiates a request to the built-in location mechanism to retrieve the device's location. When the built-in location mechanism returns a location, the software on the mobile device reports it to the server. While the built-in location mechanism is determining the device's location, the software on the device may use GPS, Wi-Fi, or cell-tower location systems as well in order to maximize the speed and accuracy of location-related information.

Figure 14:
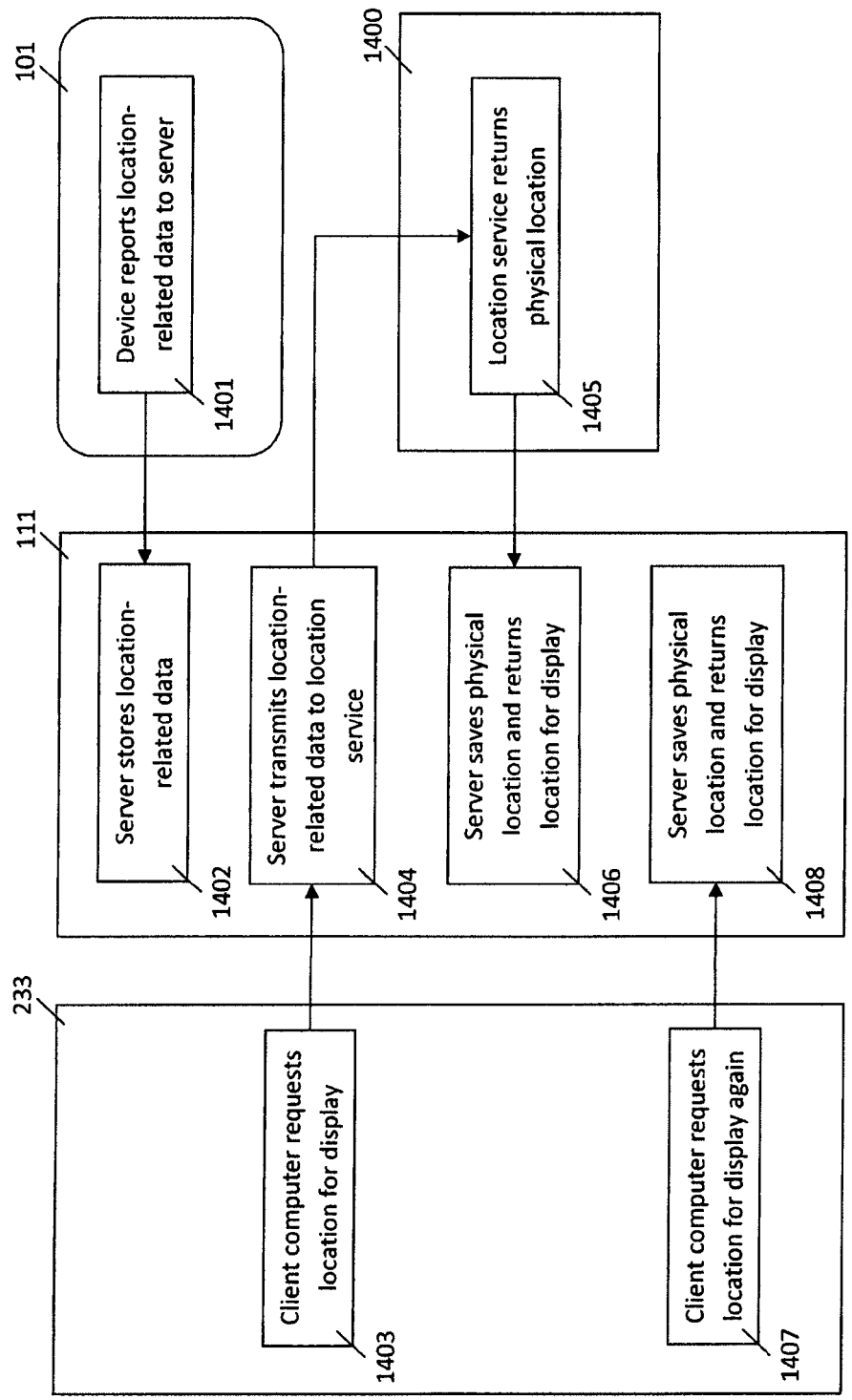
FIG. 14 illustrates a flow chart for interacting with a location service to provide the physical location of the device.

In the case of GPS or the device's built-in location mechanism, the device 101 directly reports the physical location and associated data to the server 111. In the case of Wi-Fi, cell-tower, or other similar location systems, the device 101 reports information to the server 111 which must be processed to determine the physical location of the device. In an embodiment with reference to FIG. 14, the server 111 utilizes an external location service 1400 which is accessible via an HTTP API to estimate the device's location based on one or more location systems. When the device reports location-related information to the server 1401, the server stores the information in a database 1402. The next time the client computer 233 requests to display the location reported by the device 1403, the server contacts the external service using its HTTP API and transmits some or all of the location-related information provided by the device 1404. In order to transmit this information, the server may need to process the information and transform it into a format compatible with the external service API. When the external service returns the physical location of the device 1405, the server saves it in a database and returns the location to the client computer for display on the web page 1406. Because the physical location output by the external service is stored in the database, the next time the client computer requests that location from the server 1407 and the device has not reported any new location-related information, the server returns the location from the database 1408 and does not need to request the same location multiple times from the external service. If the third party service returns simply location coordinates, the remote access web page displays the estimated location on a map. If the service also returns an interval of confidence, the server stores the interval of confidence, and the remote access web page displays a confidence region on the map. If the service returns an address or description of the estimated device location, the server stores this data, and the remote access web page also displays that information.

In addition to or instead of using an external service to determine the physical location of the device from location-related information that does not directly specify the device's physical location, the server may use various systems to estimate the physical location of a device. These systems may require a database of known location information relating to Wi-Fi access points and cell-towers. The database can include locations of cell-towers and associated identifiers, locations of Wi-Fi access points and associated identifiers, cellular network signal characteristics at known physical locations, and other similar information. In an embodiment, the database is used to prepare or train a fuzzy system, neural network, or other system which may be used to estimate the location of a device. When the server needs to determine the location of the device, the system is already prepared and requires minimal computational power to estimate the device's location. In an additional embodiment, the server may estimate the device's location based on its proximity, as determined by signal strength or other signal characteristics, to one or more items in the database with known locations. In an embodiment, when the device sends location-related information to the server, the server sends a portion of the database corresponding to an area around the device's current location to the mobile device. The device can perform location processing without having to communicate with the server while it is in the area corresponding to the selection of the database. When the device moves out of the area, it can request a selection of the database corresponding to the new area from the server.

Mobile device location is an important part of the present invention. Providing the owner of the lost or stolen mobile device with accurate data about its location allows the owner to make careful decisions about the actions to take with respect to the mobile device security. Some suitable geo-location capabilities that can be used with the present invention are the services provided by Loopt, Inc.; Skyhook Wireless, Inc.; Mexens Intellectual Property Holding, LLC; and Google, Inc. Mexens Intellectual Property Holding, LLC holds U.S. Pat. No. 7,397,434 and True Position, Inc. of Berwyn, Pa. also has a substantial portfolio of issued U.S. patents, of which U.S. Pat. No. 7,023,383 is exemplary, both of which describe and claim a variety of non-GPS based mobile device geo-location techniques.

2. Sound

If the user loses the device and believes it to be nearby, the device can be instructed to emit a loud sound 541. Because many users keep their mobile devices in vibrate-only or silent ringer modes, simply calling the device's phone number is not a practical way to find a nearby missing phone. In an embodiment, upon receiving a command to start playing a sound, the local software component on the mobile device will turn the device's speaker to maximum volume and start playing the requested sound. The mobile device can be configured to stop the loud sound after a predetermined period of time or when the user presses a button on the mobile device. The remote access component on the mobile device can interpret the button actuation as the device being found.

If the user wishes for the device to play a specific sound, the present invention allows the user to choose or record a custom sound which will be played on the mobile device. In an embodiment, the remote access web page allows the user to select a file on his or her local computer to upload to the server. The server re-encodes the uploaded sound into a format which can be played on the mobile device if it is uploaded in a format which is not ideal to be played on the mobile device. In an embodiment, the server allows the user to record a sound on his or her computer to be played on the mobile device. Using a browser add-on such as Adobe Flash, a recording application can be embedded into the remote access web page which allows sound to be recorded and sent to the server. After recording a sound, the user may give the sound a name so that it is identifiable in the future. The server may store sounds uploaded or recorded by the user so that the user can have the device play his or her previously uploaded sounds in the future. The user is given a choice of sounds to play on the mobile device which may include default sounds as well as any uploaded or recorded sounds that belong to the user 551. If the user selects a default sound that is already stored on the device, the server sends a command to play that sound to the device. If the user selects a custom sound or other sound that is not on the device, the server sends a command to play the sound along with the data for the custom sound. In an embodiment, the web page allows the user to control if the sound is played in a loop, and if so for how many times or for how long to loop for 552.

3. Lock

If the user believes that the mobile device is not within audible range and wants to recover it without wiping the onboard data, a lock command 542 may be issued to the device. The lock command 542 deactivates the controls of the mobile device but leaves the stored data intact. In the locked state, functional control based upon the input keys is eliminated except for the ability to make calls to emergency numbers or to enter a password to unlock the device. The mobile device cannot be used to make phone calls (except for calls to emergency numbers), transmit text messages, display information, play media, or perform any other normal mobile device functionality. Because the locked mobile device may not be valuable or useful, a thief or unauthorized user may abandon the mobile device. If the mobile device is retrieved by the owner, the remote access web page can be used to unlock the mobile device to restore the normal functionality. In this embodiment, the user may use the remote access web page to unlock the device 571. The mobile device may also allow the entry of authentication information such as a password to allow the user to unlock the device without requiring access to the remote access web page. In an embodiment, the remote access web page allows the user to select a password which is required to unlock the device when initiating the lock command 553. The password on the remote access web page may be initially populated with a default value.

In an embodiment, the mobile device is configured to display information such as how to contact the owner when the local software component locks the mobile device. The information displayed on the device may include an email address, phone number, or mailing address. Alternatively or in addition, the remote access component on the device may have a method by which someone who finds the missing device can easily call a pre-defined phone number to reach the owner of the device or a recovery service.

4. Backup and Restore

The backup data command 544 causes the mobile device 101 to transmit some or all of its stored data to the server 111 where it is securely stored in a mobile device backup database. The stored data may include documents, pictures, call history, text messages, videos, audio, notes, internet favorites, contacts, calendar appointments, to do list items, applications, settings, credentials, and other data that may be stored on a mobile device. The stored data may be stored on the device's internal memory, a SIM card attached to the device, a removable or non-removable storage card, or any other storage system associated with the mobile device. The backup data stored on the server can be restored back to the mobile device if it is recovered or alternatively restored to a new replacement mobile device if the lost mobile device is not recovered. In an embodiment, the backup system can be set to perform regular backups at set time intervals. Because only some of the stored data may change or be added between each backup, the system may only transfer new data or data that has been changed since the last backup was performed. In an embodiment, the local software component 175 on the mobile device tracks the data that has previously been backed up to the server in a database which is stored on the device. When the backup is requested, the local software component compares information in the database to data stored on the device to determine what changes need to be reported to the server. In an embodiment, the local software component 175 reports the current state of all the data on the mobile device to the server. The server software 117 compares this report to the current data stored on the server and notifies the device which data needs to be backed up to the server. By only backing up data that has changed since the previous backup, the system reduces the amount of time and energy required to perform incremental backups. Because a lost mobile device may have only a limited amount of energy available from its battery, it is beneficial to minimize the impact of performing a backup.

Figure 17:
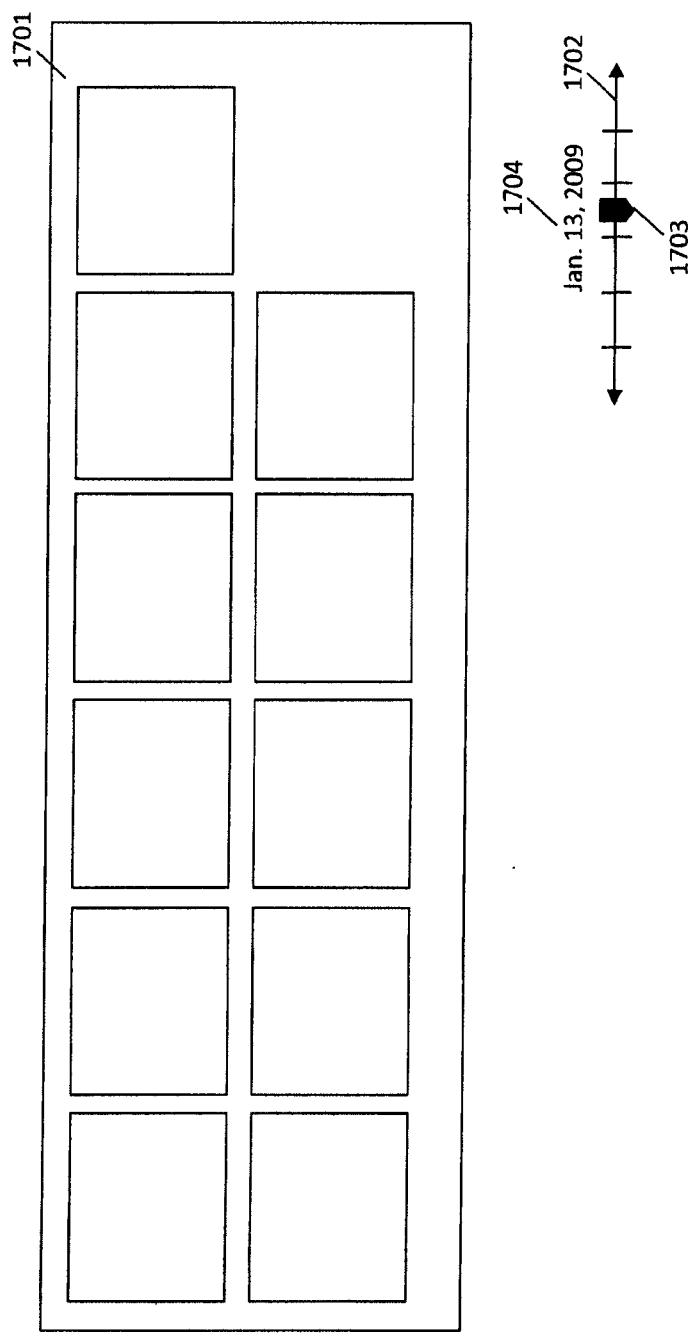
FIG. 17 illustrates a data viewing web page that can be viewed by the device.

To enable the recovery of data that was deleted or overwritten on the device, the server stores past versions of data that are not present on the device. In an embodiment, when the device informs the server that data has been deleted on the device, the server marks the backed up data in the server's database as deleted, but does not remove the data. When the device informs the server that data has been updated or otherwise changed on the device, the server marks the previous version of the data in the database as changed and adds the latest version of the data to the database. In order to efficiently handle multiple versions of data, the backup database on the server stores meta-data relating to the data backed up from the user's device. The meta-data includes the time when the data was first present on the device or was first sent from the device to the server. The meta-data also includes the time when the data was removed or replaced on the device or the time when the replaced data was sent to the server. The combination of the two times allows the server to be able to query the database to determine what data was active on the device at any given time. Any data that the device has not reported as deleted or modified has a started time but no ended time. Data that has been replaced or changed has an associated identifier which can be used to find the next version of that data. In an embodiment with reference to FIG. 17, a data viewing web page generated by the server 111 allows the user to view the data on the device at a given point in time. The data viewing web page visually displays data from the currently selected time period 1701. Individual data items are each represented visually on the web page. The data viewing web page has a user interface control such as a slider or calendar which allows the user to select a date or specific time from which to display the backed up data. The bounds of the time the user interface control is able to select are set to the earliest and latest data present on the currently selected device 1702. When the user changes the user interface control to select a given time 1703, the data viewing web page changes either by reloading or by updating itself by using a technology such as JavaScript or Adobe Flash. The time displayed on the page changes to represent the currently selected slider date 1704. The data viewing web page may allow the user to view a timeline showing when data has been changed, added, or deleted from the device. Changes to data may appear as events on the timeline. The events on the timeline may be shown as a visual representation of the data being changed, added, or deleted. In an example, the visual representation includes a thumbnail icon of the data being changed, added, or deleted. The data viewing web page may allow the user to select a specific data item and view previous versions of that data item. The previous versions may be displayed as a list with each item representing a previous version of the data item. Each previous version may be visually represented with a thumbnail of the data.

Figure 15:
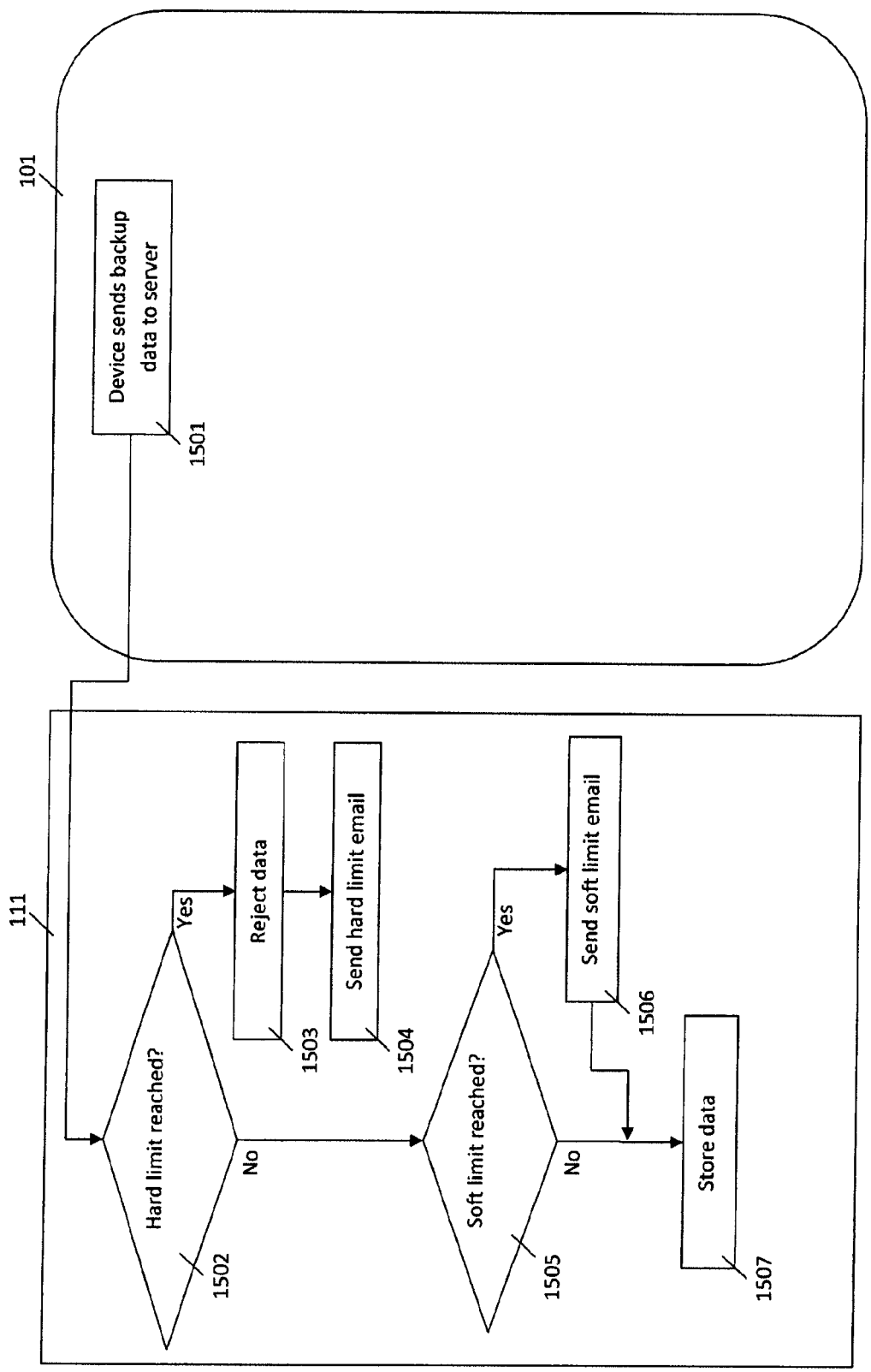
FIG. 15 illustrates a flow chart for enforcing data quota on the server.

In order to ensure that users back up no more than their allotted amount of data, the server may enforce a quota which determines how much data a device or set of devices is allowed to store on the server. In an embodiment with reference to FIG. 15, the data storage quota for a device is defined in terms of total data size and number of data items stored. The device's quota has a soft and hard limit, the soft limit smaller than the hard limit. A quota is considered reached if either the total data size or number of data items stored exceeds a threshold specified for either value. When the device sends backup data to the server 1501, the server checks to see if the device has reached its hard limit of data storage on the server 1502. If the device has more active data being backed up than the server has allocated to the device's hard-limit quota, the server will deny requests to back up the data 1503. In an embodiment, the server sends an email, informing the user that some data from the device cannot be backed up 1504. The email corresponding to reaching the hard limit contains a link which allows the user to increase the data storage quota allocated to his or her device or delete data associated with the device. If the device has not reached its hard limit, the server checks to see if the device has reached its soft limit 1505. If the device has not reached its soft limit, the server stores the data 1507. If the device has reached its soft limit, the server sends an email informing the user that the device's quota has been reached 1506 and stores the data 1507. The email corresponding to reaching the soft limit contains a clickable link to the server which allows the user to increase the data storage quota allocated to the device or delete data associated with the device to bring the device under the soft limit. The email informs the user that the server will automatically remove old data that is not active on the device to make sure that new data can be backed up from the device. If the user does not perform actions to bring the device's data under the quota soft limit after a period of time, the server will automatically remove old data to bring the device's data under the quota limit. This removal process only removes data that has been updated or deleted. Data that is currently present on the device (i.e. active data) will not be removed. The email may show some or all of the data items that will be lost if the user does not bring the device's data under the soft limit before the server begins removing data.

Once the device has backed up data to the server, the server may allow the user to restore some or all of the data that has been backed up to a new device or to the device from which the data originated. When data is restored to a device, the data is sent from the server to the device, with instructions for the device to store the data. In an embodiment, the server can generate multiple web page interfaces by which the user can restore data. In one interface, the user can instruct the server to restore all of the data backed up from one device and active the restoration at a given time to that device or another device. In another interface, the user can instruct the server to restore certain categories of data backed up from one device and active at a given time to that device or another device. In a further interface, the user may view individual pieces of data and select one or more data items backed up from one device to be restored to that device or another device. This individual item restore interface also allows the user to download one or more items stored in an archive such as a ZIP file. In an embodiment, the individual restore interface is integrated into the data viewing web page so that data can be restored while it is being viewed. All of the restore interfaces may allow the user to select a specific time or time period from which to restore active data from. Active data at a given time is data that has been backed up to the server before the given time and considered to be present on the device as of the given time.

The inventive system may allow the user to restore some or all of the data backed up from one device to a different device, even if the target device has a different operating system or has other compatibility differences. In an embodiment, when backing up data, the local software component on the mobile device transforms data from a device-specific format into a universal format. For example, devices which run the Windows Mobile operating system store contact information in a special format. In an exemplary embodiment, the inventive system transforms the data for a contact into a standardized universal XML format. If the universal XML contact data is restored to a Windows Mobile device, the data is transformed back into the native Windows Mobile contact format. If the universal XML contact data is restored to another type of device such as one running the Android operating system, the universal XML contact data is transformed into the native data format supported by that device. Although this example illustrates one data type, all data formats which are not universally supported can be handled by the inventive system. In an embodiment, the server transforms data supplied by the mobile device into a universal format when the data is backed up or when the data is transferred from one device to a device of a different type. In an embodiment, both server-side and device-side transformations can be used if the data transformations would be difficult for a mobile device to perform because of battery, CPU, memory, or other limitations. In an embodiment, transformations are performed by the server to convert data between a first and a second native format when data that has been backed up in the first native format is being transferred to a device which does not support the first native format but does support the second native format.

Figure 18:
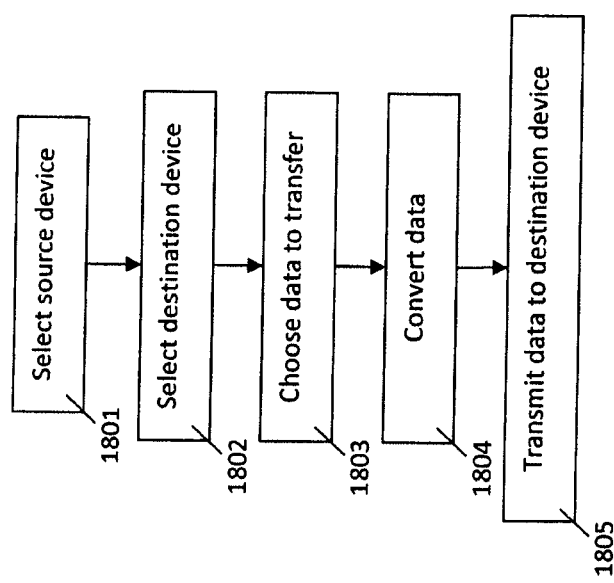
FIG. 18 illustrates a flow chart for transferring data, settings or applications from a source device to a destination device.

In order to facilitate easy migration from one device to another, the server may generate a device migration web page which allows the user to go through a process to transfer data, settings, installed applications, and other information from the user's previous device to the user's new device. This process may also be used to provision a device from a virtual or physical default device so that organizations may easily standardize new or existing devices. In an embodiment with reference to FIG. 18, the process presents to the user a series of steps via the device migration web page that, when finished, result in some or all of the data, settings, or applications from a source device to be transferred to a destination device. First, the server requires that the user identify the source device from which to transfer 1801. The device migration web page contains a list of existing devices associated with the user's account and gives the user the option of adding a new device. If the user installs software on a new device, the process waits for that device to backup its information to the server before proceeding. After the source device is identified by the server, the server presents, via the device migration web page, an interface for the user to select the destination device 1802. The device migration web page contains a list of existing devices associated with the user's account and gives the user the option of adding a new device. If the user chooses to install software on a new device, the process waits for the new device to become active on the server before proceeding. Once the source and destination devices are identified, the server presents to the user, via the remote access web page, an interface for choosing what data, settings, or applications to transfer to the destination device 1803. Once the user has chosen what to transfer, the server queues commands to be sent to the destination device, indicates for the destination device to connect to the server, and transmits the commands to the device when the device connects 1805. In an embodiment, data is converted before it is transmitted to the device 1804. The data may be converted before the commands are queued or after the commands are queued but before the data is transmitted to the device. If the devices run compatible operating systems or the data is in a universal format, the data may be directly transferred without conversion. If the devices run incompatible operating systems, the server may convert the data to make it compatible with the destination device. In an example, if applications are being transferred from the source device to the destination device and the two devices run incompatible operating systems, the application running on the source device would not run on the destination device. The server may reference a database containing application equivalents for different platforms and choose to transfer a version of the application to the destination device that is compatible with the destination device's operating system. If there is not a version of the application available for the destination device, a suitable substitute may be chosen. During the time while the desired information is being sent to the destination device, the device migration web page displays a progress indicator showing the status of the transfer process. When the transfer is finished, the server informs the user, via the device migration web page, that the migration is complete and the destination device is ready to use.

5. Wipe

The user can also instruct the mobile device to wipe the data stored on the mobile device 543. In order to make sure that all of the data on a lost device is backed up before it is wiped, the destruction of stored data may be performed after the mobile device has locked and a backup has been performed. In order to ensure that the data cannot be recovered from the mobile device, the mobile device may write over the entire memory with meaningless data. In an embodiment, the mobile device writes over the memory multiple times to ensure that no residual traces of data are left. In addition to the mobile device's onboard memory, there may be additional components associated with the mobile device which can store data such as removable or non-removable storage devices and Subscriber Identification Modules (often called SIM cards). On storage cards, some mobile devices can store pictures, documents, applications, and other data. On SIM cards, some mobile devices can store contacts, text messages, applications, and other data. In an embodiment, when the mobile device performs a wipe, it erases the data on some or all of the additional components which can store data. If the mobile device is recovered, backed up data can be used to restore some or all of the data that was previously wiped.

6. Other Remote Actions

In an embodiment, the remote access web page allows the user to request that the server instruct the device to record audio from its microphone, video from its camera, or both. The recording may be for a default period of time, the user may specify a time interval to record for, or the user may specify a periodic recording. After the device records audio and/or video, it sends the audio and/or video data to the server. The remote access web page shows recently recorded data uploaded by the device. The remote access web page allows the user to download recorded data as well as view it directly in the web page. In an embodiment, the user may use the remote access web page to stream audio and/or video from the device. Upon receiving a request to stream audio and/or video, the server sends a command to the device which then begins streaming the requested media to a streaming server using a protocol such as RTP (Real-time Transport Protocol). The mobile device encodes the audio and/or video in a compressed format to minimize the data rate required to stream. The remote access web page contains a small application which utilizes a browser component such as Flash from Adobe to allow the user to view the streaming audio and/or video from the device. The streaming server may process the video and/or audio from the mobile device in order to make it compatible with the streaming media display application. In addition, the streaming server may store the streamed audio and/or video from the device for later retrieval by the user. The remote access web page may display previously recorded streams for download by the user.

In an embodiment, the remote access web page allows the user to request that the server instruct the device to take a picture using the device's camera. In an embodiment, the remote access web page allows the user to specify that the device should take pictures periodically at a specified interval. After the device takes a picture, it sends it to the server. The server saves the picture and displays the latest pictures on the remote access web page for viewing or download by the user. The remote access web page may display previous pictures so that the user may view pictures taken by the device over a period of time.

7. Status Reporting

In addition to remote access controls, the remote access web page can provide status information for the requested commands. As discussed, the mobile device transmits reports to the server which indicate the status of commands sent to it. The local software component on the mobile device interprets the commands being sent by the server and reports on the status of the commands. The reports can include the progress of the commands, the completion of the commands and other information pertaining to the mobile device. In an example referencing FIG. 5, the user selected to locate the device, backup data from the device, lock the device, and wipe all data from device. The remote access web page indicates that the server is in contact with the mobile device and communications are OK 560. The mobile device has been locked 564 and the system is 57% complete in backing up data from the device 562. The status of wiping the device 563 is at 0% because the system is waiting for the backup to be completed. The user may stop the wipe by pressing the cancel button 570.

If a device's session with the server is interrupted and not resumed within a given amount of time, the remote access web page will indicate that the communications with the device are lost. The server may automatically attempt to indicate to the device to reconnect or allow the user to request that the server indicate to the device to connect. If the server indicates to the device to reconnect, the remote access web page shows the status of attempts to re-establish communications. When communications are re-established, the remote access web page will again indicate that communications are OK 560 and the remote access commands will resume from the point at which communications were broken.

8. Lost/Stolen Device Functionality

When the device is lost or stolen, it may be desirable for the device to hide the presence and prevent removal of software such as the local software component. In an embodiment, the server can issue a command which puts the device into a lost/stolen mode. When the device is in lost/stolen mode, it may hide any user interface components related to the local software component, prevent removal of the local software component, and report the location of the device and actions performed on the device such as phone calls, text messages, web pages visited, and SIM card changes. The remote access web page may display that the device is lost/stolen. In a further embodiment, the remote access web page displays the location corresponding to the device's location reports on a map and displays a list of the actions performed on the device since it has been in lost/stolen mode. The map may show the location of the device over multiple points in time to convey information regarding movement of the device. In an embodiment, entering lost/stolen mode automatically triggers the local software component on the mobile device to perform certain actions. For example, when in lost/stolen mode, the local software component on the device automatically takes a picture using the device's camera periodically. Alternatively, when in lost/stolen mode, the local software component on the device automatically records audio and/or video from the device. In each case, the device sends data resulting from the automatically performed action(s) to the server. The data is displayed on the remote access web page for view by the user. The remote access web page allows the user to configure what actions, if any, should be performed by the device when it enters lost/stolen mode.

The device may automatically enter lost/stolen mode upon certain events. In an embodiment, the server automatically instructs the local software component on the device to go into lost/stolen mode when the user requests for the server to send a remote access command which is indicative of the device being lost or stolen. Commands such as lock, play sound, locate, wipe, or backup may indicate that the user has lost the device or that the device was stolen. In a further embodiment, the actions configured to be automatically performed when a device enters lost/stolen mode will only be performed as a result of the user explicitly commanding the device to enter lost/stolen mode and not as a result of the device entering lost/stolen mode because the user requested a command that is indicative of the device being lost or stolen. In an embodiment, if the SIM is changed or removed on the mobile device, the device will automatically enter lost/stolen mode and notify the server of the lost/stolen mode state. In an embodiment, the device will automatically enter lost/stolen mode if it is detected to be in a location area that has been pre-defined by the user to put the device into lost/stolen mode. The location area may be defined by selecting an area(s) that the device must stay inside of or by selecting an area(s) that the device may not enter. If the device violates this location area selection requirement, the server automatically puts the device into lost/stolen mode. The user may use the remote access web page to define the location area(s). In an embodiment, the actions configured to be automatically performed when the device enters lost/stolen mode will only occur when the device enters lost/stolen mode as a result of events, such as the SIM being replaced or the device entering the pre-defined lost/stolen location area, occurring.

In an embodiment, the user can use the remote access web page to manually request for the server to instruct the mobile device to turn on lost/stolen mode. When the device is in lost/stolen mode, the user may use the remote access web page to request for the server to instruct the mobile device to turn off lost/stolen mode. In an embodiment, if the device is locked and the user enters valid authentication information such as a password on the device to unlock it, the device will automatically turn off lost/stolen mode and notify the server of the lost/stolen mode state.

When the device enters lost/stolen mode, the server may notify the user or an administrator via an email or other alert. In an embodiment, the email sent to the user when the device automatically enters lost/stolen mode has two links, one with text that corresponds to the user still having possession of the device and another with text corresponding to the user not having possession of the device. If the user follows the link corresponding to not having possession of the device, the server displays the remote access web page for the user to perform any desired actions. If the user follows the link corresponding to having possession of the device, the server turns off lost/stolen mode for the device and informs the device of the lost/stolen mode state. In an embodiment, the server sends the email when the device is in lost/stolen mode and the user has not turned it off after a period of time. In an exemplary embodiment, when the user locks the device from the remote access web page, lost/stolen mode is automatically turned on. If the user does not turn off lost/stolen mode, the server emails the user after a predetermined time period such as 1 hour. After receiving the email, the user may click on the link corresponding to having recovered the device or the user may click the link corresponding to not having recovered the device. If the device has not been recovered, the user may use the remote access web page to wipe the device and prevent any sensitive information on the device from being used for illegitimate purposes.

In an embodiment, the email sent to the user in the case of a device being in lost/stolen mode includes information about how to contact the phone's service provider to prevent fraudulent use of the phone's service. The service provider information may be generated based on information provided by the device during the server's previous communications with the local software component on the device.

When the device is lost or stolen, the user may need a replacement as soon as possible. If the user is traveling or otherwise unable to obtain a replacement device easily, it is advantageous for the system to present the user with opportunities to replace the device. In an embodiment, the email sent to the user in the case of the device being in lost/stolen mode includes offers for the user to purchase a replacement mobile device. In an embodiment, the server generates a device replacement web page that includes offers for the user to purchase a replacement mobile device. The offers may be selected based on the user's current mobile device type, the user's country of origin, the user's previous mobile operator, and other information which is available to the server. In order to provide the user with the best pricing, availability, and delivery time, the system interfaces with third party vendors or the user's mobile operator to determine what offers to present to the user. The device replacement web page allows the user to filter offers by factors such as phone operating system, presence or absence of a physical keyboard, network type, and network operator. In an embodiment, the user provides a location by entering information such as an address, country, or postal code on the device replacement web page. The server interfaces with one or more mobile device vendors to determine options available for the user to obtain a new device nearby the provided location. The server displays a map showing where the user may obtain a replacement device nearby the provided location and optionally, the pricing and availability of different replacement devices. In an embodiment, the server displays estimated or guaranteed delivery times for vendors to deliver a replacement device to the location provided by the user. In an embodiment, the server generates the device replacement web page for a user without an account on the server.

Because both the server software and the local software component can alter the device's state, it is desirable for the local software component to be able to report the device's current state to the server. The state of the device includes whether or not it is locked, whether or not it is in lost/stolen mode, and other state information that may be changed by the server software or the local software component on the device. In an embodiment, the local software component on the device reports state information to the server periodically or upon certain events such as session initiation. In an example, if the device is locked because of a command from the server and the user enters a password directly on the device to unlock it, the server needs to be notified that the device has been unlocked. The next time the device connects to the server, it transmits its state information which updates the device's lock state stored on the server.

If the device cannot communicate with the server, it is possible that the user has commanded the device to enter lost/stolen mode or to perform a remote action but the device does not receive the command. In an embodiment, the local software component on the device automatically locks the device when the device has been out of network coverage for a period of time, the device's SIM is removed or changed, the device has been turned off for a period of time, or upon other events that would render the device unable to receive commands from the server. The device is automatically unlocked once communications are re-established with the server. If the device is locked and trying to communicate with the server, the user may enter authentication credentials such as a password to unlock the device without having connected to the server. The password may be set using a web page generated by the server or via a user interface on the mobile device.

9. Protection from Unauthorized Access

Figure 16:
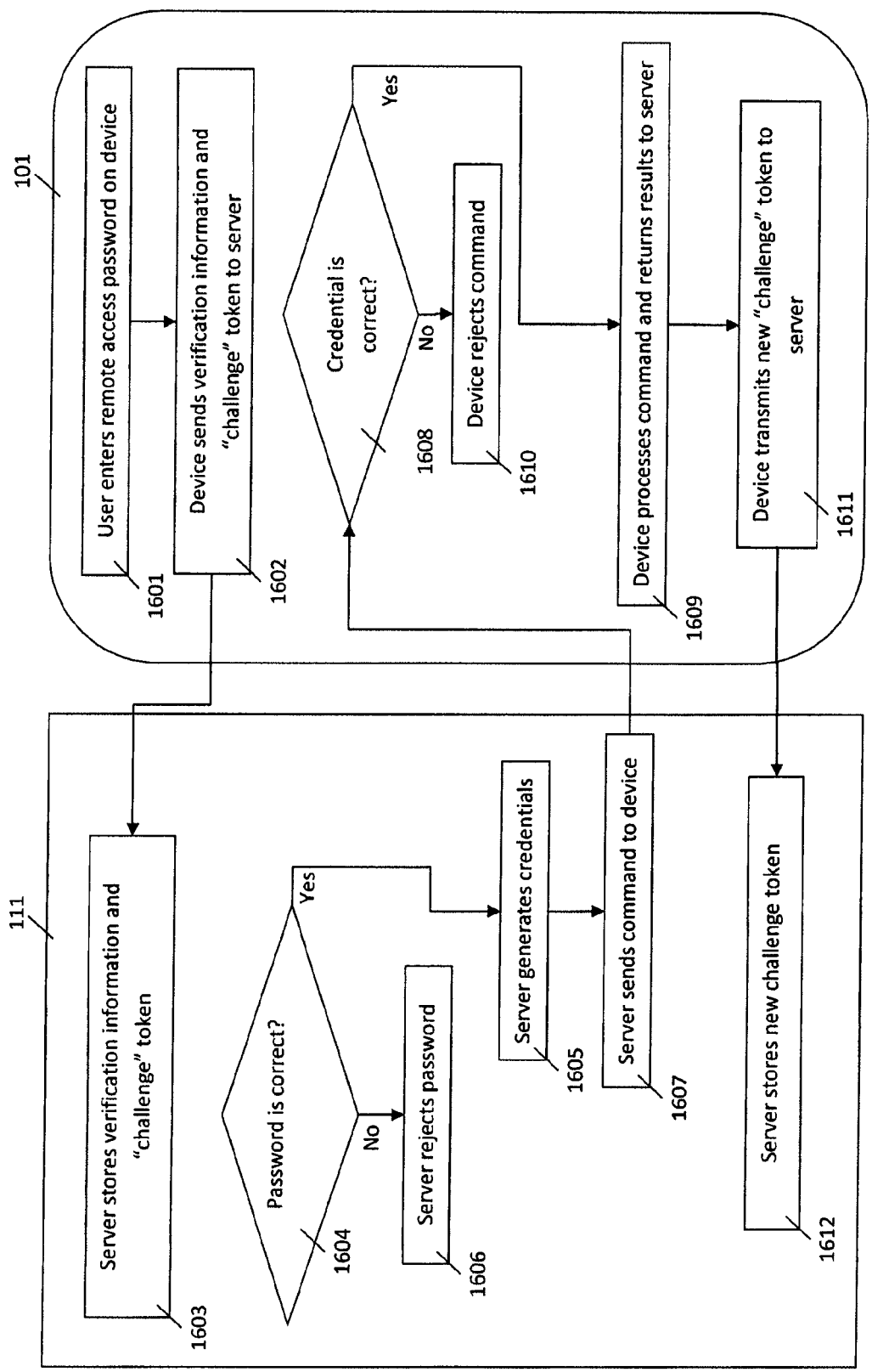
FIG. 16 illustrates a flow chart for securing remote access commands performed on the device.

In order to protect user privacy, the inventive system may be configured so that the local software component 175 on the device 101 only accepts commands from the server that are accompanied with special remote access authentication credentials. In an embodiment with reference to FIG. 16, the server 111 can only generate the remote access authentication credentials in a short period of time with information supplied by the user. The local software component on the device is initially configured with its special remote access authentication credentials. The credentials themselves are not sent to the server. The device generates verification information and a "challenge" token and transmits them to the server 1602. The verification information and "challenge" token are stored by the server 1603. When user-supplied authentication information is received by the server, the server uses the verification information to check whether the user-supplied authentication information is correct 1604. If the authentication information is correct, the server combines the user-supplied authentication information with the "challenge" token to generate the remote access authentication credentials 1605. If the authentication information is not correct, the server does not generate the remote access credentials 1606. When the server has valid authentication credentials, it transmits a command to the device along with the valid credentials 1607. The device receives the command and checks the credential 1608. If the credential is valid, the device processes the command and returns its results to the server 1609. If the credential is not valid, the device rejects the command 1610. If the device requests that the server change the "challenge" token 1611, the server will store the new token and discard the old token 1612. The device may request the "challenge" token to be changed periodically or upon certain events to prevent attacks where previously used credentials are replayed to the device. In a further embodiment, the remote access authentication credential is generated using a special remote access password. The user sets the remote access password on the device 1601. When the remote access password is set on the device, the device generates verification information and a "challenge" token and transmits them to the server 1602. The verification information includes a random salt used for password verification and the result of hashing the password with the verification salt. The "challenge" token is a second random salt used to generate the authentication credential and not equal to the first salt. The server stores the verification information and the "challenge" token 1603. In order for the mobile device to perform an action, the server must supply the command along with the correct authentication credential. The correct authentication credential is the result of hashing the password with the "challenge" salt using an algorithm such as SHA-1. Because the server does not have the original password, it is considered mathematically infeasible for the server to generate the correct authentication credential without the user supplying the correct password, so long as the hash function in use is considered cryptographically effective. Because the server has the verification salt and the expected output of hashing the password with the verification salt, the server can verify whether or not a given password entered by the user is correct. When the user requests a remote access command that requires an authentication credential through the remote access web page, the user is asked to supply the remote access password for the device. The user supplies the remote access password to the server by entering it on the remote access web page and sending the password to the server. The server hashes the password with the verification salt and compares it to the expected verification hash result 1604. If the password is correct, the server hashes the password with the "challenge" salt to build the authentication credential 1605. If the password is incorrect, the server informs the user via the remote access web page 1606. The password is discarded after the authentication credential is generated. The server only temporarily stores the authentication credential while it is sending commands to the device and receiving status from the device corresponding to the secured remote access commands. After the credential is not needed for specific commands requested by the user, it is discarded. After any commands are completed, the software on the mobile device may send a new "challenge" salt to the server 1611 to prevent the server from using the previous authentication credential again. After receiving the new "challenge" salt, the server discards the old "challenge" salt 1612. In an alternative embodiment, the server supplies the remote access web page with the password verification hash, the password verification salt, and the "challenge" salt so that the remote access web page can generate the authentication token without sending the remote access password to the server. When the user enters a password on the remote access web page, software in the web page written in a language such as JavaScript hashes the password with the verification salt and compares it to the expected verification hash result to determine whether or not the password is correct. If the user enters the correct password, the remote access web page generates the authentication credential by hashing the password with the "challenge" salt and sends it to the server. The server can then send the desired remote access command to the device with the correct remote access credential.

10. Multiple-Device Management

Although the present invention has been described for access to and control of a single mobile device by a single user, it is also possible for the invention to be used for control of a group of mobile devices by a group administrator and/or for control of multiple devices belonging to a single user. Rather than displaying a management interface for a single mobile device, a group administrator or user with multiple devices can have access to multiple different mobile devices simultaneously.

In an embodiment, the server generates a multiple-device management web page which allows policy, security, and configuration settings to be changed for a group of devices simultaneously. When a user of the multi-device management web page changes settings for the group, the server sends commands to update the modified settings to each device in the group. The group may contain devices which have different operating systems, hardware capabilities, mobile network types, and other variations. In a further embodiment, the settings commands sent to devices of different types are the same. The local software component on each device interprets each settings command and performs any necessary settings changes appropriate to that device. In an embodiment, the server only sends commands to a device which are appropriate for that device type.

In an embodiment, the multiple-device management web page allows actions to be performed remotely on a group of devices simultaneously. When an action is selected to be performed on a group of devices, the server sends a command to each device present in the group. The multiple-device management web page shows the status of commands for each device (e.g. "3 commands outstanding for this device") and a representation of the overall group's execution status for each command (e.g. "534 of 550 devices successfully completed backup"). The web page may show the devices or number of devices in each stage of command completion (e.g. "Waiting to send command", "Command sent", "Command in progress", "Command finished", "Command Failed"). For commands that return data to the server such as a locate command, the web page may show the locations of each device on a map. In an embodiment, the user of the web page may choose to only display devices that are in a certain geographic area. The area can be defined by selecting a portion of a map. The area can also be defined by specifying a radius and selecting a point on a map or typing the address or name of a location. In an embodiment, locations specified by the user of the web page are stored by the server for repeated use.

In addition to managing a group of devices, an administrator may use the server to access a single device belonging to an individual user. If the device belonging to an individual user is lost or stolen, the user of the device can inform the administrator who can then determine the location of the device. If the user cannot find the mobile device, the administrator can assist the user in locking the device, backing up the data stored on the device, and wiping all data from the device. The administrator can then provide the user with a replacement mobile device which has had the user's data restored onto it.

In an embodiment, a mobile device can be accessed both by its user and a group administrator. The group administrator can determine what permissions the user has to manage the device from the server. For example, the administrator may specify that users can access their devices' backed up data, perform remote actions on their devices, but may not modify their devices' security, policy, or configuration settings. In this case, a user can use the server to perform remote actions on a device without the help of an administrator. By allowing users to perform remote actions on their mobile devices directly without having to go through an administrator, the inventive system may help an organization decrease its number of lost devices and secure lost or stolen devices more quickly, thereby minimizing the possibility of sensitive data being compromised. In an embodiment, the administrator is notified when a user performs missing-device related actions so that the administrator can verify that the missing device was either found or put into a secure state. In an embodiment, multiple sets of management permissions can be defined on the server so that the server provides multiple management interfaces, each specific for different administrative roles. In an example, the server is configured so that a mobile network administrator is able to change security settings for a group of devices, an IT administrator is able to modify policy and remotely perform actions on the group, and a user is able to view backed up data from and remotely perform actions only on his or her mobile device. In an embodiment, the server can be configured to support arbitrary permission grouping for individual devices and groups of devices so as to support many different organizational or cross-organizational use cases. In an embodiment, a given device can be a member of multiple groups, inheriting settings from each group. When settings for a single group are changed, those changes are sent to software on the device. In the case of conflicting setting changes, the server defines a policy by which conflicts are reconciled. For example, disabling device functionality such as Bluetooth overrides the enablement of that functionality. In a further embodiment, the device can have settings defined that override any group settings.

In an embodiment, an administrator can access security status information for a group of mobile devices through a web page generated by the server. In order to monitor the security status of all the mobile devices in a group, the mobile devices can be configured to transmit security status and security event information such as being infected with a virus or receiving a network-based attack to the server. The server then compiles the security information and displays the security status for the group of mobile devices on an administrator's computer that is in communication with the server. By displaying the security status for all mobile devices in the group, the administrator can quickly identify a mobile device that is compromised. If a virus or other severe security event is detected on a mobile device, the administrator will be informed and can take defensive actions to isolate the mobile device to protect other mobile devices and protect the data stored on the compromised mobile device. Additional details of the remote control of the mobile devices are disclosed in co-pending U.S. patent application Ser. No. 12/255,635, "Security Status and Information Display System."

D. Countering Espionage and Terrorism

Lost and stolen devices are the most prevalent and most serious threat facing mobile device deployments today. As government and commercial entities often store data on mobile devices relating to critical infrastructure and of importance to national security, securing lost or stolen mobile devices is of key importance to the interests of the country and specifically, in preventing terrorist threats that benefit from the information stored on mobile devices. Physical threats, such as lost or stolen devices, are intrinsically difficult to deal with because the nature of mobile devices. Mobile devices are not continuously connected to a central network, they are constantly in hostile environments, and they are predisposed to store important and sensitive information. The inventive system significantly bolsters government and commercial entities' ability to prevent sensitive data on mobile devices from falling into the hands of unauthorized parties, such as foreign intelligence agents, terrorist collaborators, and the like. When a device containing sensitive information is lost or stolen, the inventive system provides an administrator with an array of options to deal with the problem. Furthermore, embodiments of the inventive system automatically identify a likely lost or stolen device even before a user may notice it as missing.

E. Remotely-Initiated Audio Communication

Figure 19:
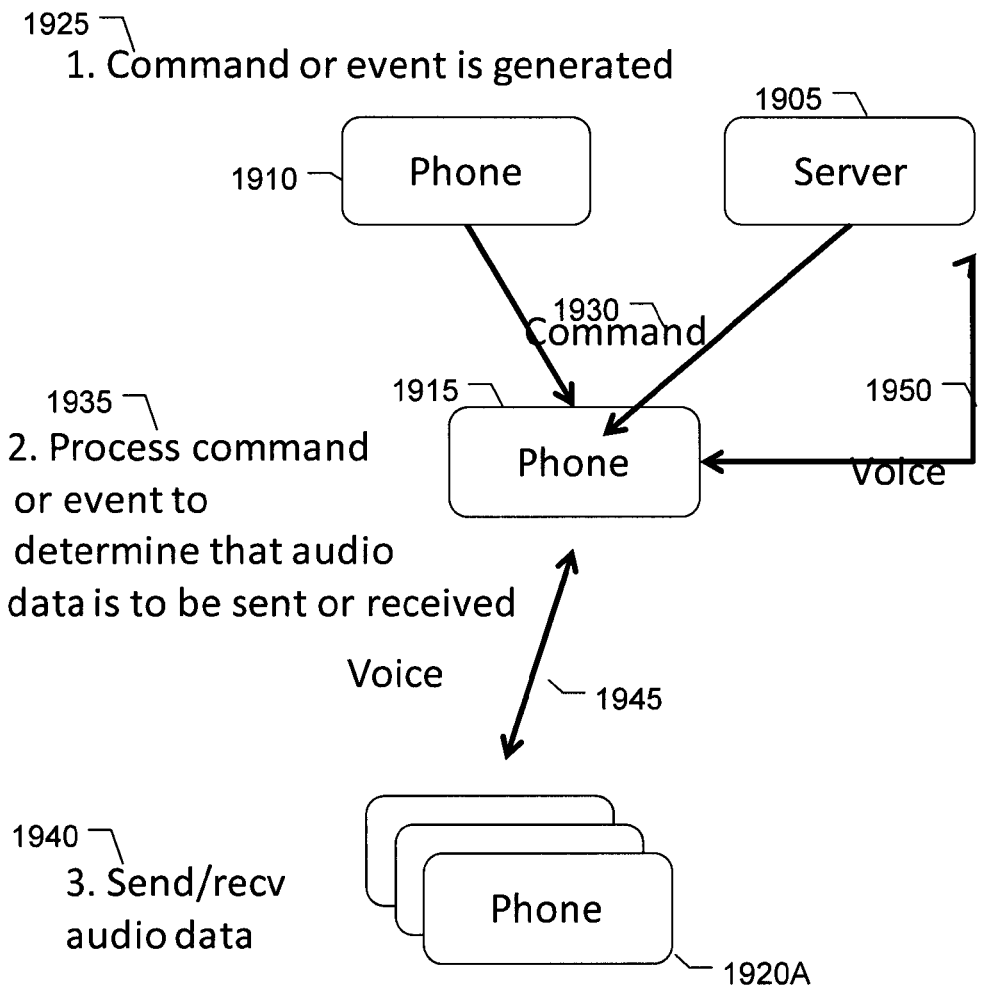
FIG. 19 illustrates a simplified block diagram of a specific implementation of a system and method for remotely-initiated audio communication.

FIG. 19 shows a simplified block diagram of a specific implementation of a system and method for remotely-initiated audio communication. As shown in the example of FIG. 19, there is a server 1905, a first phone 1910, a second phone 1915, and a set of phones 1920A. A phone can be a hardware device, software (e.g., softphone), or a combination of hardware and software that is capable of receiving a transmission of audio data, initiating an audio transmission, or both. A phone or phone capabilities may be implemented as or embodied in a mobile communication device or a portable electronic device (e.g., smartphone, tablet computer, or laptop), a desktop computer or workstation, or an analog telephone.

In a specific implementation for remotely-initiated audio communication, a first step 1925 includes a command or event being generated. The command or event may be generated at first phone 1910 or server 1905 and transmitted 1930 to second phone 1915. A second step 1935 includes processing the command or event to determine that audio data is to be sent or received. A third step 1940 includes sending audio data, receiving audio data, or both (e.g., two way audio connection). The technique allows an audio transmission 1945 to be established between second phone 1915 and one or more of set of phones 1920A, an audio transmission 1950 to be established between second phone 1915 and server 1905, or an audio transmission to be established between second phone 1915 and first phone 1910.

One application of the system shown in FIG. 19 is to remotely control, secure, and recover second phone 1915 such as if the phone becomes lost, missing, stolen, or is at an unknown location. FIG. 19 shows the multiple ways in which the various components can interact in the process for remotely-initiated audio communication. Second phone 1915 may be referred to as a missing portable electronic device or a missing device. First phone 1910 and the set of phones 1920A may be referred to as clients.

There can be a server side process and a device side process. A server side process can include sending a command to initiate audio transmission to and/or from a device or multiple devices when the server determines that it needs to. The determination can be: 1) by request from client (e.g., Web site); or 2) based on detecting the phone is lost or stolen at the server. There can be two ways to send the command. A first way includes sending the command by server or client (e.g., Web page) through an audio data transport provider (e.g., VOIP provider, or cellular provider), which initiates audio data transmission to and/or from the device. A second way includes sending the command by server or client (e.g., Web page) directly to device (e.g., SMS, open TCP connection), which initiates audio data transmission to and/or from the device.

A device side process can include determining that a client needs to start sending (and/or receiving) audio data (e.g., answering a call, establishing a call, or other transmission of audio data) and sending that audio. Determination can, for example, take two forms. In a first form, the device receives a command. The command could be explicit instructions (e.g., call this number, start sending audio) or an incoming call, message, or indication from a pre-defined source (e.g., auto-answer when called from a certain number or source) determined by the signaling channel (e.g., caller id, SMS originator, etc.). In a second form, the device responds to an event, such as motion, an incorrect passcode, a contact added/deleted/updated, a SIM card swap/remove, connection to computer (e.g., USB), an attempt to uninstall app, an attempt to wipe device, or detecting uncharacteristic behavior. Uncharacteristic behavior may include the user trying to reset the device or parts of the device, uninstalling the missing device mobile application, uninstalling other apps, or combinations of these. In an implementation, artificial intelligence techniques are used to identify device usage patterns that do not match the normal usage patterns. Sending can be without user intervention or in response to user action.

In various specific implementations, the command/event (or other command) can modify call handling (e.g., turn on external speaker, bypass headphones/handsfree, turn up volume, mute); audio data may be sent to and from another device, multiple devices, or to a server; audio data may only be sent upon a certain condition being met (e.g., motion, send audio data only when condition is met or within certain time period of condition being met); there may be sending additional data in addition to audio such as location, video, still pictures, state (e.g., battery, locked), usage (e.g., calls, websites visited, apps installed), physical information (e.g. orientation), screenshots (or any other information available on the device). The audio data may include audio samples.

Figure 20:
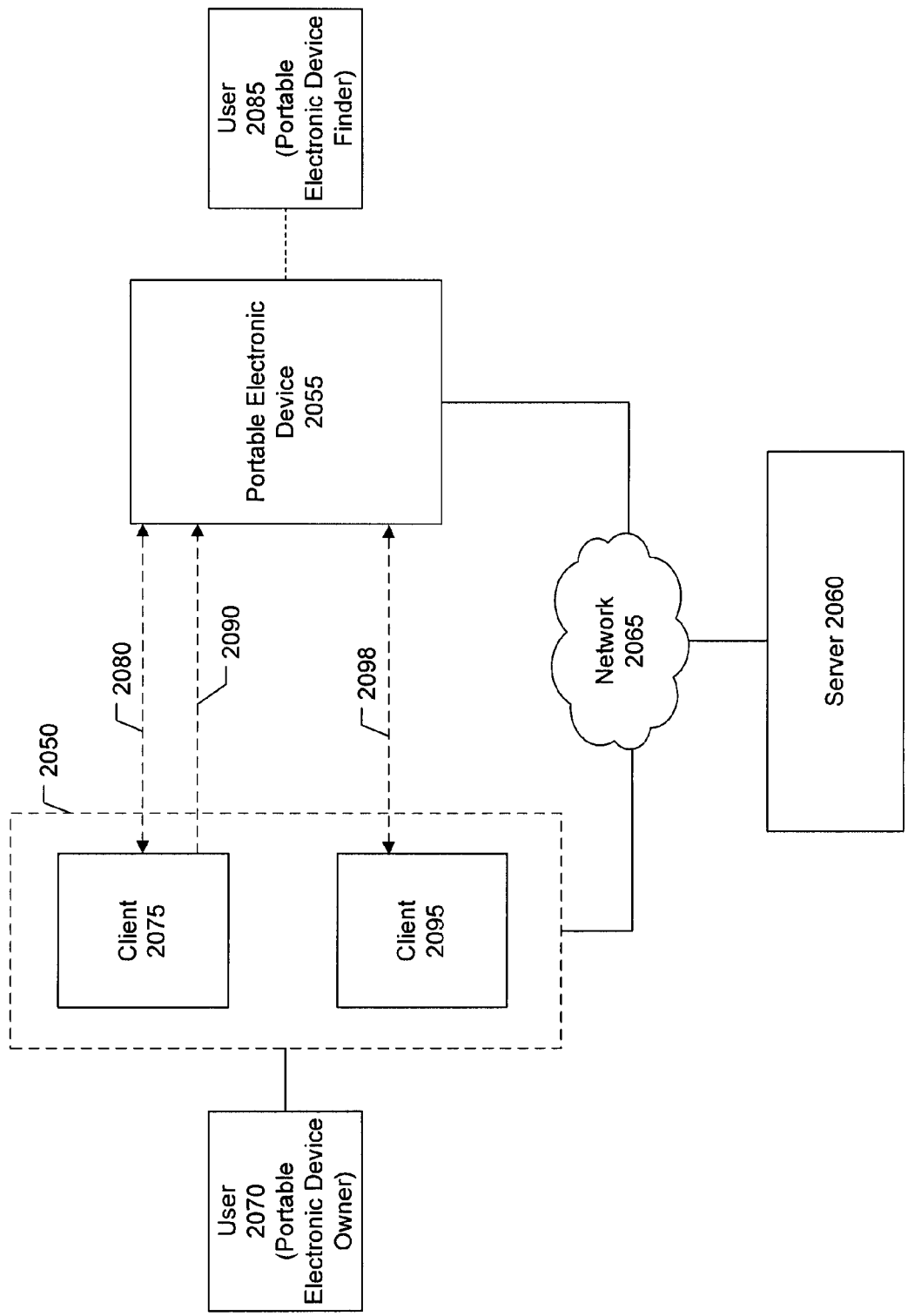
FIG. 20 illustrates another simplified block diagram of a specific implementation of a system and method for remotely-initiated audio communication.

FIG. 20 shows another simplified block diagram of a specific implementation of a system and method for remotely-initiated audio communication. As shown in FIG. 20, there are client devices 2050, a portable electronic device 2055 that may be at a location remote to client devices 2050, and a server 2060. The client devices, portable electronic device, and server are connected to a network 2065.

A specific implementation of the system shown in FIG. 20 is to help users find their missing, stolen, or lost portable electronic devices. A user may lose their device and not be able to locate it. They may want to call their device in hopes of getting in contact with the person that has their device, or who is nearby the lost device. The user may not be near a telephone so it is desirable to provide another method of connecting to the lost device. In a specific implementation, if a user or customer of the system loses their device and they do not have access to a phone to call their missing device, they can make a two way audio connection to their device through a web app. The connection works even when there is no subscriber identification module (SIM card) in the device or when there is no telephony function so that the user can directly talk to the person that has their device.

For example, a user 2070 may be the owner of portable electronic device 2055 which is missing. In a specific implementation, user 2070 (or the device owner) can use a client 2075 to establish a connection 2080 (e.g., a two way audio connection) with missing portable electronic device 2055. The device owner can use the connection to communicate with a user 2085 who may have found the missing device. In another specific implementation, the device owner can instruct 2090 the missing device to make a call to a number specified by the device owner. The call can be to the same or a different client such as a client 2095 so that a connection 2098 can be established between client 2095 and the missing device. Through connection 2080 or 2098, the device owner (e.g., user 2070) can communicate with the device finder (e.g., user 2085) to arrange for the return of the missing device.

Figure 21:
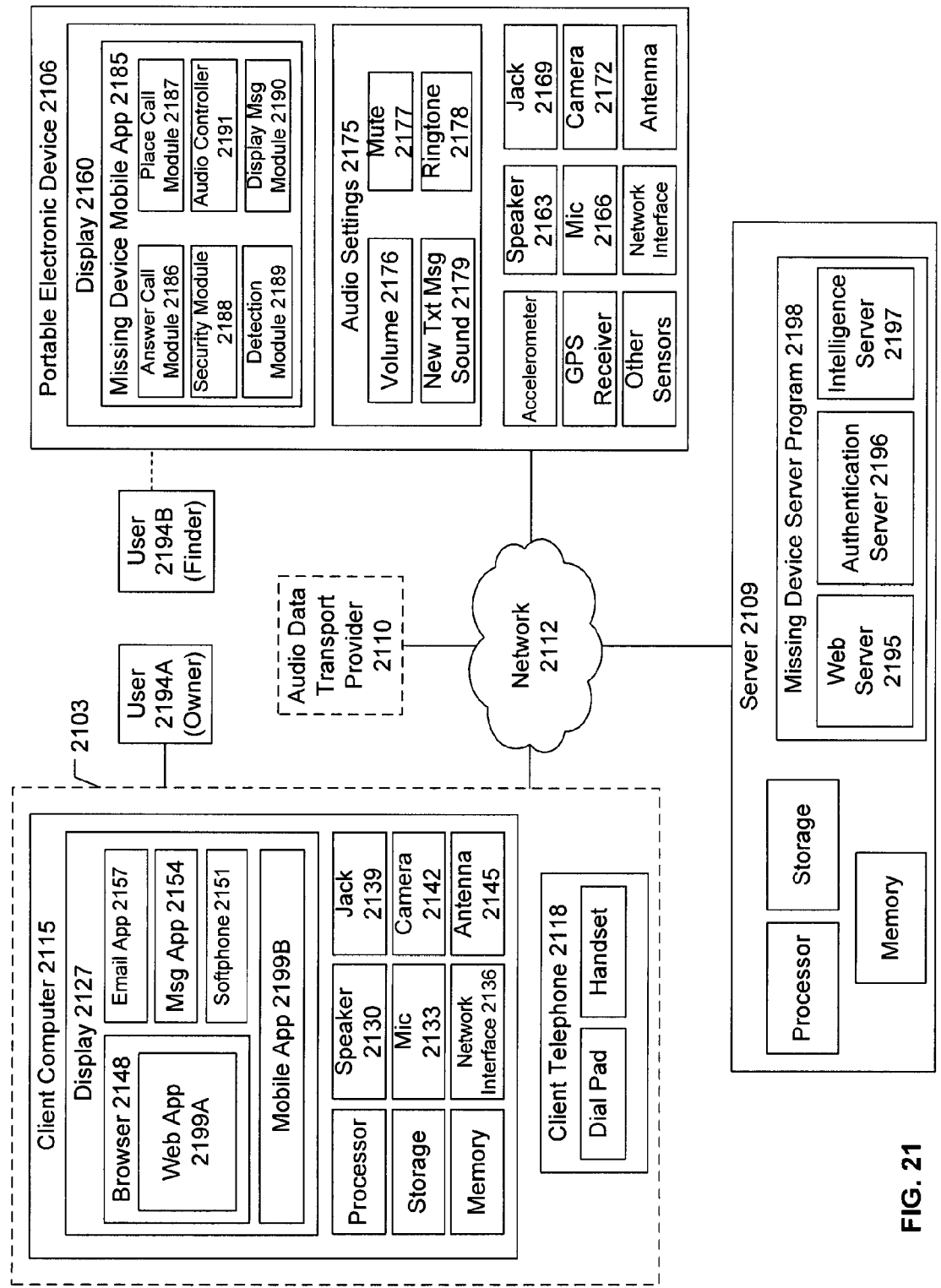
FIG. 21 illustrates a more detailed block diagram of the system shown in FIG. 20.

FIG. 21 shows a more detailed block diagram of a specific implementation of a system and method for remotely-initiated audio communication. As shown in FIG. 21, there are client devices 2103, a portable electronic device 2106 that may be at a location remote to client devices 2103, a server 2109, and an audio data transport provider 2110 connected to a communication network 2112.

The audio data transport provider is shown in broken lines to indicate that in a specific implementation, the audio data transport provider is a third party system. In a specific implementation, the audio data transport provider is responsible for call routing or call handling at the direction of server 2109, portable electronic device 2106, client computer 2115, client telephone 2118, or combinations of these. The audio data transport provider may be a Voice over Internet Protocol (VoIP) provider (e.g., Twilio) or a cellular provider. In this specific implementation, the audio data transport provider provides the transport of audio or audio transmission between portable electronic device 2106 and one or more of clients 2103 such as over a circuit or packet switched interface. Aspects of the system may be implemented via a VPN using IP-based or non-IP-based protocols (e.g. IPX, NetBIOS to send voice samples.

A client telephone device 2118 may be a telephone (e.g., analog phone) that may include a handset and a telephone keypad or dial pad. A client computer device 2115, portable electronic device 2106, and server 2109 may be general purpose computers, computing devices, or computing systems with hardware and software as described above.

For example, client device 2115 can be a smartphone, tablet, laptop, or a desktop computer. More particularly, client device 2115 may include a display 2127, processor, storage, memory, a speaker 2130, a mic or microphone 2133, a network interface 2136, a jack or connector 2139, a camera 2142, and an antenna 2145. Client device 2115 may include various software programs or applications (which may be referred to as apps) that run or execute on the client such as a browser 2148, a softphone application 2151, a messaging application 2154, and an email application 2157. It should be appreciated that client device 2115 is merely exemplary. A specific client device may include additional components not shown (e.g., buttons, ports, or other apps) or a fewer number of components than shown in FIG. 21.

Portable electronic device 2106 may include components similar to those shown on client device 2115. The portable electronic device may include a display 2160, processor, storage, memory, a speaker 2163, a microphone 2166, network interface, a jack 2169, a camera 2172, an antenna, an accelerometer, a location sensor (e.g., Global Positioning System (GPS) receiver), and other sensors. As shown in FIG. 21, there can be one or more audio settings 2175 of the portable electronic device such as a volume setting 2176, a mute setting 2177, a ringtone setting 2178, a new text message setting 2179, or combinations of these.

In a specific implementation, portable electronic device 2106 includes a missing device mobile app 2185. The missing device mobile app may include an answer call module 2186, a place call module 2187, a security module 2188, a detection module 2189, a display owner message module 2190, and an audio controller 2191.

The answer call module is responsible for receiving an audio transmission (e.g., a communication signal, a call, a command for an audio transmission, or instructions for an audio transmission). The place call module is responsible for initiating an audio transmission.

The security module at, for example, the direction of the device owner can instruct the missing device to take pictures, photographs, record video, record sound, enter a lockdown mode, collect audio data (e.g., surrounding, local, or ambient audio at the portable electronic device), collect location data indicating a position of the portable electronic device (e.g., GPS coordinates such as latitude, longitude and elevation), collect device state data (e.g., battery data, whether or not the device is locked), collect device usage data (e.g., calls placed by the device, calls received by the device, websites visited, or apps installed), collect physical information associated with the device such as device orientation, capture screenshots or screen recording (e.g., capture an image or record the visible items being displayed on an electronic screen of the device), collect other information available on the device, or combinations of these.

In an implementation, the device owner may select from among several different lockdown modes. For example, in a first lockdown mode there may be a lock where no features work. In a second lockdown mode there may be a lock that allows only certain features of the missing device to work such as "call owner." A number of device features available in the first lockdown mode may be different from a number of device features available in the second lockdown mode. For example, the number of device features available in the first lockdown mode may be less than or greater than the number of device features available in the second lockdown mode.

The detection module can detect events occurring at the missing device. Based on the occurrence of an event, missing device mobile application 2185 can attempt to establish a connection through the audio data transport provider with one or more of clients 2103 so that the device owner can arrange for the return of the missing device. That is, a callback to one or more of clients 2103 may be conditioned on events. For example, the connection could be triggered when the screen of the missing device turns on and a command could be executed such as calling the owner of the missing device. As further examples, the connection could be triggered when there is movement of the missing device, when the camera of the missing device is used, or when an incorrect password is used on the missing device. Upon the connection being triggered a command could be executed such as calling the owner of the missing device.

The display owner message module responsible for displaying on the missing device messages from the owner, messages indicating that missing device 2106 belongs to the owner, or both. For example, the message can include a phone number from the owner for the finder of the missing device to call, the owner's contact information, e.g., name, mailing address, email address, and so forth.

The audio controller is responsible for controlling or overriding the audio settings of the missing portable electronic device. For example, a ringtone volume setting of portable electronic device 2106 may be set at a first or default volume level. Based on a call or incoming communication signal being received by answer call module 2186, the audio controller can override the first volume level to a second volume level, different from the first volume level. In a specific implementation, the second volume level is greater than the first volume level, e.g., has a louder sound or higher decibel rating or measurement value than the first volume level. In another specific implementation, the second volume level is less than the first volume level, e.g., has a quieter sound or lower decibel than the first volume level.

Server system 2109 includes components similar to that discussed above. For example, the server may include a processor, memory, storage, and application programs. In a specific implementation, the server includes a web server 2195, an authentication server 2196, an intelligence server 2197, and a missing device server program 2198. It is noted that the blocks in FIG. 21 are functional rather than structural so that it is possible to have many different hardware configurations that can perform the illustrated functions.

The web server can deliver web pages and other data from storage to the browser. The authentication server is responsible for authenticating users. The intelligence server is responsible for deciding or determining an audio transmission should be initiated (e.g., by the portable electronic device, client, or audio data transport provider) so that a connection can be established between the portable electronic device and one or more of clients 2103 via audio data provider 2110. For example, the intelligence server may detect that the portable electronic device is lost or stolen. Upon detecting that the device is lost or stolen, the intelligence server may send a command to the portable electronic device that instructs the device to initiate an audio transmission. The portable electronic device may be referred to as a target device or a target mobile communications device.

Consider, as an example, the following scenario. A first user 2194A is an owner of missing portable electronic device 2106. The owner may have misplaced their device such as by leaving it at a restaurant, coffee shop, on the seat of an airplane, taxi, or bus, or the device may have slipped out of the user's pocket or purse.

The first user can use a client (e.g., client computer 2115) to make a call or communication signal to the missing portable electronic device or to establish an audio transmission to the missing portable electronic device. In a specific implementation, upon the call or communication signal being received at the missing device an alarm is generated which can override an audio setting (e.g., ring volume setting or ringtone) of the missing device. For example, the device owner prior to misplacing their portable electronic device may have set the device audio sounds, e.g., ringer, to mute, vibrate only, or silent. Typically, if a portable electronic device such as a smartphone is set to mute or vibrate only, calls placed to the device do not generate a sound such as a ringtone that indicates an incoming call.

The alarm generated at the missing device can override the audio setting so that a second user 2194B or finder who may be nearby the device will be able to hear the alarm. The second user can answer the call and an audio transmission may be established between the missing portable electronic device and the client. This allows the owner at the client to speak with the second user at the missing device so that the owner can arrange for the return of the missing device.

As another example, the device owner may have lost the device in their own home with the device volume or ringtone set to mute. The alarm generated at the missing device can override the mute setting so that the device owner can hear the alarm and zero in on the location of the missing device, e.g., use the sound of the alarm to move toward the location of the missing device.

More particularly, in a specific implementation, first user 2194A provides input to client computer 2115. The input is received at server 2109. Based on the input, authentication server 2196 can authenticate first user 2194A as the owner of portable electronic device 2106 or authenticate that the user is allowed to access the missing device features of the system.

Alternatively, the first user or owner can instruct the missing device 2106 to make a call, callback, or a return call. That is, via client computer 2115, the owner can instruct the missing device to make a callback to client computer 2115, client telephone 2118, or both. For example, client computer 2115 may not include a microphone or speaker. In this case, the owner can instruct the missing device to make a callback to client telephone 2118 so that the owner can use the client telephone to speak with the person who has the owner's missing device 2106. Instead or additionally, the owner can instruct the missing device to make a callback to a client computer different from the client computer used to give the instructions to the missing device.

The system provides several options through which a connection to the missing portable electronic device can be initiated. In various specific implementations, a connection can be initiated from a web app 2199A. In this specific implementation, first user 2194A or the missing device owner uses browser 2148 at client 2115 to access server 2109. The server can authenticate the first user as being authorized to access the missing device and facilitate establishing a connection or audio transmission between the client and the missing device.

In another specific implementation, a connection can be initiated from a text message, e.g., short message service (SMS). In this specific implementation, first user 2194A at client 2115 sends a text message to server 2109. Based on the received text message, the server can authenticate the first user and facilitate establishing the connection or audio transmission between the client and the missing device.

For example, the text message may include an identifier such as the device owner's personal identification number or PIN that the device owner can send to the server when the owner cannot find their device. Upon receipt of the PIN by the server, the server can authenticate the PIN, based on the PIN determine that the device is missing, and facilitate a connection to the missing device. As another example, the text message may include a first code or value and a second code or value. The first code may be the device owner's PIN. The second code or value may be a phone number for the missing device to call. Instead or in addition to the second code, there can be a third code in the text message that instructs the missing device to enter a particular lockdown mode (e.g., disable the missing device, enable the missing device to place a call to the device owner, receive a call from the device owner, or both and disable other features of the missing device, delete data from the missing device, and so forth).

In another specific implementation, the first user may send a text message from the client to the missing device. The missing device receives the text message. The missing device mobile application may include an authentication module that authenticates the text message such as by verifying a PIN that may be included in the text message. Based on the received text message, the missing device may initiate the audio transmission.

In another specific implementation, a connection can be initiated from a telephony interface such as through client telephone 2118. In this specific implementation, first user 2194A at client telephone 2118 places a call that is received at or forwarded to server 2109. Based on the received call, the server can authenticate the first user and facilitate establishing the connection between client telephone 2118 and the missing device (e.g., direct audio data transport provider to establish an audio transmission between client telephone 2118 and the missing device).

As a specific example, the missing device owner may use the client telephone to connect to an automated telephone system such as by dialing a toll-free number. The automated telephone system can guide, provide instructions, automated voice prompts, options, or menu options for contacting the owner's missing device.

For example, upon placing a call to the automated telephone system, the automated telephone system may ask the caller to enter their PIN, e.g., "Please say or use the dial pad to enter your PIN." Upon receiving the entered PIN, the system can authenticate the caller as the owner (e.g., authenticate that the caller is allowed to access the missing device features of the system). After the caller has been authenticated, the system can provide the caller (or device owner) a list of menu options, e.g., "Please say or press 1 to call your missing device; please say or press 2 to have your missing device call you back at a number you specify."

If the device owner selects the first option to call the device, a call is placed to the missing device to establish a connection between the telephone and the missing device. If the device owner selects the second option to have the missing device make a call back, the system can prompt the device owner to enter a callback number, e.g., "Please say or enter the number at which you would like your missing device to call." Upon receiving the entered number, the system places a call to the missing device and instructs the missing device to make a callback to the number specified by the device owner.

In another specific implementation, a connection can be initiated from a smartphone or mobile application 2199B. In this specific implementation, first user 2194A at client 2115 can launch mobile application 2199B such as by tapping on the mobile app icon from the display. The mobile app contacts server 2109 which can authenticate the first user and facilitate establishing the connection between client 2115 and the missing device. In a specific implementation, the facilitation includes directing audio data transport provider 2110 to establish an audio transmission between client 2115 and the missing portable electronic device.

In a specific implementation, missing device mobile application 2185 intercepts a communication signal received at portable electronic device 2106. The missing device mobile application analyzes the communication signal to determine whether the intercepted signal should be processed by the missing device mobile application or passed to another application for processing. This allows, for example, ordinary calls and messages to be processed by the phone dialer and text message application programs that may be on the device—and calls, messages, or both intended for the missing device mobile application to be processed by the missing device mobile application.

The analysis may include scanning, examining, searching, detecting, or parsing the content of the communication for specific content such as a predefined code, missing device code, or security code. If the communication includes the code, the missing device mobile application determines that an audio transmission should be established between the device and the client. If the communication does not include the code, the missing device mobile application can forward the communication to the device's phone dialer or text message application as appropriate.

For example, the communication may be a text message including the content "8675 MISSING." A first portion of the content, e.g., "8675" may include the device owner's PIN, authentication code, or credentials for the missing device mobile application to authenticate. A second portion of the content, e.g., "MISSING" may provide an indication to the device that the first user has lost device. The indication may provide a trigger for the device to initiate a predefined contingency plan, e.g., call a previously stored backup phone number, enter into a lockdown mode, generate an alarm, connect to the server to receive additional instructions, initiate an audio transmission automatically, or combinations of these. A contingency plan may include any number actions to be executed in any sequence (e.g., first: generate an alarm, second: call a stored backup phone number). An action can be based on a condition being satisfied or not satisfied (e.g., call a first stored backup phone number; if the call is not answered, call a second backup phone number).

A contingency plan may be created when the user configures the missing device mobile application. A user can create any number of contingency plans to be stored on the device. Each contingency plan may represent a certain escalation level. For example, the user may create a first contingency plan that includes the action generate an alarm. This plan may be useful if the user suspects the device has been lost somewhere in the user's home with the volume set to mute. The user may create a second contingency plan that includes the actions initiate audio transmission automatically without notification, and enter a lockdown mode. This plan may be useful if the user suspects that the device has been stolen and the user wishes to monitor the thief who has stolen the device. Which contingency plan to execute may be specified by the communication received at the device. The missing device mobile application may provide one or more default or preinstalled contingency plans for the user to choose when configuring the missing device mobile application.

Instead or additionally, the communication content may include direct or explicit instructions or commands for the device (e.g., CALL 415-555-1234). In the example above, the missing device mobile application, upon analyzing the communication, would assume responsibility for processing the message. This may include determining that an audio transmission should be initiated, overriding an audio setting of the device, determining that the audio transmission should be initiated automatically or without user intervention, determining that the audio transmission should be initiated with or without an audible notification at the device that the audio transmission has been initiated, determining that the audio transmission should be initiated with or without a visible notification at the device that the audio transmission has been initiated, determining that the audio transmission should be initiated with or without a vibration, suppressing, not permitting, not allowing, or blocking the message from being displayed on the screen of the device, directing the security module to enter into a lock down mode, recording audio local to the device (e.g., turn on, enable, or activate device microphone and begin recording audio captured by the microphone), recording video (e.g., turn on device video camera), directing the device to connect to the server to receive further commands, or other as discussed in this patent application.

If, however, the message content does not include the code information, the missing device mobile application may forward the message to the messaging application on the device for the messaging application to handle or process. For example, if the message is "bring home milk and eggs" the missing device mobile application may forward the message to the messaging application for the messaging application to process.

In another specific implementation, the analysis includes determining whether the communication signal is from a specific source or predefined source, such as being associated with a specific caller identification (ID), a specific automatic number identification (ANI), or a specific SMS message originator. If the communication signal is from the specific source, the missing device mobile application assumes responsibility for processing. Alternatively, if communication signal is not from the specific source, the missing device mobile application forwards or passes the signal to another application program to handle.

Thus, the communication signal (e.g., SMS, call, etc.) can in itself indicate that the device needs to make an audio transmission or it may indicate that the device needs to connect to a server to receive a command to make an audio transmission. The indication can be because the signal is from a specific source (e.g., Caller id or SMS message originator) or because the signal has specific content (e.g., a security code). In a specific implementation, both source and content may be defined as "the signal." In a specific implementation, a specific source is used to differentiate special communication signals from ordinary communication signals. In another specific implementation, communication signal content is used to differentiate special communication signals from ordinary communication signals. The analysis may be based on a secret token in the communication signal or message or could be based on the phone number of the person who sent the message.

The missing device mobile application may be setup such that when the device receives a call from a specific number (e.g., 123-456-7890), the device starts audio transmission or audio recording for a given time period. Instead or additionally, an audio transmission, audio recording or both may be initiated when sounds (e.g., local audio) are detected around it.

The device can potentially intercept the communication signal and prevent it from being processed on the device or it can take different action based on the specific source/code (e.g., if phone call from a specific number, automatically answer it to begin the audio transmission).

In a specific implementation, a method includes intercepting, by a first application program executing at a portable electronic device, a communication signal received at the portable electronic device over a network, analyzing the communication signal to detect at least one of a first condition or a second condition. The first condition is detected when the communication signal includes a predefined security code. The second condition is detected when the communication signal is from a predefined source. The method further includes if the at least one condition is detected, determining that an audio transmission should be established between the portable electronic device and a client, and if the at least one condition is not detected, passing the intercepted communication signal to a second application program executing at the portable electronic device.

The first application program can be the missing device mobile application program and the second application program can be a phone dialer application program or a text messaging application program. The second application program may be included with an operating system of the portable electronic device. In other words, the first application program may be installed or loaded into a memory of the portable electronic device after the second application program is installed or loaded into a memory of the portable electronic device.

Before the analyzing the communication signal, the predefined security code, an identifier associated with the predefined source, or both may be stored at the portable electronic device such as during a configuration or setup process of the first application program. The identifier of the predefined source may include a phone number, email address, or both associated with the predefined source.

The predefined security code may be stored on the portable electronic device and analyzing the communication signal may include comparing the stored predefined security code with content of the communication signal to determine whether there is a match, the match being a detection of the first condition. The identification of the predefined source may be stored on the portable electronic device and analyzing the communication signal may include comparing the stored identification associated with the predefined source with information identifying a source of the communication signal to determine whether there is a match, the match being a detection of the second condition.

The communication signal may include instructions specifying call handling at the portable electronic device. For example, the communication signal may include one or more commands to activate an external speaker of the portable electronic device for the audio transmission, increase a volume setting of the portable electronic device for the audio transmission, or others as described in this patent application. The portable electronic device may receive commands during the audio transmission, before the audio transmission is established, after the audio transmission is established, after the audio transmission has been terminated, or combinations of these. For example, after the audio transmission is established between the portable electronic device and the client, the portable electronic device may receive a command that increases a volume setting of the portable electronic device.

A command may be sent to the portable electronic device using a channel or data channel that is different from the audio transmission channel. For example, the audio transmission channel may be a two way audio transmission provided though audio data transport provider 2110 that enables the first and second user to have a real-time conversation. Server 309 can send different commands to the portable electronic device using a different channel, communication network, or communication protocol (e.g., SMS, HTTPS, UDP). Thus, the first user may be talking to the second user or missing device finder (e.g., through the two way audio transmission) and while the first user is talking to the second user, the first user could send an instruction or command (e.g., increase volume) through a different channel or a channel that is independent of the two way audio transmission channel. There may be a number of different things that the first user could want to change (e.g., turn on external speaker, bypass headphones/handsfree, turn up volume, mute) in order to have better control of the missing device.

One benefit is that if the first user, while talking to the second user, suspects that the second user is unwilling to cooperate in returning the missing device (e.g., because the second user has stolen the device), the first user can send a command to the missing device that instructs the missing device to calculate and send its location to the first user at the client. The second user may terminate the two way audio transmission (e.g., hang-up), but the command can still be received at the missing device because a different channel may be used to send the command. Further, even if the two way audio transmission has been terminated or is unavailable, the missing device application program can send the calculated location information to the first user using a different channel (e.g., SMS, HTTPS, UDP). Another benefit is that the second user may be unfamiliar with the operation of the device because the device does not belong to them. So, allowing the first user to have control of the device remotely helps to ensure for the return of the device to the first user.

Figure 22:
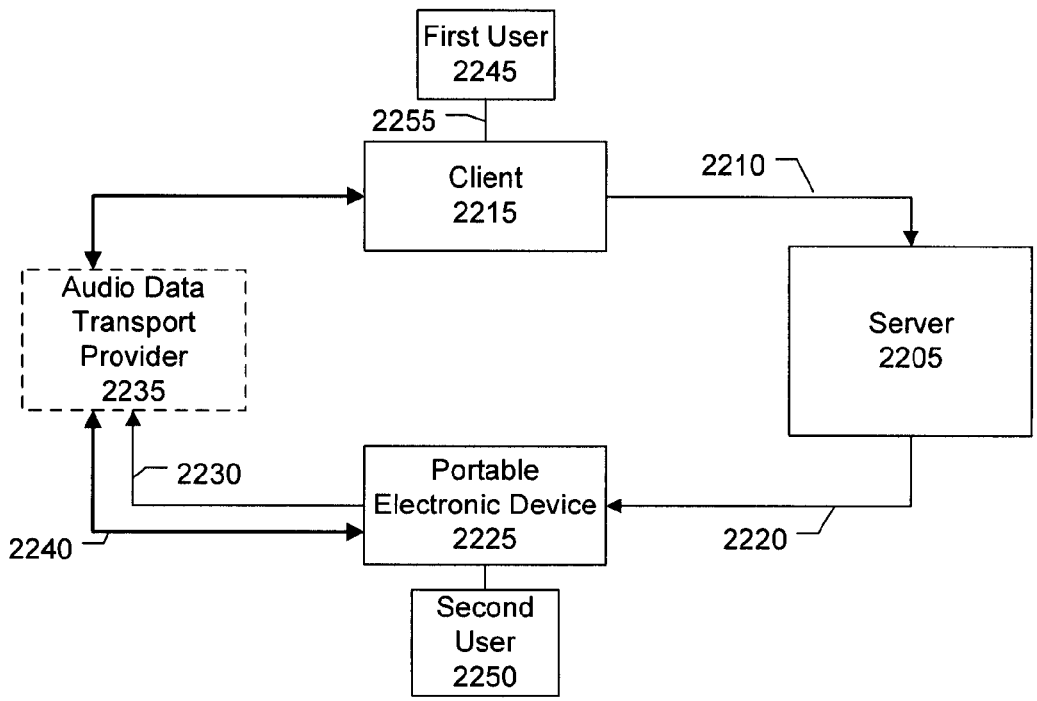
FIG. 22 illustrates a simplified block diagram of a server receiving a request from a client for initiation of an audio transmission and sending a command to a mobile or portable electronic device.

FIG. 22 shows a simplified block diagram of a server 2205 receiving a request 2210 from a client 2215 and, based on the request, sending a command 2220 to a portable electronic device 2225 for the device to initiate an audio transmission 2230. An audio data transport provider 2235 provides the transport of data (e.g., audio data or two-way audio data) 2240 between portable electronic device 2225 and client 2215.

One application of the system shown in FIG. 22 is finding a missing portable electronic device (e.g., a device that is lost, stolen, or is at an unknown location). For example, a first user 2245 may be an owner of portable electronic device 2225. A second user 2250 may have the device. The second user may have, for example, found (or stolen) the device. First user 2245 can use the system to arrange for the return of the device.

In the example shown in FIG. 22, data (e.g., audio data) is being exchanged between portable electronic device 2225 and client 2215. This, however, is not always the case. In other implementations, data may instead or additionally be sent from portable electronic device 2225 to one or more different clients, to server 2205, or both. Server 2205 may be copied on the data exchanged between the portable electronic device and the client so that, for example, a record of the conversation between the first user and second user can be made and stored. Data may instead or additionally be received at portable electronic device 2225 from one or more different clients, server 2205, or both. Audio data can be sent to and from another device, multiple devices, or to a server. For example, through a group calling or conference calling feature of the system, there can be a third user at a second client. The third user can receive data from portable electronic device 2225, send data to the portable electronic device, or both. The third user can be a friend of the first user who can assist with the return of the portable electronic device from the second user.

In a specific implementation, audio data transport provider 2235 provides a real-time exchange of audio data between the portable electronic device and the client. In another specific implementation, the audio data may be fixed length, such as in the case of an audio file (e.g. MP3). The fixed-length audio data can be of any duration such as 5 seconds, 10 seconds, 30 seconds, 60 seconds, and so forth. The duration may be user-configurable. Data such as an audio file collected at the portable electronic device may be transmitted from the device to the server for analysis and storage. After an audio file has been transmitted from the portable electronic device to the server, the file may be deleted from the portable electronic device so as to make space for other files. Sending the audio files to the server for storage can help to conserve resources (e.g., storage space) on the portable electronic device.

In a specific implementation, there is sending additional data in addition to audio data. The additional data may be sent from portable electronic device 2225 to client 2215, other clients, server 2205, audio data transport provider 2235, or combinations of these. The sent additional data can include location, video, still pictures, state (e.g., battery, locked), usage (e.g., calls, websites visited, apps installed), physical information (e.g., orientation), screenshots (or any other information available on the portable electronic device). The location data may include GPS coordinates such as the current latitude and longitude of the portable electronic device. The device state information may include an indication of the remaining battery life of the portable electronic device, whether or not the device is in a locked mode or unlocked mode, or both.

Device usage information may include a log that lists calls made from the portable electronic device (e.g., outgoing calls), a log that lists calls received at the device (e.g., incoming calls), or both. The outgoing call log may list phone numbers called from the device, times and dates of the outgoing calls, durations of the outgoing calls, or combinations of these. The incoming call log may list the incoming or originating phone numbers, times and dates of the incoming calls, durations of the incoming calls, or combinations of these. Device usage information may include a log that lists messages (e.g., text messages) sent from the device, a log that lists messages received at the device. The information may include message content, time and date of receipt, time and date of transmission, information identifying the recipient (e.g., phone number), or combinations of these.

Device usage information may include web browsing history such as a list of web pages visited (e.g., web page title, time and date of visit, URL's or URI's). Device usage information may include a list of application programs (e.g., apps or mobile application programs) installed on the portable electronic device. For each installed app, the list may include a title of the app, an identifier for the app, a source of the app (e.g., Android Market, App Store, BlackBerry App World, Windows Phone Marketplace, HP App Catalog, or Ubuntu Software Centre), a time and date of the installation or download of the app, or combinations of these.

Table A below provides detail for a specific flow of the system shown in FIG. 22. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

Referring now to step 2220, the instructions transmitted from the server to the portable electronic device may further include other commands for the portable electronic device to follow. For example, the instructions may include a command for the device to enter a particular lockdown mode. The lockdown mode may, for example, prevent second user 2250 from accessing data stored on the portable electronic device such a telephone directory; allow the second user access to the owner's contact information, but prevent access to other contact information; block the second user from accessing calendar appointments, voice memos, notes, photos, video, messages (e.g., text messages), settings, music collections, video collections, applications, or combinations of these that may be stored on the portable electronic device; block the second user from purchasing application programs; block the second user from downloading application programs, or combinations of these.

Blocking access may be performed by hiding, removing, or not displaying the respective icons on the screen of the device (e.g., hiding the contacts icon, hiding the calendar icon, hiding the photos icon, hiding the notes icon, and so forth). A particular lockdown mode may cause a limited or restricted user interface to be displayed that limits the second user's access to the portable electronic device features. For example, the number of icons included on the restricted graphical user interface may be less than the number of icons included on the unrestricted graphical user interface, i.e., the interface shown when the device is not in the lockdown mode.

The instructions received at the portable electronic device from the server may include a command to collect data such as take photographs, record video, collect location data identifying a geographical location of the device, collect device state data, collect device usage data, determine the orientation of the device, or combinations of these. The instructions may include a command to transmit the collected data to the server, client, or both. For example, there can be a command for the portable electronic device to record a sound for 30 seconds and send the sound file to the client, server, or both.

The instructions received at the portable electronic device from the server may include a command to modify call handling (e.g., turn on external speaker, bypass headphones/handsfree, turn up volume, or mute). The instructions may include a list specifying one or more settings of the device that is to be overridden in connection with the audio transmission. There may be a command that instructs the portable electronic device to initiate the audio transmission without generating an audible notification (e.g., sound, ringtone, or

TABLE A

| Step | Description |
|---|---|
| 2255 | The first user is at a client that is connected to the server via a network. The first user would like to initiate an audio transmission with the portable electronic device. The server authenticates that the first user is allowed access to the portable electronic device. |
| 2210 | After the first user is authenticated, the first user makes a request for the audio transmission. In a specific implementation, the request is received at the server. |
| 2220 | The server processes the request and generates instructions responsive to the request. In a specific implementation, the instructions are sent from the server to the portable electronic device. The instructions include a command for the portable electronic device to initiate the audio transmission. |
| 2230 | The portable electronic device, in accordance with the received instructions, contacts the audio data transport provider for the establishment of the audio transmission. |
| 2240 | The audio data transport provider establishes the audio transmission between portable electronic device and the client. | alert), a visible notification (e.g., powering on the screen, or flashing a message), or both at the device indicating that the audio transmission has been initiated.

This allows the portable electronic device to silently monitor activities at the portable electronic device, e.g., monitor activities that are local to the device. This feature can be beneficial if the first user believes that the portable electronic device has been stolen. Not alerting the thieves who may have the stolen device can help in the recovery of the device. For example, the thieves may be gloating about having stolen the device. The device can monitor and record these conversations which can then be used in a criminal investigation to bring these perpetrators to justice.

Alternatively, there may be a command that instructs the portable electronic device to generate an audible notification, visible notification, or both in connection with the audio transmission. The command can override a setting of the portable electronic device (e.g., a volume setting, a mute setting, a headphones setting, or a handsfree setting) so that an audible notification can be heard, a visible notification can be seen, or both. The settings to override may be included in the request or instructions from the server. The notification can provide an indication to the second user that the first user is trying to contact the device. Through the audio transmission established between the client and the portable electronic device, the second user can speak with the first user to arrange for the return of the device.

In a specific implementation, a command could be explicit instructions (e.g. call this number, start sending audio) or incoming call, message, or indication from a pre-defined source (e.g., auto-answer when called from certain number or source) determined by the signaling channel (e.g., caller id, SMS originator, etc.). More particularly, there may be a command that instructs the portable electronic device to call a particular number. The number may be specified in the instructions. For example, first user may specify the number in request 2210 to the server. The server can then forward or include the number in the instructions to the portable electronic device. Alternatively, the number may have been previously stored on the portable electronic device. Before the portable electronic device is lost, the first user may store the number on the device as a back-up number to be called if the device becomes lost. For example, the back-up number may be the first user's work telephone number or home telephone number.

The instructions received at the portable electronic device from the server may include a command to automatically answer an incoming call from a particular number or source. That is, the calls may be answered by the device without second user 2250 indicating acceptance of the call. For example, the command may specify that incoming calls from the number (555) 425-2590 (e.g., the first user's home phone number) should automatically be answered by the portable electronic device.

The commands received at the portable electronic device may be at the direction of the first user. The system allows the performing of actions remotely specified by the client (or first user at the client). That is, the first user can specify picture taking, a lock where no features work, a lock where only certain features are allowed to work such as "call owner."

It should be appreciated that two or more commands can be sent as one unified or single command (e.g., start audio transmission without user intervention, start audio transmission after receiving user OK). Alternatively, two or more commands may be sent be separately. For example, a start audio command and a start without user intervention command may be sent together. A "start without user intervention" may be a setting/attribute sent as a part of the start audio command. The start without user intervention could also be a setting that is pre-populated on the device so that all or some commands of a certain type will not have user intervention required to start.

A command may include any number of actions for the missing device to initiate such as one, two, three, four, five, or more than five actions. In a specific implementation, a first command may be sent to the missing device. After the first command the first command is sent or is received at the missing device, a second command may be sent to the missing device. An action specified in the first command may be different from an action specified in the second command.

Figure 23:
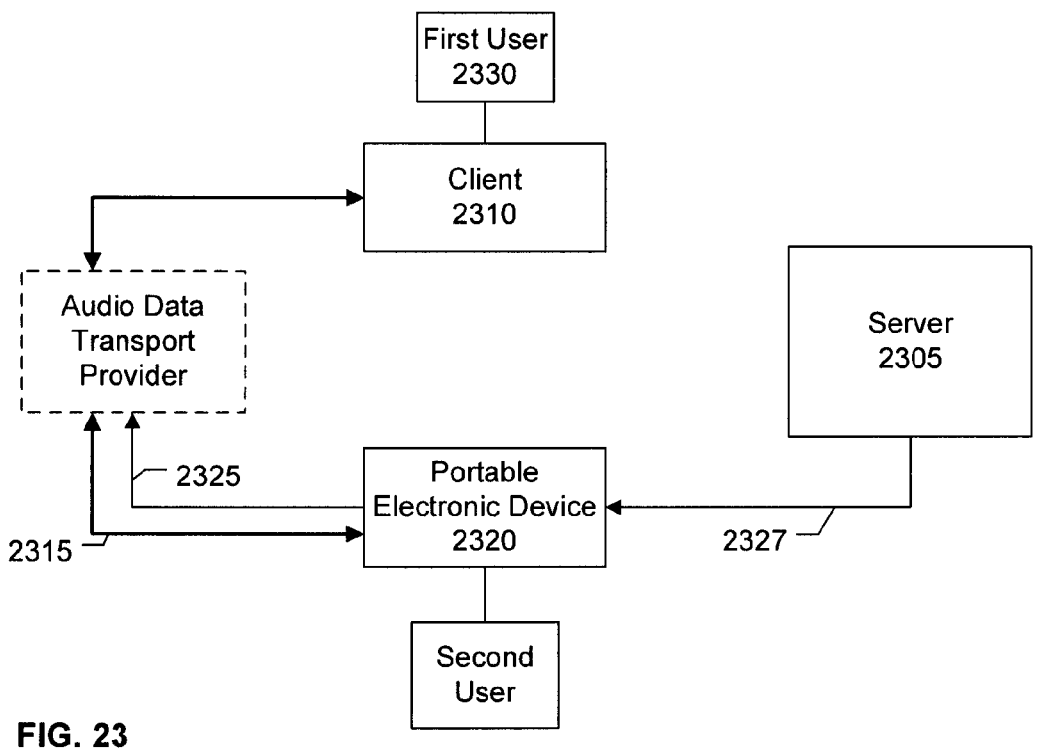
FIG. 23 illustrates a simplified block diagram of a server making a determination that an audio transmission should be established and sending a command to a portable electronic device.

FIG. 23 shows a simplified block diagram of another specific implementation of the system. In this specific implementation, a server 2305 determines, without receiving a request from a client 2310, that an audio transmission 2315 between the client and a portable electronic device 2320 should be initiated 2325 and sends a command 2327 to the portable electronic device. The flow shown in FIG. 23 is similar to the flow shown in FIG. 22. In the specific implementation shown in FIG. 23, however, the server makes the determination that the audio transmission should be initiated unilaterally or without prompting or receiving a request from the client for the audio transmission.

In a specific implementation, the server makes the determination based on detecting that the portable electronic device is lost or stolen. For example, as discussed above, the server may detect that the portable electronic device is outside a permitted geographical area. In a specific implementation, the server receives location data from the portable electronic device indicating a location of the portable electronic device. The server calculates a distance between the location and a reference location. If the distance is greater than a threshold value, the server determines that the device is missing. The threshold value can be a user-configurable value.

For example, first user 2330 may reside in San Francisco and specify that the permitted or expected area in which the device will be used is a 100 mile radius from the first user's home in San Francisco (i.e., the reference location). If the portable electronic device is determined to be outside the 100 mile radius such as in Las Vegas, Nev., the server can make a determination that the portable electronic device is missing and send a command to the device that instructs the device to initiate an audio transmission.

The reference location may specified by the user when configuring the missing device mobile application. There can be any number of reference locations specified by the user. For example, a user who frequently travels between San Francisco and New York City may establish San Francisco as being a first reference location and New York City as being a second reference location. The server, upon receiving a location of the device, can determine whether the device is in San Francisco or New York City. If the device is in San Francisco or New York City, the server may determine that the device is not missing.

Alternatively, if the device is determined to be outside San Francisco or New York City (or outside a certain radius of the respective cities), the server may determine that the device is missing and, based on the device missing, send a command to the device that instructs the device to initiate an audio transmission. A reference location may be stored at the server, portable electronic device, or both. A reference location may include or be specified by a mailing address, zip code, area code, city, town, county, or any value or set of values (e.g., longitude and latitude) that can be used to identify a geographical location.

In another specific implementation, the server determines that the portable electronic device is missing based on detecting that the portable electronic device is within an unpermitted geographical area.

A particular geographical area may be defined as the area within a circle having a center as a reference location and a radius measured from the center (or reference location) to an edge of the circle. Alternatively, a particular geographical area may be defined as the area outside the circle. It should be appreciated, however, that a geographical area or the outline or boundary of a geographical area may not necessarily have the shape of a circle. The outline of a geographical area can be of any shape. For example, a geographical area may be defined by a zip code, area code, city, town, county, voting district, state, country, time zone, continent, and so forth.

More particularly, the server may determine that the portable electronic device is missing based on detecting that the device is within, for example, a particular zip code. In a specific implementation, the server receives location data from the portable electronic device indicating a location of the portable electronic device. The server determines that the location is within a particular geographical area. An outline of the particular geographical area may have a shape other than or that is different from a circle.

For example, the particular geographical area may be the area within a particular zip code (e.g., a zip code having a high rate of crime). To determine that the location of the portable electronic device is within the particular geographical area (e.g., zip code), the server may correlate the location data with a zip code database. For example, the received location data may include longitude and latitude coordinates. The server may consult the zip code database to determine the corresponding zip code associated with the received coordinates.

In another specific implementation, the server determines that the portable electronic device is missing based on detecting uncharacteristic behavior. Uncharacteristic behavior can include uncharacteristic or irregular device usage patterns, uncharacteristic or irregular device travel patterns, or both. For example, intelligence server 2197 (FIG. 21) can compare a first device usage pattern with a second device usage pattern. If the deviation or difference between the first and second device usage patterns is greater than a threshold deviation, the intelligence server may determine that the device is missing.

A usage pattern may include browsing history (e.g., a list of accessed web sites, time and date of access, time spent reviewing a particular web site, browsing frequency), outgoing call history (e.g., a list of phone numbers called, time and date of outgoing call, call duration, a number of outgoing calls made, outgoing call frequency), incoming call history (e.g., a list of incoming phone numbers, time and date of incoming call, call duration, a number of incoming calls received, incoming call frequency), messaging history (e.g., number of messages sent, time and date of message transmission, message recipient, number of messages received, time and date of message receipt), other usage, or combinations of these.

Consider the following example: the server receives from the portable electronic device a first usage pattern and a second usage pattern. The first usage pattern includes a first list of websites accessed during a first time period. The second usage pattern includes a second list of websites accessed during a second time period. A comparison of the first and second usage patterns by the intelligence server reveals that each website in the second list is different from each website in the first list. In many cases, a person typically visits the same or similar websites on a day-to-day or daily basis. Thus, based on each website in the second list being different from each website in the first list, the intelligence server may determine that the portable electronic device is missing—e.g., is being used by a different person who is visiting different websites.

As another example, a usage pattern may include a list of outgoing calls. In some cases, a person will make more calls to people listed in the device's directory as compared to a number of people called that are not listed in the directory. The intelligence server may compare the list of outgoing calls with the device's directory. If the phone numbers called are not found in the device's directory, the server may determine that the portable electronic device is missing—e.g., is being used by a different person who is making calls to new phone numbers.

Comparing usage patterns may include a calculating ratio and comparing the ratio to a threshold value. For example, the intelligence server may calculate a ratio of a number of websites previously visited to a number of newly visited websites. A ratio of a number of phone numbers previously called to a number of newly called phone numbers. If the ratio is greater than a threshold value, the intelligence server may determine that the device is missing.

In another specific implementation, determining that the portable electronic device is missing is based on detecting an uncharacteristic device travel pattern. Often, a person will have a regular travel pattern or route. For example, during the week, a person may leave for work at about the same time, take the same route from their home to the office, leave work at about the same time, and take the same route home. On weekends, the person may make the same errands such as visiting the same grocery store, mall, and so forth.

A deviation in travel pattern may indicate that the portable electronic device is missing, e.g., is being used by a different person having different travel patterns or routes, or is not being used because, for example, the device is lying hidden in some bushes. In a specific implementation, the server receives from the portable electronic device travel information including a set of locations at which the device was at and the time at which the device was at the locations. The server calculates a set of travel patterns. The server compares a first travel pattern with a second travel pattern. If the deviation or difference between the first and second travel patterns is greater than a threshold deviation, the server may determine that the portable electronic device is missing. A travel pattern may include GPS coordinates, speed or rate of travel, time information, date information, or combinations of these.

In a specific implementation, device usage and device travel information is collected by the system only if the user authorizes the collection. In this specific implementation, the user, at any time may enable or disable the collection of such information. Further, the user may direct the system to delete previously collected device usage and travel information. In some implementations, the collected device usage and travel information will be automatically deleted by the system after a certain period of time. This helps to protect user privacy. The user may further be able to specify the frequency at which data is to be collected and transmitted to the server.

Figure 24:
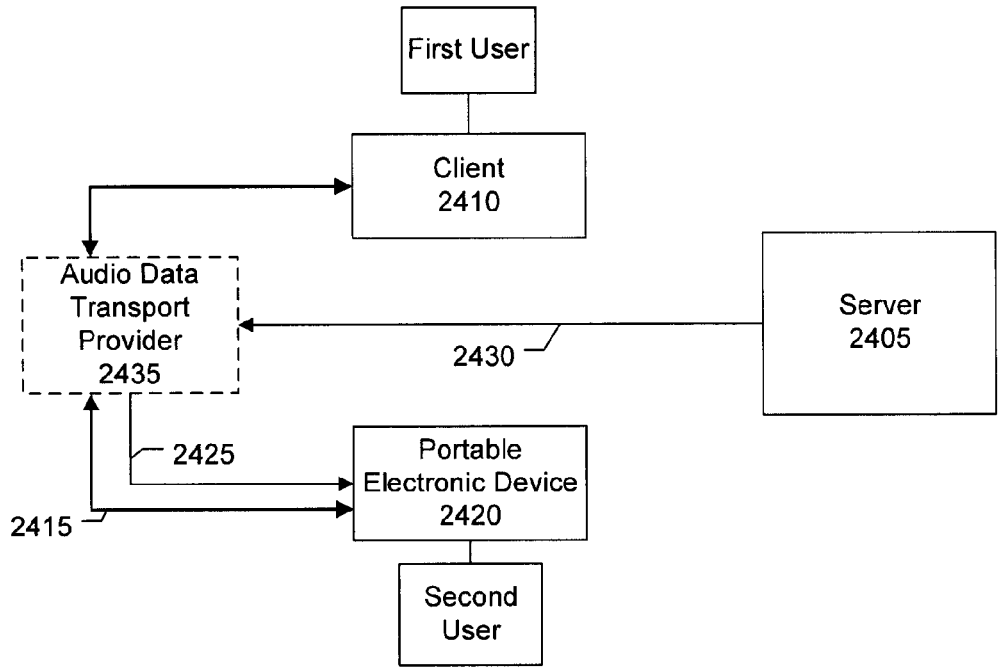
FIG. 24 illustrates a simplified block diagram of a server making a determination for an audio transmission and sending a command to an audio data transport provider.

FIG. 24 shows a simplified block diagram of another specific implementation of the system. In this specific implementation, a server 2405 determines, without receiving a request from a client 2410, that an audio transmission 2415 between the client and a portable electronic device 2420 should be initiated 2425. The flow shown in FIG. 24 is similar to the flow shown in FIG. 23. In the specific implementation shown in FIG. 24, however, the server sends a command 2430 to an audio data transport provider 2435. In turn, the audio data transport provider initiates 2425 the audio transmission.

Figure 25:
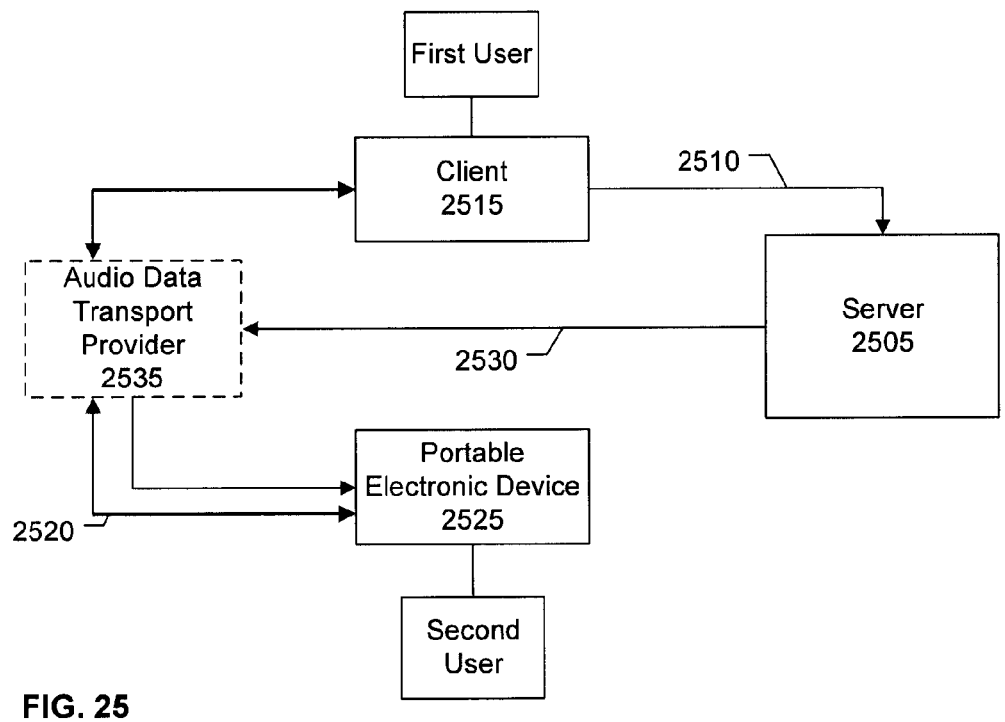
FIG. 25 illustrates a simplified block diagram of a server receiving a request for an audio transmission and sending a command to an audio data transport provider.

FIG. 25 shows a simplified block diagram of another specific implementation of the system. In this specific implementation, a server 2505 receives a request 2510 from a client 2515 for an audio transmission 2520 to be established between the client and a portable electronic device 2525. The flow shown in FIG. 25 is similar to portions of the flows shown in FIGS. 22 and 24. More particularly, as shown in FIGS. 22 and 25, the server receives a request for the audio transmission from the client. As compared to FIG. 22, however, in FIG. 25 the server sends a command 2530 for initiation of the audio transmission to an audio data transport provider 2535 (see also FIG. 24).

Figure 26:
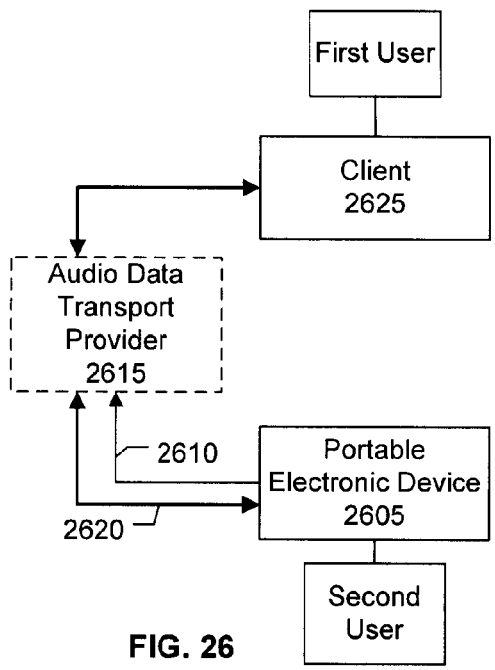
FIG. 26 illustrates a simplified block diagram of a portable electronic device detecting an event and based on the detected event, determining that an audio transmission should be established.

FIG. 26 shows a simplified block diagram of another specific implementation of the system. In this specific implementation, a portable electronic device 2605 detects an event or security event occurring at the device. The device responds to the event by communicating 2610 with an audio data transport provider 2615 which establishes an audio transmission 2620 between the portable electronic device and a client 2625. As discussed above, an event can be motion, incorrect passcode, new contact added/deleted/updated, SIM card swap/remove, connect to computer (e.g., USB), attempt to uninstall app, attempt to wipe device, detecting uncharacteristic behavior, or combinations of these. The audio transmission or the sending of data, receiving of data, or both may be done without user intervention or in response to user action.

In this specific implementation, the portable electronic device includes missing device mobile app 2185 (FIG. 21) including detection module 2189. The detection module can detect a security event occurring at the device. In response to the detected security event, the missing device mobile app determines that an audio transmission should be established between the device and a client. The missing device mobile app communicates with a VOIP provider to establish the audio transmission between the portable electronic device and the client.

Detecting a security event occurring at the device may include detecting that a screen of the device has been powered on, detecting an attempt to power on the screen, detecting movement of the device, detecting use of or an attempt to use the device camera, detecting that an incorrect password has been entered, detecting that a contact has been added to a contacts list or directory stored on the device, detecting an attempt to add a contact, detecting that a contact has been deleted, detecting an attempt to delete a contact, detecting that a contact has been updated, detecting an attempt to update a contact, detecting that a SIM card of the device has been removed, detecting that a SIM card of the device has been replaced with a different SIM card, detecting that the portable electronic device has been connected to another computer, detecting an attempt to uninstall a mobile application program on the device, detecting deletion of data from the device, detecting an attempt to delete data from the device, detecting uncharacteristic behavior, or combinations of these. In a specific implementation, audio data is only sent upon a certain condition being met (e.g., motion, send audio data only when condition is met or within a certain time period of condition being met).

In a specific implementation, the detection module is activated after the portable electronic device receives a lock command to enter a lockdown mode. This can help to prevent false alarms. For example, using the device camera, updating the directory, and other operations can be typical operations by the device owner. So, in these cases, it would generally not be desirable for these operations to be classified as a security event that triggers an audio transmission to be established. If, however, the owner loses the device, the owner can direct that the server send a command to lock the device. When the device is in lockdown mode, the detection module can be activated so that, for example, use of the device camera does trigger an audio transmission to be established.

In another specific implementation, the detection module may be executing on the device as a background service even if the device is not in a lockdown mode. For example, the detection module may detect a number of consecutive times an incorrect password is entered. A number that is greater than a threshold number may indicate that the portable electronic device is missing and someone else is attempting to break into the device (e.g., guess the device password). Thus, the missing device mobile application may initiate the audio transmission with the client. This allows the device owner at the client to, for example, speak with the person who has the device, monitor activities at the location of the device, or both.

The discussion accompanying FIG. 23 describes a specific implementation of an intelligence server that can detect when the portable electronic device may be missing. In a specific implementation, features of the intelligence server may be implemented on the portable electronic device. This allows for the determination of uncharacteristic behavior at the portable electronic device rather than the server. For example, the missing device mobile app program may include an intelligence module that can determine whether the device is missing. As discussed above in connection with FIG. 23, the determination may be based on the device being within a particular geographical area, outside a particular geographical area, a comparison of device usage patterns, a comparison of device travel patterns, or combinations of these.

Making the determinations at the device can be beneficial in cases where, for example, the server is unavailable. Alternatively, making the determination at the server can allow for more data to be processed and more complex correlations to be made because the server typically includes more processing power than the portable electronic device.

Figure 27:
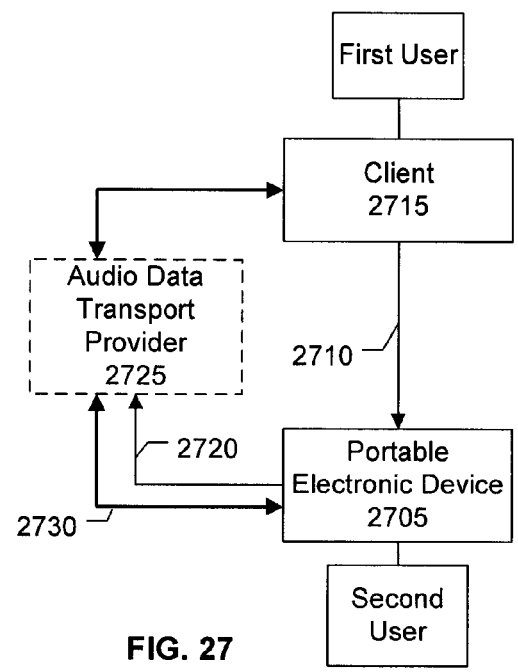
FIG. 27 illustrates a simplified block diagram of a portable electronic device receiving a command from a client for an audio transmission.

FIG. 27 shows a simplified block diagram of another specific implementation of the system. The flow shown in FIG. 27 is similar to the flow shown in FIG. 22. In the flow of FIG. 27, however, a portable electronic device 2705 receives a request or command 2710 directly from a client 2715. In response, the portable electronic device communicates 2720 with an audio data transport provider 2725 to establish an audio transmission 2730 between the portable electronic device and the client.

The command from the client received at the portable electronic device may include a message (e.g., SMS message). Based on the message or the content of the message, the portable electronic device may communicate with the audio data transport provider to establish the audio transmission with the client. For example, the message may include an identifier and instructions. The identifier may be a personal identification code (PIN) that the missing device app program at the portable electronic device can use to authenticate the message as being from an owner of the device. The instructions may include a command, e.g., "CONNECT," that instructs the portable electronic device communicate with the audio data transport provider to establish the audio transmission. The message may further include a number associated with the client which the portable electronic device can forward to the audio data transport provider so that the provider can identify the client for the audio transmission.

Figure 28:
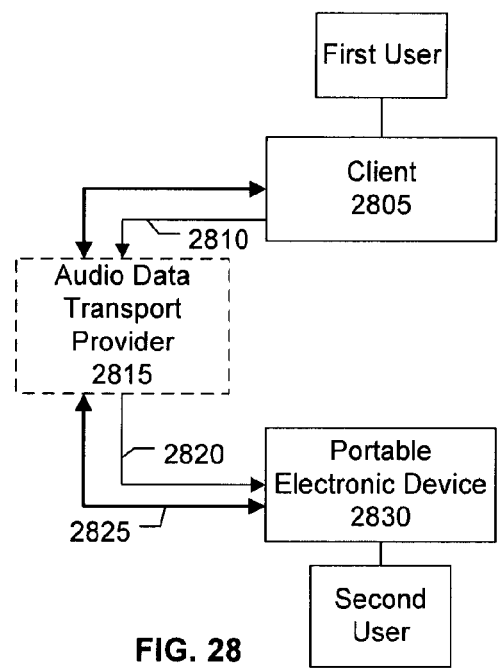
FIG. 28 illustrates a simplified block diagram of a client sending a command to an audio data transport provider for initiation of an audio transmission.

FIG. 28 shows a simplified block diagram of another specific implementation of the system. The flow shown in FIG. 28 is similar to the flow shown in FIG. 27. In the flow of FIG. 28, however, a client 2805 sends a command 2810 directly to an audio data transport provider 2815 which, in turn, initiates 2820 an audio data transmission 2825 between the client and a portable electronic device 2830.

The specific flows shown in FIGS. 22-28 may be implemented in any combination. The various components or entities (e.g., client, server, audio data transport provider, and portable electronic device) can interact using any combination of flows shown in FIGS. 22-28. For example, although FIG. 28 does not show the server component, another specific implementation may include the server component. Data (e.g., audio data) may be sent from the client, portable electronic device, or both to the server. Data may be sent from the server to the client, portable electronic device, or both.

Further, there can be multiple client devices exchanging data (e.g., audio data) with the portable electronic device (e.g., conference or group calling). In a specific implementation, the system facilitates the transport of audio over a circuit or a packet switched interface (e.g., telephony network or data connection). The transfer of audio data can be a real-time communication (e.g., a telephone call). Alternatively, the transfer of audio data may be in batch (e.g., recording a sound for 30 seconds and sending that to a client).

Figure 29:
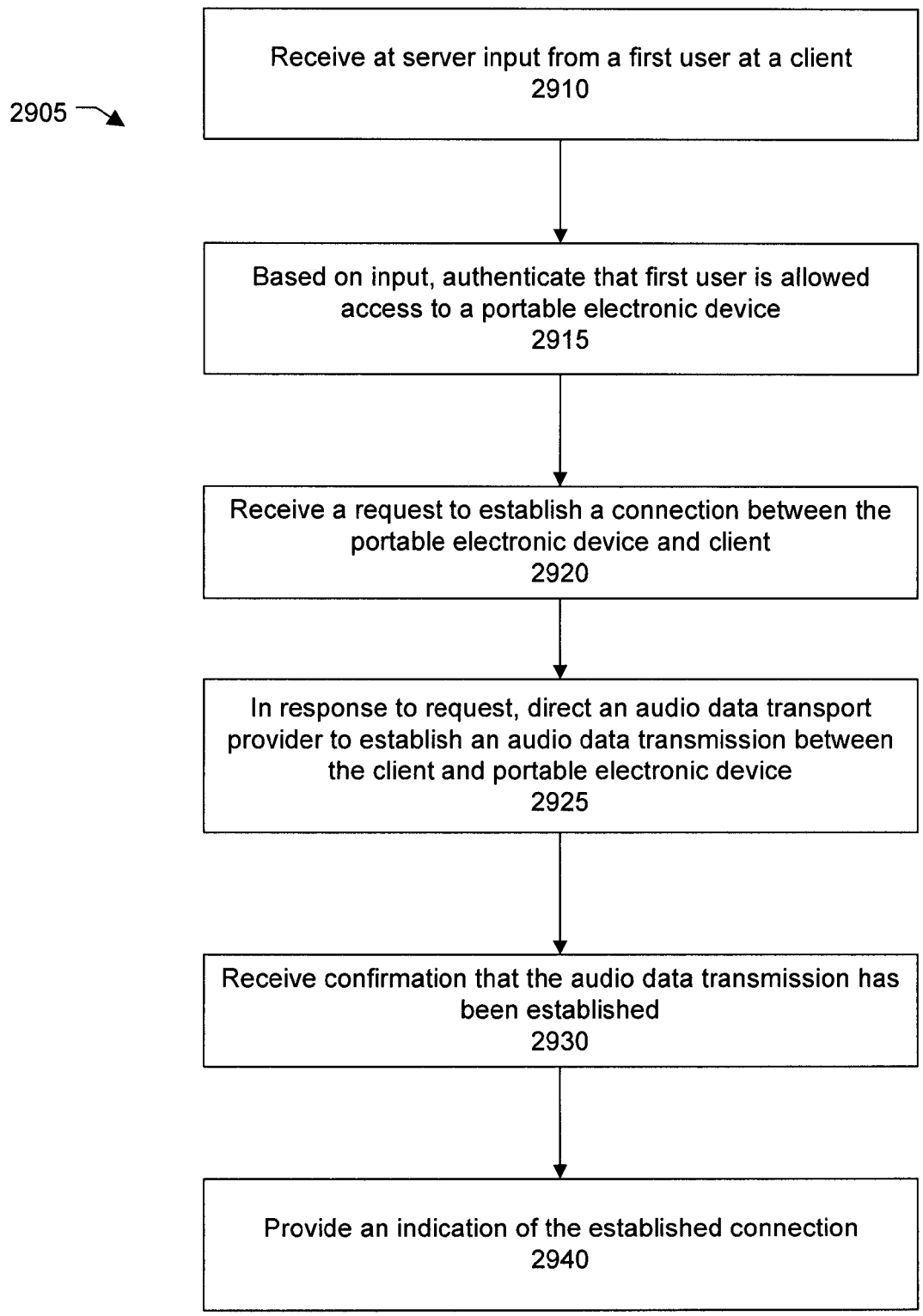
FIG. 29 illustrates an overall flow of a specific implementation of a feature that may be referred to as "Call My Device."
Figure 30:
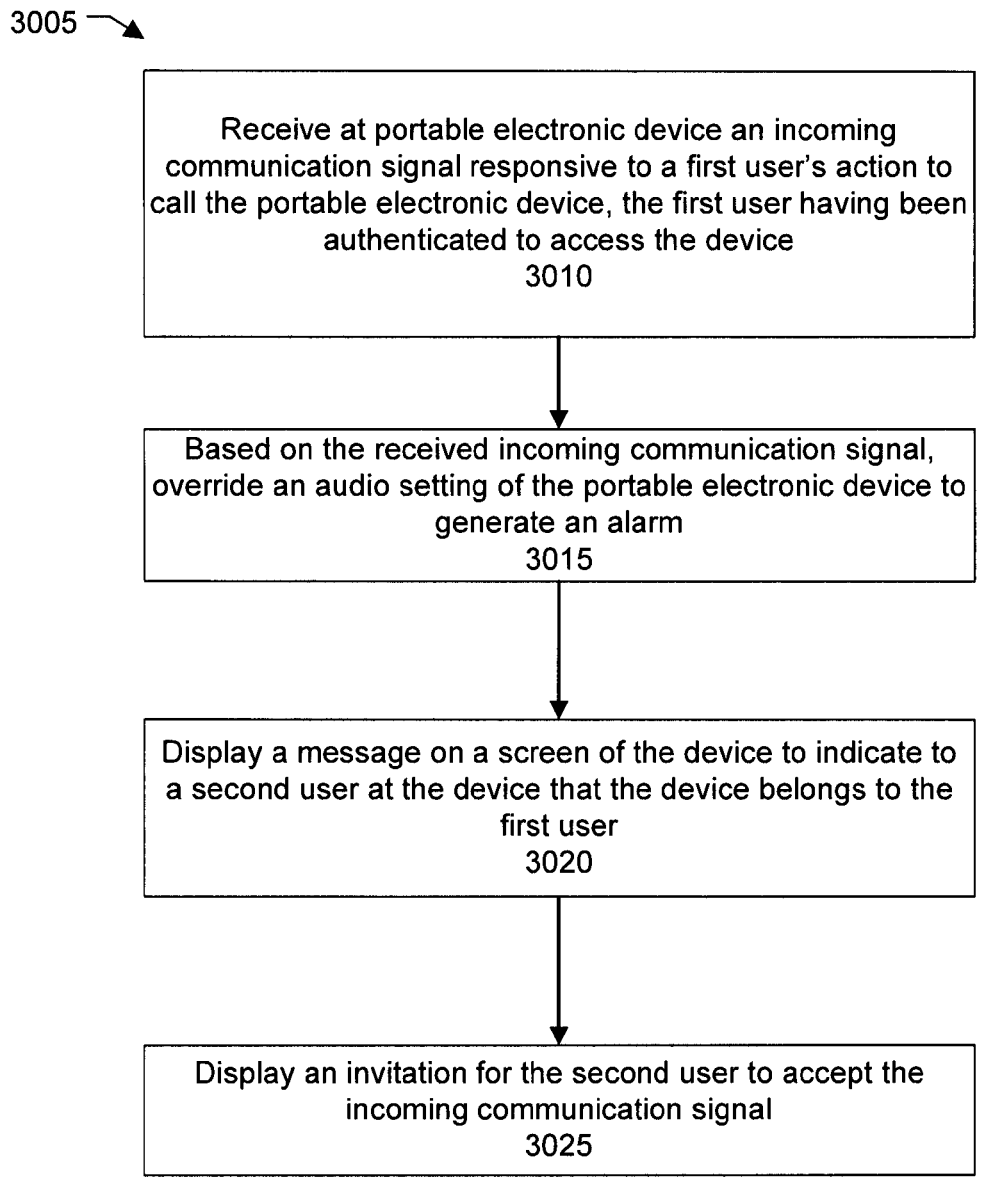
FIG. 30 illustrates an overall flow of another specific implementation of the "Call My Device" feature.

FIGS. 29-41 show overall flows and screenshots of a specific implementation of the system shown in FIG. 21. In this specific implementation, the system is embodied in a feature that is called Lookout Mobile Security: Missing Device. This system is designed to help people find and recover their missing portable electronic devices. FIGS. 29-30 show overall flows 2905 and 3005, respectively, of specific techniques that may be used to establish a connection with the missing portable electronic device.

In a specific implementation, the techniques shown in FIGS. 29-30 are embodied in a feature that is referred to as "Call My Device." A user or portable electronic device owner may use this feature if they lose their device and want to connect to it from, for example, the web app so that they can try to talk to whoever may have the device. In a specific implementation, the user authenticates that they are authorized to access the device or are the owner of the missing device and using a web application, they initiate a two way audio connection to the missing device. The missing device rings and the connection is automatically established. That is, the device automatically answers the two way audio connection without any interaction from the person who has the lost device. The web app will indicate when the connection is established so that the user knows when they can begin speaking to the person who has the lost device.

In another specific implementation, the connection is not automatically established. In this specific implementation, the connection is established when a user at the missing device accepts the call to the missing device. That is, in this specific implementation, the two way audio connection only connects once there is user initiation to receive the call.

Figure 31:
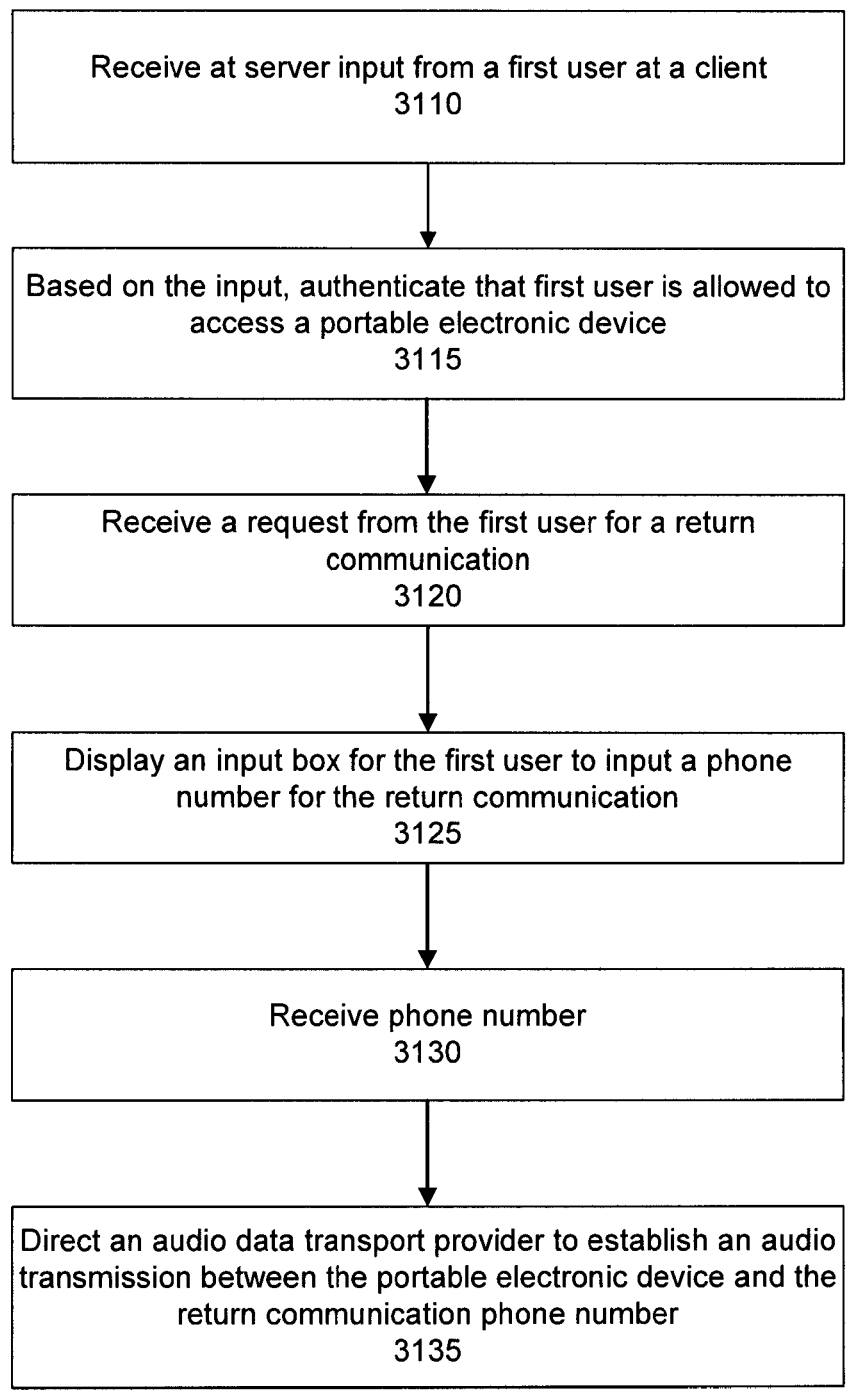
FIG. 31 illustrates an overall flow of a specific implementation of a feature that may be referred to as "Call Me Back."
Figure 32:
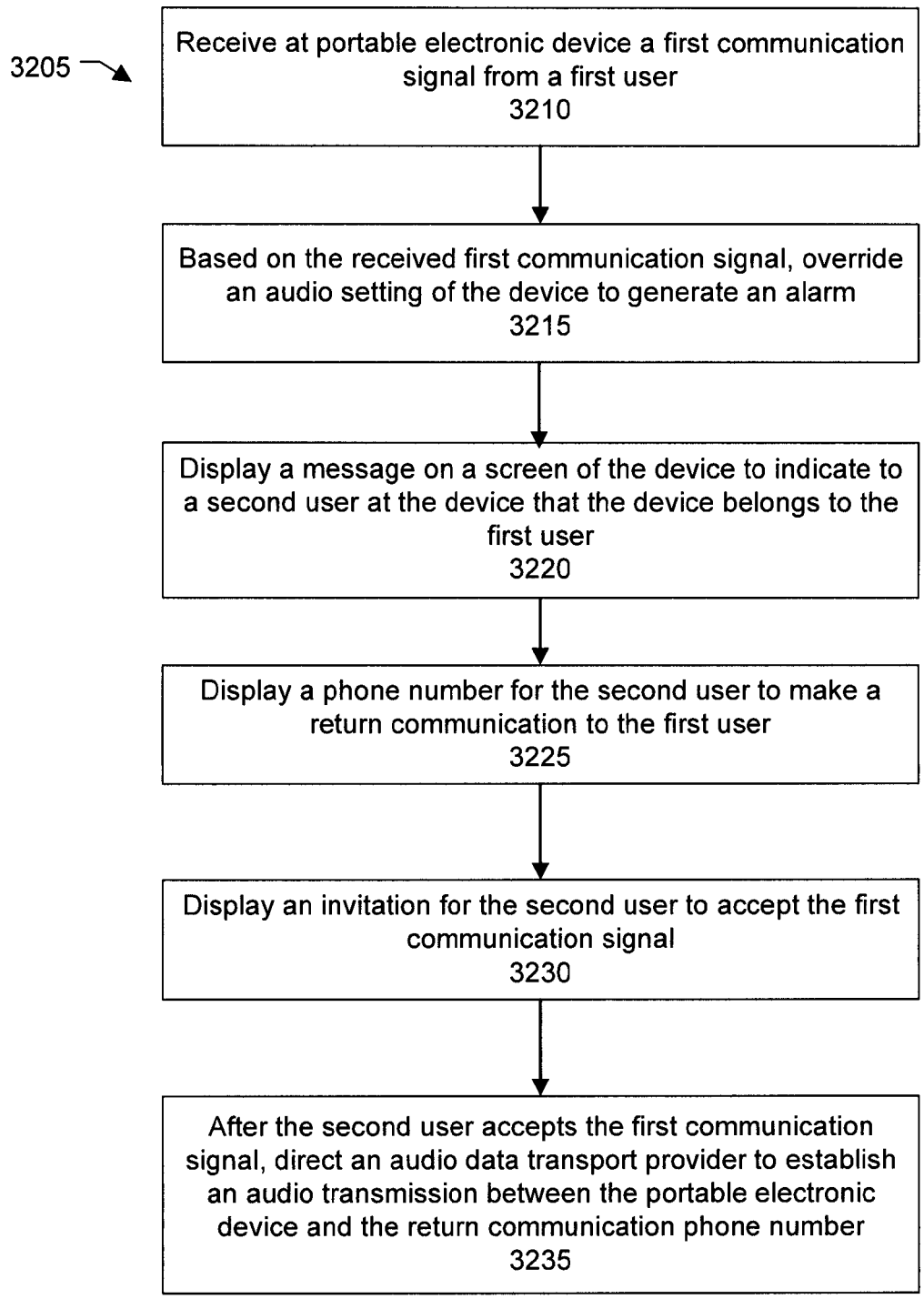
FIG. 32 illustrates an overall flow of another specific implementation of the "Call Me Back" feature.

FIGS. 31-32 show overall flows 3105 and 3205, respectively, of other techniques to establish contact with the missing portable electronic device. In a specific implementation, the techniques shown in FIGS. 31-32 are embodied in a feature that is referred to as "Call Me Back." The user or portable electronic device owner may use this feature if they lose their device and want to have their lost device connect to a back-up number that they have previously selected. In a specific implementation, the user initiates a two way audio connection from, for example, the web app. The lost device begins to ring with a message such as, "The owner of this device is trying to locate this phone. Click to answer or please call ##########." If the person who has the lost device clicks on the message, a call is initiated from the lost device to the back-up number. The call completes to the back-up number.

FIGS. 33-41 show some screen shots of a specific implementation of a system and method for remotely-initiated audio communication. In this specific implementation, the screen shots are of Web or application pages generated by the system and displayed on an electronic screen to a user. As discussed, the screen shots are of a specific implementation of a system called Lookout Mobile Security: Missing Device. The system, however, may be known by any name or identifier, and these screen shots are provided merely as a sample implementation. It should be understood that the system is not limited to the specific features presented. Aspects (e.g., screens, graphical user interface, or web pages) of the system may be modified or altered as appropriate for a particular application or use.

Referring now to FIG. 29, in brief, in a step 2910 there is a first user at a client. The system receives at a server input from the first user. The input may include user credentials (e.g., user name and password). In a step 2915, based on the input, the first user is authenticated as being allowed access to a portable electronic device. In a step 2920, the server receives a request to establish a connection between the missing portable electronic device and the client. In a step 2925, in response to the request, the server directs an audio data transport provider to establish an audio transmission between the client and the missing portable electronic device. In a step 2930, the server receives confirmation that the audio data transmission has been established. In a step 2940, the server provides to the first user at the client an indication of the established connection.

The client may be a computer such as a laptop or desktop computer. In this specific implementation, there can be a browser 2148 (FIG. 21) on the client computer that the first user or owner of the missing device can use to connect to server 2109 to access web application 2199A provided by the system. The web application may include a login page having input boxes to receive from the user authentication information such as a username, password, personal identification number (PIN), or combinations of these. Other examples of authentication techniques that may be used include two-factor or three-factor authentication.

Figure 35:
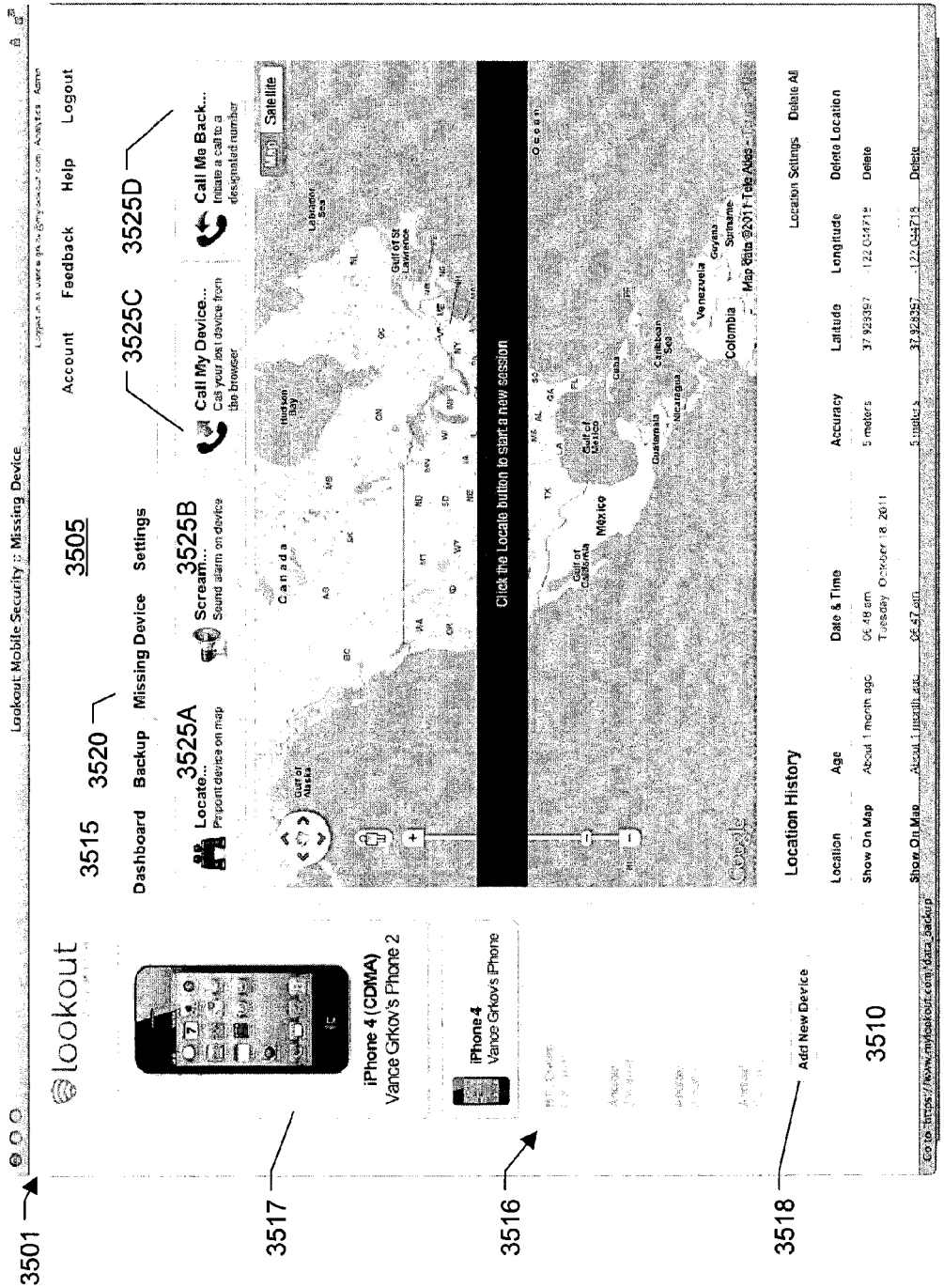
FIG. 35 illustrates a screen shot of a specific implementation of a missing device web application in a browser window.

More particularly, FIG. 35 shows a screen shot of a window 3501 displaying a missing device web page 3505 provided by the web application. This web page may be displayed on the screen of the client computer after the user has been authenticated. In this specific implementation, the missing device web page includes a first section or column 3510 and a second section or column 3515. The first section is adjacent or next to the second section.

The first section includes a list 3516 of portable electronic devices that belong to the logged in or authenticated user. The logged in user may own or be authorized to access two or more portable electronic devices or mobile communication devices such as a smartphone, and a tablet computer. Based on the user input (e.g., username and password), the authentication server can authenticate that the user is allowed to access these devices. Missing device web page 3505 provides a graphical user interface (GUI) that allows the user to contact each portable electronic device that the user is authorized to access.

In a specific implementation, devices that do not belong to the logged in user or devices that the user is not allowed to access are not shown or are not visible. That is, each portable electronic device shown in the list of portable electronic devices belong to the logged in user. Portable electronic devices that the user is not allowed to access are excluded or omitted from the list. Thus, in this specific implementation, this interface as shown in FIG. 35 does not permit the logged in user to contact devices that the user is not authorized to access.

As shown in FIG. 35, there is an icon or image 3517 of a portable electronic device identified as "iPhone 4 (CDMA)" that the logged in user is allowed to access. This particular device is shown highlighted at the top of the first column to indicate that it is currently selected. Other examples of portable electronic devices that the user may be authorized to access include tablet devices (e.g., Apple iPad, Samsung Galaxy Tab, HP TouchPad, or BlackBerry PlayBook).

There is a button 3518 labeled "Add New Device" so that the user can add or register new devices to their system account. In a specific implementation, new device registration includes a confirmation process to help ensure that the new device to be added belongs to the user or that the user is allowed to access the device. This helps to prevent users from adding or registering devices that do not belong to them and abusing the features provided the missing device application.

For example, the confirmation process may include sending or transmitting a verification code to a device that a user claims to own or have access to. The verification code may be transmitted, for example, via text message to the device, a phone call placed to the device, or both. The user inputs the verification code to the system.

Upon receipt of the verification code at the server, the server determines whether the inputted verification code matches the verification code sent to the device. If there is a match, the user is determined to be allowed access to the device or determined to be an owner of the device and the device may be displayed in list 3516. If there is not a match, a determination is made that the user is not allowed to access the device or is not the owner of the device and the device may not be displayed in list 3516.

The second section includes a set of tabs including a dashboard tab, a backup tab, a missing device tab 3520 (selected), and a settings tab. The missing device tab includes features to help the authorized user find their missing portable electronic device. Specifically, the missing device tab may include a locate button 3525A, a scream button 3525B, a call my device button 3525C, and a call me back button 3525D.

The locate button allows the authorized user to see the location of their selected device on the map. Techniques for locating the device are further discussed in U.S. patent application Ser. No. 12/372,719, filed Feb. 17, 2009, entitled "SYSTEM AND METHOD FOR REMOTELY SECURING OR RECOVERING A MOBILE DEVICE" which is incorporated by reference along with all other references cited herein. The scream button sounds an alarm on the selected device. The call my device button allows the authorized user to call their lost device from the browser. The call me back button allows the authorized user to instruct the device to initiate a call to a designated number or a back-up number—see FIGS. 31-32 and accompanying discussion.

Figure 36:
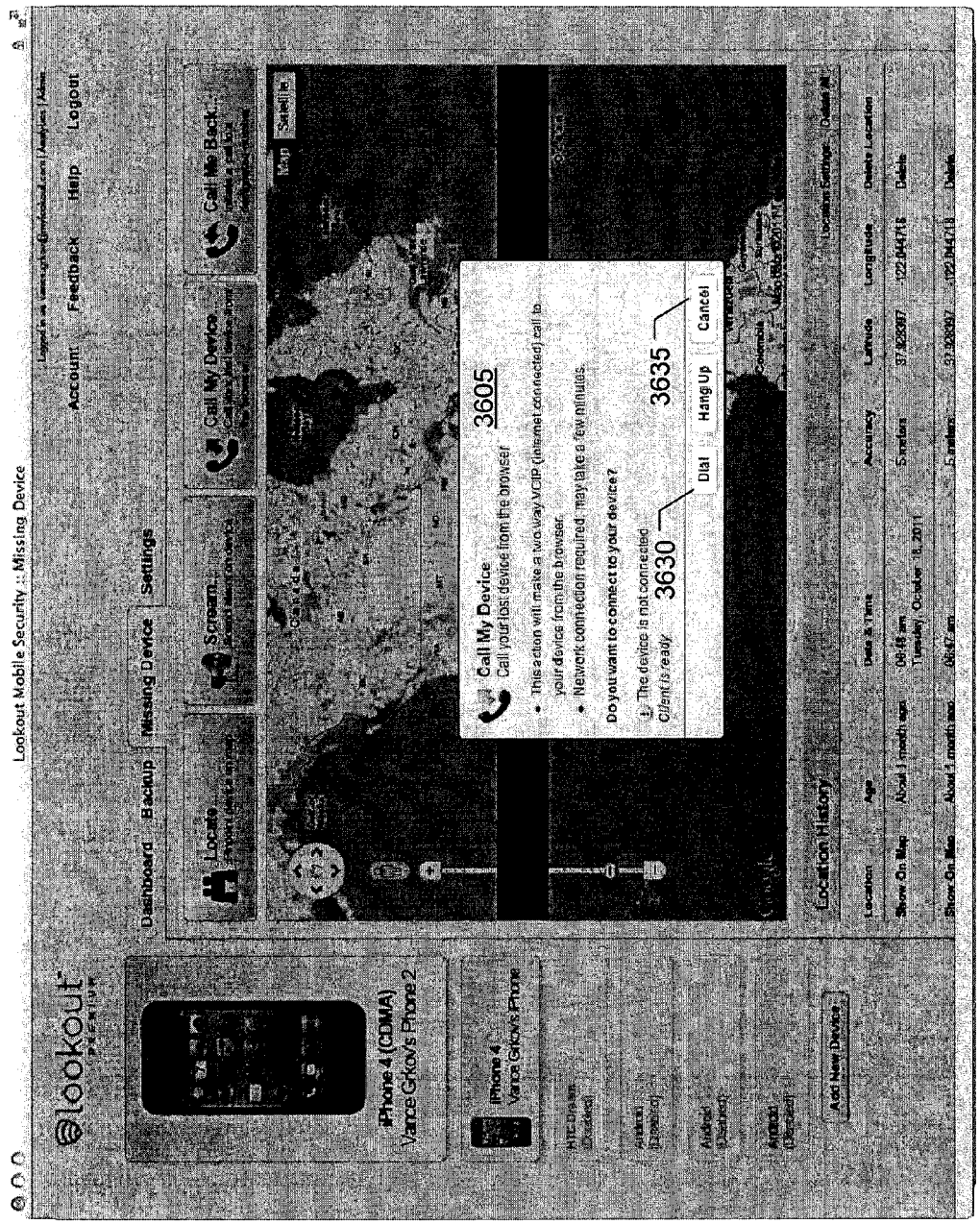
FIG. 36 illustrates a screen shot of the missing device web application's "Call My Device" feature.

To use the "Call My Device" feature, the authorized user selects (e.g., clicks on) call my device button 3525C. In response, a dialog box 3605 (FIG. 36) is displayed for the authorized user to confirm the selection. As shown in FIG. 36 the dialog box is overlaid on the missing device web page which has been grayed out. The dialog box includes a brief description of the feature or selected action, e.g., "This action will make a two way VOIP (Internet connected) call to your device from the browser. Network connection required; may take a few minutes," a request for confirmation, e.g., "Do you want to connect to your device?," a connection status, e.g., "The device is not connected," and a client status, e.g., "Client is ready." The authorized user can confirm the action to call their device by clicking a dial button 3630 or cancel the action by clicking a cancel button 3635.

Figure 33:
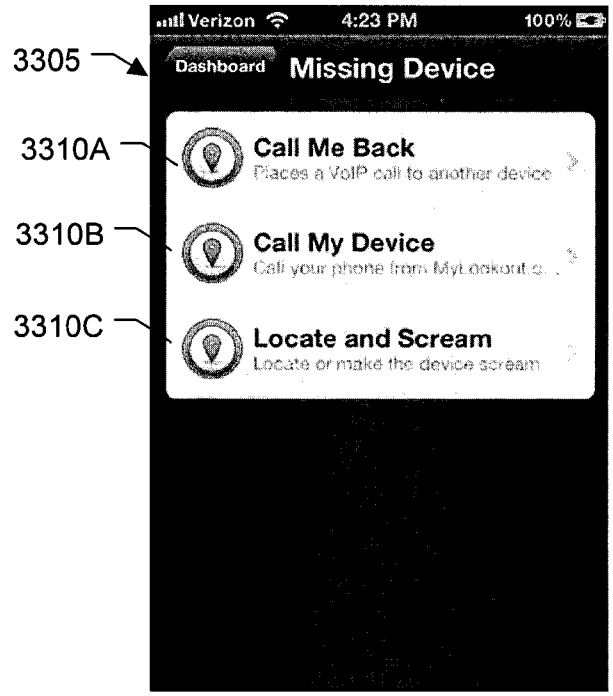
FIG. 33 illustrates a screen shot of a specific implementation of a missing device mobile app on a portable electronic device.

FIG. 33 shows an example where the client is a smartphone or tablet computer having a mobile app that the authorized device user may use to contact the missing device. FIG. 33 shows a screen shot of a specific implementation of a missing device smartphone application 3305. There are several options displayed on the screen of the client including first, second, and third options or actions 3310A-C, respectively, for the device owner to select.

First option 3310A is labeled "Call Me Back." Selecting this option can cause the missing device to place a call (e.g., VoIP call via the audio data transport provider) to the client device that the authorized user is at, a different client device, or both—see FIGS. 31-32 and accompanying discussion.

Second option 3310B is labeled "Call My Device." Selecting this option allows a connection to be made between the client device that the authorized user is at and the authorized user's missing portable electronic device—see FIGS. 29-30 and accompanying discussion.

Third option 3310C is labeled "Locate and Scream." Selecting this option helps the authorized user to locate the missing device such as by identifying its location on a map or making the missing device scream or sound an alarm.

Referring now to FIG. 30, after the authorized device user or first user confirms the action to call their missing portable electronic device, server 2109 (FIG. 21) directs audio data transport provider 2110 to establish an audio data transmission between the portable electronic device and client. In a step 3010, the missing device receives an incoming communication signal responsive to the first user's action to call the device. In a specific implementation, in a step 3015, based on the received incoming communication signal, an audio setting of the missing device is overridden to generate an alarm. For example, audio controller 2191 of missing device mobile app 2185 (FIG. 21) on missing device 2106 may override volume setting 2176, mute setting 2177, ringtone setting 2178, or combinations of these.

In other words, an alarm may be heard through speaker 2163 of the missing device even if the mute setting of the missing device is enabled, the missing device is set to mute, or the missing device is set to vibrate. The alarm may be emitted at a decibel or volume level different from the volume setting of the missing device.

For example, if the volume of the missing device is set at a first decibel level, the alarm may be emitted at a second decibel level, greater than the first decibel level. The second decibel level may be a maximum decibel of the device. This allows users who may be located in close proximity to the missing device to hear the alarm. The sound of the alarm may be a scream or a siren (e.g., a loud wailing sound). The sound (e.g., siren) may override a ringtone setting of the missing device. For example, the ringtone setting of the missing device for incoming calls may be set to the sound of crickets or chimes, but the sound emitted through the missing device speaker may be that of a siren.

Instead or additionally, the alarm may include a voice, e.g., "Please pick up this phone!," or "Is anyone there? This phone is lost and the owner is trying to get it back." The voice may be the voice of the owner or a pre-recorded message provided by the system. The voice may be played repeatedly or two or more times, e.g., "Please pick up this phone!, Please pick up this phone!, Please pick up this phone!"

The alarm can override headphone, sound routing, or both. For example, if the finder or person who has the missing or lost device is using the headphone jack of the missing device, e.g., listing to music on the missing device, the alarm can override the music.

Figure 37:
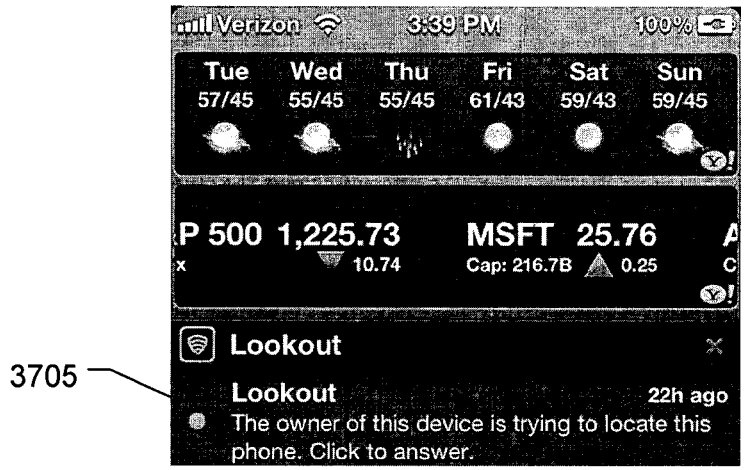
FIG. 37 illustrates a screen shot of a portable electronic device receiving a missing device message via the "Call My Device" feature.

In a step 3020, a message is displayed on the display or electronic screen of the missing portable electronic device. The message indicates to the second user that the missing device belongs to the first user. In a step 3025, an invitation is displayed for the second user to accept the incoming communication signal. For example, FIG. 37 shows a screen shot of a message 3705 that may be displayed on the missing portable electronic device. The message includes the following text, "The owner of this device is trying to locate this phone. Click to answer."

In a specific implementation, steps 3015-3025 are optional. In this specific implementation, the missing device automatically answers the connection or two way audio connection without any user interaction at the missing device or without any interaction from the person who has the missing or lost device. That is, after server 2109 (FIG. 21) directs audio data transport provider 2110 to establish an audio data transmission between portable electronic device and the client, answer call module 2186 of missing device mobile app 2185 can automatically accept the incoming communication signal from the audio data transport provider, i.e., without receiving acceptance of the incoming communication signal from a user (e.g., user 2194B) at the device.

The answer call module may determine whether the incoming communication signal is to be accepted automatically or not automatically (e.g., provide notification of incoming signal) based on, for example, instructions that may accompany the incoming communication signal, or an identifier accompanying the incoming signal (e.g., first identifier=accept automatically, second identifier=provide notification).

In this specific implementation, when the incoming communication signal (e.g., call) from the audio data transport provider is received at the missing device, audio controller 2191 can override audio settings 2175 so that no sound is emitted from the missing device, e.g., no sound is emitted through missing device speaker 2163.

For example, the mute or vibrate setting of the missing device may be turned off or disabled or the device may be set to generate a ringtone sound upon a call or other incoming communication signal being received. Typically, when the mute setting of, for example, a smartphone is set to off or mute is disabled, the smartphone will ring to indicate an incoming call. The audio controller can override these settings so that no sound is generated at the missing device. Thus, the connection can initiate a ring or no ring on the missing device. The connection can override volume settings. The connection can override ring sounds. The connection can override headphone/sound routing.

Automatic acceptance of the incoming communication signal can be beneficial in cases where the portable electronic device owner believes that their missing device has been stolen or the person who has the missing device is unlikely to return the missing device. In these cases, the system can establish the connection automatically or silently so that any people, e.g., thieves near the missing device are not alerted to the connection or the attempt by the owner to locate the missing device. The missing device owner can then listen to, for example, conversations between the thieves.

This can be desirable because there may be clues in the conversation that the missing device owner, police, or both can use to locate the missing device and apprehend the thieves. The connection may be used to record sound from the missing device, initiate picture taking, video recording, connect the missing device to an automated system, or combinations of these. Sound or audio files (e.g., .mp3, or .wav), video files, picture files, telephony, or VoIP may be transported in real-time or as batched files.

FIGS. 31-32 show flows for specific implementations of a feature that may be referred to as "Call Me Back." Referring now to FIG. 31, step 3110 (receive at server input from first user) and step 3115 (authenticate that first user is allowed to access portable electronic device) may be similar to steps 2910 and 2915, respectively, as shown in FIG. 29 and described in the discussion accompanying FIG. 29.

In brief, in a specific implementation, in a step 3120, the server receives a request from the first user for a callback (e.g., return call or return communication). In a step 3125, the system displays (or causes to be displayed at the client) an input box for the first user to input a phone number (e.g., call back number or back-up number) for the return communication. In a step 3130, the server receives the phone number. In a step 3135, the server directs an audio data transport provider to establish an audio data transmission between the portable electronic device and the return communication phone number.

More particularly, in a specific implementation, after the first user has been authenticated as being authorized to access the missing portable electronic device, the first user can select call me back option 3525D from missing device web page 3505 (FIG. 35). In response, a dialog box 3905 (FIG. 39) is displayed for the owner to confirm the selection and enter additional information for the callback.

Figure 39:
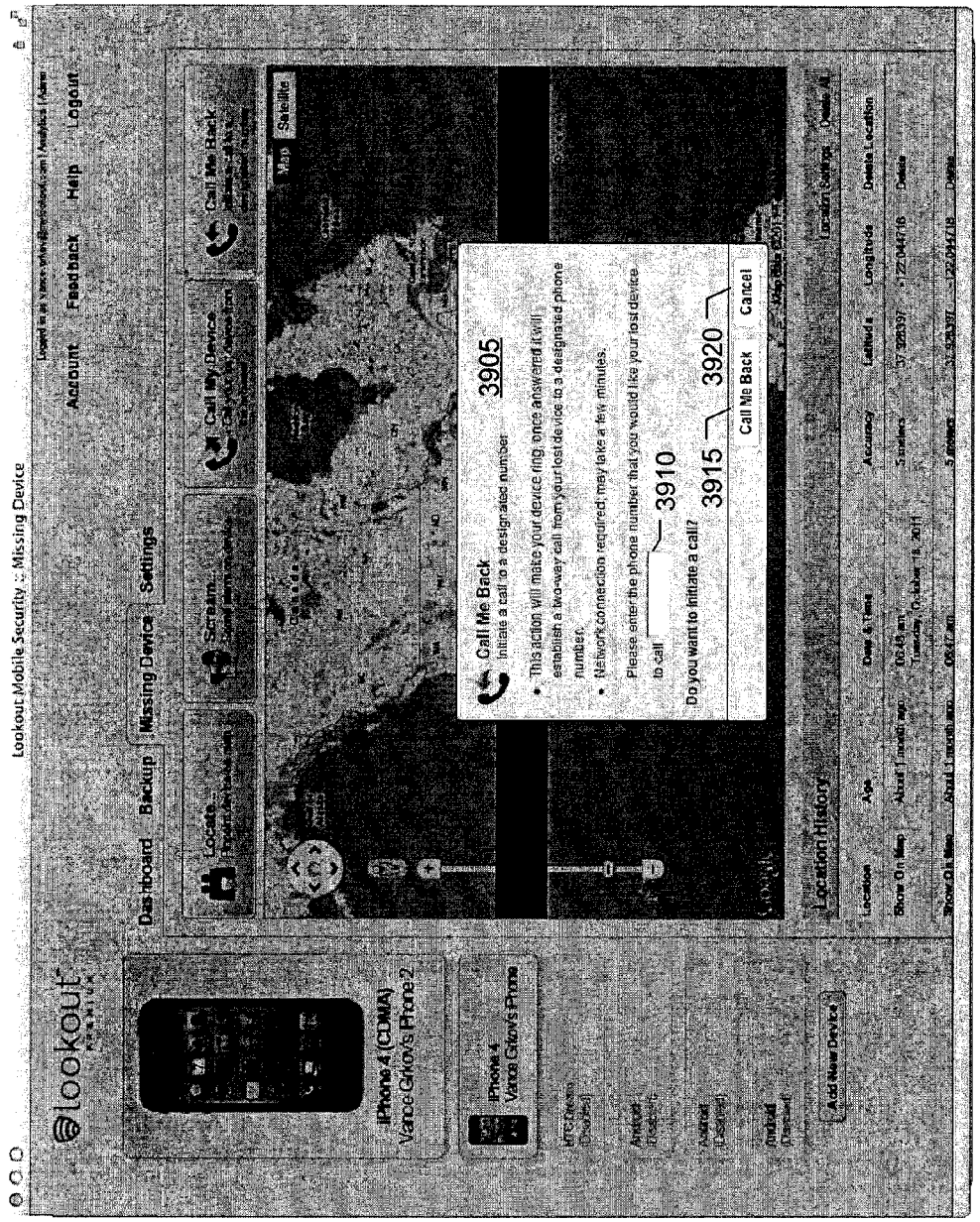
FIG. 39 illustrates a screen shot of the missing device web application's "Call Me Back" feature.

As shown in FIG. 39, in this specific implementation, the dialog box includes a brief description of the feature or selected action, e.g., "This action will make your device ring, once answered it will establish a two-way call from your lost device to a designated phone number. Network connection required; may take a few minutes," a request for the missing device owner to enter or input 3910 the phone number or backup number to be called, e.g., "Please enter the phone number that you would like your lost device to call," and a request for confirmation, e.g., "Do you want to initiate a call?" The missing device owner can input the phone number to be called in input box 3910. The missing device owner can confirm the action by clicking a call me back button 3915 or cancel the action by clicking a cancel button 3920.

In another specific implementation, the missing device owner may access the "Call Me Back" feature from a mobile application such as shown in FIG. 33—see option 3310A.

Referring now to FIG. 32, after the authorized missing device user or first user confirms the action for a callback, server 2109 (FIG. 21) directs the audio data transport provider to transmit a communication signal to the missing portable electronic device. In a step 3210, the missing device receives an incoming first communication signal responsive to the first user's action for a callback. In a step 3215, based on the received first communication signal, an audio setting of the missing device is overridden to generate an alarm. Techniques to override the audio setting may be similar to those discussed in connection with step 3015 (FIG. 30).

In brief, in a step 3220, display message module 2190 (FIG. 21) displays a message on the screen of the missing device to indicate to a second user at the missing device (e.g., the device finder) that the missing device belongs to the first user. In steps 3225 and 3230, the display message module displays the phone number specified by the first user (see step 3125—FIG. 31) for the second user to make a return communication, and displays an invitation for the second user to accept the first incoming communication signal. In a step 3235, after the second user accepts the first incoming communication signal, place call module 2187 (FIG. 21) at the missing device transmits a second communication signal to the audio data transport provider for the audio data transport provider to establish an audio transmission between the portable electronic device and the return communication phone number specified by the first user.

Figure 40:
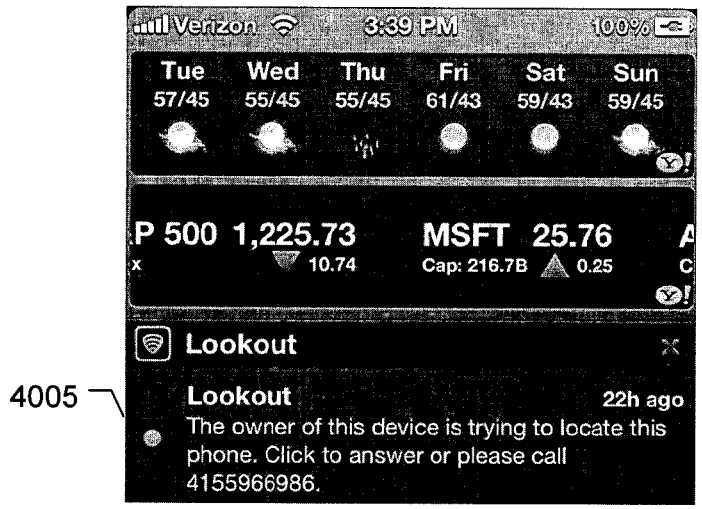
FIG. 40 illustrates a screen shot of a portable electronic device receiving a missing device message via the "Call Me Back" feature.
Figure 41:
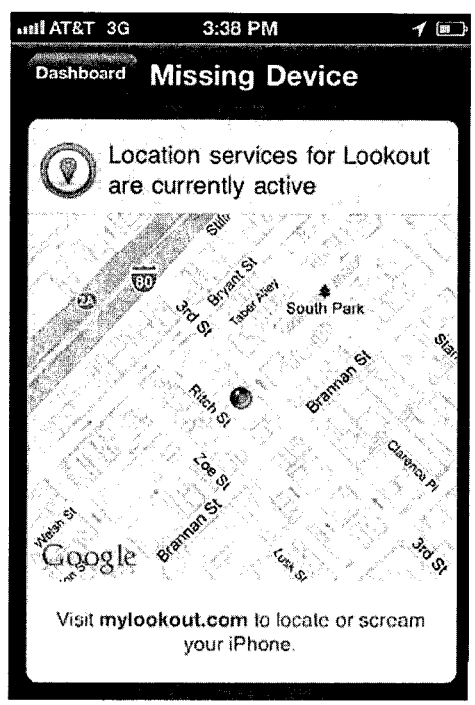
FIG. 41 illustrates a screen shot of a map showing a location of the missing portable electronic device.

For example, FIG. 40 shows a screen shot of a message 4005 that may be displayed on the screen of the missing device to indicate to the second user at the missing device that the missing device belongs to the first user, an invitation to answer the call, and a request to call the phone number or back-up number specified by the first user (see step 3125—FIG. 31). As discussed above, if the second user accepts the invitation to answer the call, place call module 2187 (FIG. 21) directs the audio data transport provider to establish the audio transmission between the portable electronic device and the return communication phone number specified by the first user.

In a specific implementation, message 4005 is accompanied by an alarm generated at the missing device. The alarm may be generated intermittently, e.g., stopping or ceasing for a time or alternately ceasing and beginning again. Generating the alarm intermittently helps to conserve the missing device's battery. When the alarm is generated at a particular time, there may not be any users near the missing device. For example, it may be during the early morning hours (e.g., 12:00 am to 5:00 am) when most people are sleeping and restaurants and streets (where the missing device may be) are relatively unoccupied by people. At a first time, the alarm may sound continuously for a short period of time. The time may range from about 5 seconds to about 60 seconds, this includes, for example, 10, 20, 30, 40, 50, or more than 60 seconds. The time may be less than 10 seconds. If there is no acceptance of the call, the alarm may stop in order to preserve battery life.

The alarm may be generated periodically such as once every hour, once every two hours, once every three hours, and so forth. The alarm may be generated at regular intervals of time or irregular intervals of time. During the day the alarm may be generated more frequently than during the night because there can be a higher likelihood of someone hearing the alarm during the day than during the night. Alternatively, during the night the alarm may be generated more frequently than during the day. For example, the device owner may suspect that the device was lost in a nightclub or bar. Typically, a nightclub or bar has more people during the night than during the day. So, there can be a higher likelihood that someone will hear the alarm during the night as compared to during the day.

The alarm may include an audible alert or sound, a visual alert such as a flashing or blinking of the missing device's electronic screen, or both an audible and visual alert. A visual alert can be beneficial during the night or when it is dark or dim (e.g., a night club or bar).

The missing device app on the portable electronic device may include one or more default settings for the alarm. For example, a default alarm setting may be that the alarm is generated periodically during the hours of 6:00 am to 6:00 pm (e.g., daytime) and the alarm is not generated before 6:00 am or after 6:00 pm (e.g., nighttime). The device owner, however, may be able to override the default alarm settings, e.g., configure the alarm to be generated continuously or periodically, determine the time intervals at which the alarm will be generated, specify whether the an audible alert of the alarm should sound during the day only, define the daytime hours, specify whether the audible alert should sound during the night only, define the nighttime hours, specify the frequency with which the alarm will be generated, specify whether the alarm includes an audible alert, specify whether the alarm includes a visual alert, specify whether the alarm includes an audible and visual alert, or combinations of these.

In this specific implementation, the call from the missing device is made to a single phone number specified by the first user. In other words, connections can be used to call a single recipient. In another specific implementation, connections can be used to make a call to a specified list. The list may include VOIP clients and does not have to be phones.

More particularly, in a specific implementation, the missing device owner may specify multiple backup phone numbers (i.e., two or more backup phone numbers) for the missing device to call through the audio data transport provider. The list of specified backup phone numbers may be a prioritized or ordered list of backup phone numbers. In this specific implementation, the missing device places a call to a first backup phone number. If there is a problem with the call (e.g., the device owner does not answer the call, or a network connection problem), the missing device may place a call through the audio data transport provider to a second backup phone number. That is, after the missing device determines that the call to the first backup phone number has failed, the missing device places a call to the second backup phone number.

Alternatively, the missing device may place two or more backup calls simultaneously or concurrently. In this specific implementation, the missing device places a call through the audio data transport provider to a first backup number and second backup number. The call to the second backup number is placed before the missing device determines that the call to the first backup number failed. This feature allows a conference call to be made with the device finder at the missing device, the device owner at a first client, and a third person at a second client. The third person may be, for example, a friend of the device owner who can help with the return of the missing device to the device owner. Thus, connections can be used to send audio messages or other data to a single recipient or to a specified list. The list may include VoIP clients and does not have to be phones. A connection may be used to create a two way call between multiple devices including the missing device and other clients.

In the specific implementation shown in FIG. 39 and step 3125 (FIG. 31) the backup phone number is input when the missing device owner selects call me back action 3525D (FIG. 35). This, however, is not always the case. In another specific implementation, the backup phone number may be specified as part of a configuration or setup process.

Figure 38:
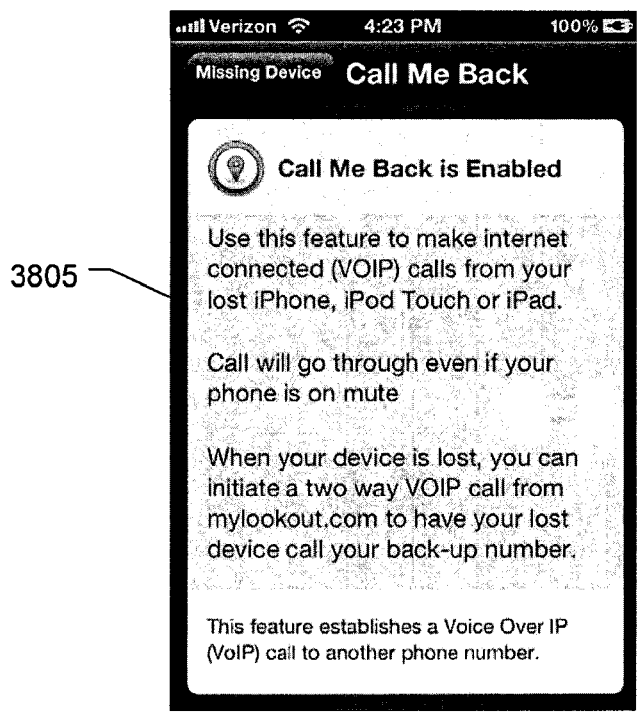
FIG. 38 illustrates a screen shot of a configuration page of the missing device mobile app's "Call Me Back" feature.

For example, FIG. 38 shows a configuration page 3805 for a specific implementation of the "Call Me Back" feature. The device owner may use this page to configure missing device mobile app 2185 (FIG. 21) on their device. As shown in FIG. 38, the device owner has enabled the "Call Me Back" feature so that if the device becomes lost, the device owner can initiate a two way VoIP call from the system website to have the lost device call the backup number.

In another specific implementation, the configuration page includes an input box to allow the device owner to specify a backup number. The backup number is saved or stored on the owner's device. In the event that the device is lost, the owner can instruct the device to make a call to the previously stored backup number on the device. Alternatively, the device, server, or both may detect that the device is missing using techniques discussed above and initiate an audio transmission to one or more of the backup numbers without having received the request from the owner.

The backup number may be, for example, the owner's home telephone number or work number. In a specific implementation, a backup number is stored at a portable electronic device belonging to a first user. After the backup number is stored, an instruction from the first user is received at the portable electronic device to place a call to the previously stored backup number. Upon receiving the instruction, the portable electronic device places a call to the previously stored backup number.

There can be multiple backup numbers stored on the device. For example, a first stored backup number may be the device owner's home telephone, a second stored backup number may be the device owner's work telephone, a third stored backup number may be a portable electronic device belonging to the owner's spouse, and so forth.

Figure 34:
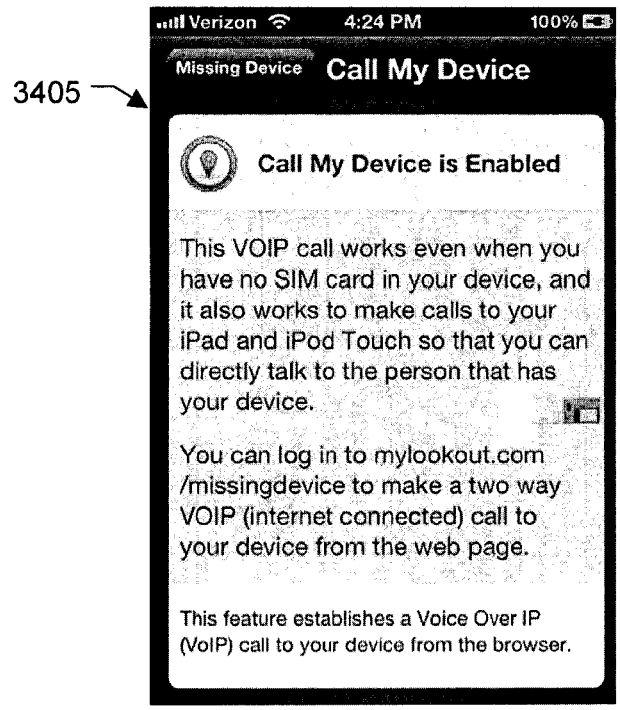
FIG. 34 illustrates a screen shot of a configuration page of the missing device mobile app's "Call My Device" feature.

FIG. 34 shows a configuration page 3405 for a specific implementation of the "Call My Device" feature. The device owner may use this page to configure missing device mobile app 2185 (FIG. 21) on their device. As shown in FIG. 34, the device owner has enabled the "Call My Device" feature so that if the device becomes lost, the device owner can log in to the system web site to make a two way VoIP call to the device from the web page.

In a specific implementation, the mobile app configuration pages (e.g., configuration page 3405—FIG. 34, configuration page 3805—FIG. 38, or both) provide further options for configuring the respective missing device feature on the owner's device. The configuration page allows the device owner to specify options (e.g., enable or disable options). The configuration page may include an option for a ring or no ring on the device when the incoming missing device call is received, an option to override volume settings, an option to override ring sounds, an option to override headphone/sound routing, an option to enable or disable location services (e.g., Global Positioning System (GPS)), an option to lock the missing device, an option to lock the device into a specific lockdown mode, or combinations of these.

Instead or additionally, one or more of these options may be done by the device owner or initiator dynamically. The connection between the client and the missing device can be used to initiate a ring or no ring on the missing device, the connection can override volume settings, the connection can override ring sounds, the connection can override headphone/sound routing, or combinations of these.

For example, if the missing device owner suspects that the device was stolen by thieves, the device owner may instruct the missing device to automatically accept an incoming call without generating a sound (e.g., an alarm, alert, or ringtone). As discussed, this allows, for example, the device owner to monitor the thieves using the missing device without alerting the thieves.

In a specific implementation, an option is provided at a client for a first user at the client to specify whether or not an incoming call to a portable electronic device belong to the first user should generate an alarm at the portable electronic device. The option may be a button or checkbox, e.g., "check this box to generate an alarm at your missing device when the call to the missing device is placed." A call is placed to the portable electronic device. Based on the selected option, the incoming call to the missing device generates or does not generate an alarm, e.g., audio alarm or other audible or visible indication of the incoming call.

As another example, if the missing device owner suspects that the device was misplaced in their house or left at a friend's house, the device owner may select the option to have the missing device ring to indicate the incoming call. This allows the device owner or the owner's friend to hear the incoming call, move towards the ringing sound from the missing device, and locate the missing device.

The device owner may instruct the missing device to perform actions such as initiate picture taking, initiate a lock where no features work, allow only certain features to work such as "call owner," or combinations of these. These actions could be initiated prior to a connection, during a connection, or after a connection is completed.

Referring now to FIG. 21, in a specific implementation, server 2109 facilitates establishment of the connection between the missing portable electronic device 2106 and one or more of clients 2103 such as by authenticating first user 2194A as the missing device owner—see authentication server 2196. In another specific implementation, a connection may be established between the missing portable electronic device and one or more of the clients without the server acting as an intermediary. In this specific implementation, missing device mobile app 2185 at portable electronic device 2106 may include an authentication component. First user 2194A at, for example, client computer 2115 can contact the missing device directly and bypass server 2109. The authentication component at the missing device can authenticate the first user as the owner of the missing device based on input provided by the first user client computer 2115 (e.g., username and password, or PIN). Based on the first user being the owner of the device, missing device features as described in this application are made available to the first user.

In a specific implementation, a method for finding a portable electronic device includes at a server, receiving input from a first user at a client, based on the input, authenticating the first user as authorized to access the portable electronic device, after the authenticating step, receiving a request from the first user to establish a connection between the portable electronic device and the client, in response to the request, causing a call to be placed to the portable electronic device, and receiving acceptance of the call indicating that a connection between the portable electronic device and the client has been established.

The acceptance of the call may be received without a second user at the portable electronic device indicating the acceptance. Alternatively, the acceptance of the call may be in response to a second user at the portable electronic device indicating the acceptance.

In a specific implementation, the method further includes at the server, receiving a request from the first user to register the portable electronic device as belonging to the first user, transmitting a verification code to the portable electronic device for the first user to enter; and, upon receiving the entered verification code, registering the portable electronic device as belonging to the first user.

In a specific implementation, a method includes at a portable electronic device, receiving a first call responsive to an action from a first user, based on the received first call, overriding an audio setting of the portable electronic device to generate an alarm, and displaying a message on an electronic screen of the portable electronic device. The message includes text that indicates to a second user at the portable electronic device that the portable electronic device belongs to the first user.

In an implementation, the message includes a backup phone number, specified by the first user, for the second user to call. In a specific implementation, the method further includes at the portable electronic device, receiving from the second user an acceptance of the first call, and in response to receiving the acceptance of the first call, causing to be placed a second call to a backup phone number specified by the first user. In an implementation, there is before the step of receiving a first call from a first user, storing the backup phone number at the portable electronic device. The step of receiving a first call from a first user may include receiving the backup phone number at the portable electronic device.

The overriding an audio setting step may include sounding the alarm at a first volume level, where the audio setting is at a second volume level, less than the first volume level. The overriding an audio setting step may include sounding the alarm at a maximum volume level, where the audio setting is at a volume level less than the maximum volume level. The audio setting may include a first ringtone setting to indicate a call being received at the portable electronic device, and the overriding an audio setting step may include sounding the alarm using a second ringtone, different from the first ringtone. The overriding an audio setting step may include emitting an audible sound through a speaker of the portable electronic device, where the audio setting is mute, silent, or vibrate.

In another specific implementation, a method includes at a portable electronic device, receiving a first call from a first user at a first client, based on the received first call, overriding an audio setting of the portable electronic device to generate an alarm, displaying on a screen of the portable electronic device a message including text that indicates to a second user at the portable electronic device that the portable electronic device belongs to the first user, and an invitation for the second user to accept the first call, receiving acceptance of the first call from the second user, and after the receiving acceptance step, causing to be placed a second call to a second client having a phone number specified by the first user, where the second client is different from the first client.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method on a portable electronic device comprising:
   at the portable electronic device, detecting a security event occurring at the portable electronic device when a distance between a location of the portable electronic device and a reference location is greater than a threshold value indicating that the portable electronic device is missing;
   in response to the detected security event, at the portable electronic device, determining that an audio transmission should be established between the portable electronic device and a client computer; and
   at the portable electronic device, triggering the portable electronic device to initiate the audio transmission in response to the determination that the audio transmission should be established.

2. The method of claim 1 wherein the step of detecting a security event occurring at the portable electronic device further comprises:
   detecting that at least one of a screen of the portable electronic device has been turned on, movement of the portable electronic device, a camera of the portable electronic device has been used, an incorrect password has been entered at the portable electronic device, a contact has been added to a directory of the portable electronic device, a contact in a directory of the portable electronic device has been deleted, and a contact in a directory of the portable electronic device has been updated.

3. The method of claim 1 wherein the step of detecting a security event occurring at the portable electronic device further comprises:
   detecting that at least one of a SIM card of the portable electronic device has been removed and a SIM card of the portable electronic device has been replaced with a different SIM card.

4. The method of claim 1 wherein the step of detecting a security event occurring at the portable electronic device further comprises:
   detecting that the portable electronic device has been connected to a computer.

5. The method of claim 1 wherein the step of detecting a security event occurring at the portable electronic device further comprises:
   detecting at least one of an attempt to uninstall a mobile application program on the portable electronic device and detecting an attempt to delete data from the portable electronic device.

6. The method of claim 1 wherein the step of detecting a security event occurring at the portable electronic device further comprises:
   detecting uncharacteristic behavior.

7. A non-transitory computer-readable storage medium having stored thereon a plurality of instructions which, when executed by a processor, cause the processor to perform the steps of a method comprising:
   at a portable electronic device, detecting a security event occurring at the portable electronic device when a distance between a location of the portable electronic device and a reference location is greater than a threshold value indicating that the portable electronic device is missing;

in response to the detected security event, at the portable electronic device, determining that an audio transmission should be established between the portable electronic device and a client computer; and at the portable electronic device, triggering the portable electronic device to initiate the audio transmission in response to the determination that the audio transmission should be established.

8. The non-transitory computer-readable storage medium of claim 7 wherein the method step of detecting a security event occurring at the portable electronic device further comprises:

detecting that at least one of a screen of the portable electronic device has been turned on, movement of the portable electronic device, a camera of the portable electronic device has been used, an incorrect password has been entered at the portable electronic device, a contact has been added to a directory of the portable electronic device, a contact in a directory of the portable electronic device has been deleted, and a contact in a directory of the portable electronic device has been updated.

9. The non-transitory computer-readable storage medium of claim 7 wherein the method step of detecting a security event occurring at the portable electronic device further comprises:

detecting that at least of one of a SIM card of the portable electronic device has been removed and a SIM card of the portable electronic device has been replaced with a different SIM card.

10. The non-transitory computer-readable storage medium of claim 7 wherein the method step of detecting a security event occurring at the portable electronic device further comprises:

detecting that the portable electronic device has been connected to a computer.

11. The non-transitory computer-readable storage medium of claim 7 wherein the method step of detecting a security event occurring at the portable electronic device further comprises:

detecting at least one of an attempt to uninstall a mobile application program on the portable electronic device and an attempt to delete data from the portable electronic device.

12. The non-transitory computer-readable storage medium of claim 7 wherein the method step of detecting a security event occurring at the portable electronic device further comprises:

detecting uncharacteristic behavior.

13. The method of claim 1 wherein the step of detecting a security event occurring at the portable electronic device further comprises:

generating location data from the portable electronic device indicating the location of the portable electronic device.

14. The non-transitory computer-readable storage medium of claim 7 wherein the method step of detecting a security event occurring at the portable electronic device further comprises:

generating location data from the portable electronic device indicating the location of the portable electronic device.

15. A method on a portable electronic device comprising:

at the portable electronic device, detecting a security event occurring at the portable electronic device when a distance between a location of the portable electronic device and a reference location is less than a threshold value indicating that the portable electronic device is missing;

in response to the detected security event, at the portable electronic device, determining that an audio transmission should be established between the portable electronic device and a client computer; and at the portable electronic device, triggering the portable electronic device to initiate the audio transmission in response to the determination that the audio transmission should be established.

16. The method of claim 15 wherein the method step of detecting a security event occurring at the portable electronic device further comprises:

detecting that at least one of a screen of the portable electronic device has been turned on, movement of the portable electronic device, a camera of the portable electronic device has been used, an incorrect password has been entered at the portable electronic device, a contact has been added to a directory of the portable electronic device, a contact in a directory of the portable electronic device has been deleted, and a contact in a directory of the portable electronic device has been updated.

17. The method of claim 15 wherein the method step of detecting a security event occurring at the portable electronic device further comprises:

detecting that at least one of a SIM card of the portable electronic device has been removed and a SIM card of the portable electronic device has been replaced with a different SIM card.

18. The method of claim 15 wherein the method step of detecting a security event occurring at the portable electronic device further comprises:

detecting that the portable electronic device has been connected to a computer.

19. The method of claim 15 wherein the method step of detecting a security event occurring at the portable electronic device further comprises:

detecting at least one of an attempt to uninstall a mobile application program on the portable electronic device and an attempt to delete data from the portable electronic device.

20. The method of claim 15 wherein the method step of detecting a security event occurring at the portable electronic device further comprises:

detecting uncharacteristic behavior.

21. The method of claim 15 wherein the step of detecting a security event occurring at the portable electronic device further comprises:

generating location data from the portable electronic device indicating the location of the portable electronic device.

\* \* \* \* \*